(12) United States Patent
Triverio et al.

(10) Patent No.: US 12,293,741 B2
(45) Date of Patent: May 6, 2025

(54) USER INTERFACE FOR A FLASHLIGHT MODE ON AN ELECTRONIC DEVICE

(71) Applicant: Apple Inc., Cupertino, CA (US)

(72) Inventors: Marco Triverio, San Francisco, CA (US); Gary Ian Butcher, Los Gatos, CA (US); Kevin Will Chen, Cupertino, CA (US); Matthew J. Sundstrom, Campbell, CA (US); Christopher Patrick Foss, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/629,155

(22) Filed: Apr. 8, 2024

(65) Prior Publication Data

US 2024/0257786 A1    Aug. 1, 2024

Related U.S. Application Data

(63) Continuation of application No. 17/676,034, filed on Feb. 18, 2022, now Pat. No. 11,955,100, which is a
(Continued)

(51) Int. Cl.
*G09G 5/10* (2006.01)
*G06F 3/01* (2006.01)
(Continued)

(52) U.S. Cl.
CPC ............... *G09G 5/10* (2013.01); *G06F 3/017* (2013.01); *G06F 3/04847* (2013.01);
(Continued)

(58) Field of Classification Search
CPC ............. G09G 5/10; G09G 2320/0613; G09G 2320/0626; G09G 2320/0686;
(Continued)

(56) References Cited

U.S. PATENT DOCUMENTS 5,408,275 A    4/1995  Song et al.
6,353,449 B1   3/2002  Gregg et al.
(Continued)

FOREIGN PATENT DOCUMENTS

CA    2986980 A1    5/2019
CN    1870796 A     11/2006
(Continued)

OTHER PUBLICATIONS

Raghunath, M. T., & Narayanaswami, C. (2002). User interfaces for applications on a wrist watch. Personal and Ubiquitous Computing, 6, 17-30.*

(Continued)

*Primary Examiner* — Sarah Lhymn
(74) *Attorney, Agent, or Firm* — DLA Piper LLP (US)

(57) ABSTRACT

An electronic device having a display and a physical input mechanism detects a request to display a flashlight user interface. In response to detecting the request, the device displays the flashlight user interface. While displaying the flashlight user interface, the electronic device detects an interaction with the physical input mechanism. In response to detecting the interaction, the electronic device changes a property of the illumination source that is used as the flashlight.

36 Claims, 26 Drawing Sheets

Related U.S. Application Data continuation of application No. 16/792,096, filed on Feb. 14, 2020, now Pat. No. 11,257,464, which is a continuation of application No. 15/791,829, filed on Oct. 24, 2017, now Pat. No. 10,565,960.

(60) Provisional application No. 62/506,866, filed on May 16, 2017.

(51) Int. Cl.
| | |
|---|---|
| *G06F 3/04847* | (2022.01) |
| *G06F 3/04883* | (2022.01) |
| *G06F 3/147* | (2006.01) |
| *G06F 3/04817* | (2022.01) |
| *G06F 3/0482* | (2013.01) |

(52) U.S. Cl.
CPC .......... *G06F 3/04883* (2013.01); *G06F 3/147* (2013.01); *G06F 3/04817* (2013.01); *G06F 3/0482* (2013.01); *G06F 2203/04808* (2013.01); *G09G 2320/0613* (2013.01); *G09G 2320/0626* (2013.01); *G09G 2320/0686* (2013.01); *G09G 2330/022* (2013.01); *G09G 2340/14* (2013.01); *G09G 2340/145* (2013.01); *G09G 2354/00* (2013.01); *G09G 2360/144* (2013.01); *G09G 2370/16* (2013.01)

(58) Field of Classification Search
CPC .......... G09G 2330/022; G09G 2340/14; G09G 2340/145; G09G 2354/00; G09G 2360/144; G09G 2370/16; G09G 3/34; G06F 3/017; G06F 3/04847; G06F 3/04883; G06F 3/147; G06F 3/04817; G06F 3/0482; G06F 2203/04808; G06F 3/0484

See application file for complete search history.

(56) References Cited

U.S. PATENT DOCUMENTS

| | | | |
|---|---|---|---|
| 6,683,653 B1 | 1/2004 | Miyake et al. |
| 6,806,893 B1 | 10/2004 | Kolawa et al. |
| 6,982,695 B1 | 1/2006 | Canova et al. |
| 7,036,025 B2 | 4/2006 | Hunter |
| 7,113,809 B2 | 9/2006 | Noesgaard et al. |
| 8,041,968 B2 | 10/2011 | Tupman |
| 8,046,617 B2 | 10/2011 | Fleck et al. |
| 8,238,876 B2 | 8/2012 | Teng et al. |
| 8,245,143 B2 | 8/2012 | Yach et al. |
| 8,635,475 B2 | 1/2014 | Lin et al. |
| 8,725,842 B1 | 5/2014 | Al-Nasser |
| 8,775,844 B1 | 7/2014 | Peterson |
| 8,847,903 B2 | 9/2014 | Stokes et al. |
| 8,854,925 B1 | 10/2014 | Lee et al. |
| 9,152,211 B2 | 10/2015 | Gunn et al. |
| 9,152,212 B2 | 10/2015 | Gunn |
| 9,197,738 B2 | 11/2015 | Peev et al. |
| 9,436,269 B2 | 9/2016 | Yang |
| 9,557,806 B2 | 1/2017 | Väyrynen |
| 9,568,891 B2 | 2/2017 | Adams et al. |
| 9,609,230 B1 | 3/2017 | Bakshi et al. |
| 9,625,987 B1 | 4/2017 | Lapenna et al. |
| 9,635,255 B1 | 4/2017 | Baldwin |
| 9,651,922 B2 | 5/2017 | Hysek et al. |
| 9,756,172 B2 | 9/2017 | Piemonte et al. |
| 9,939,872 B2 | 4/2018 | Graham et al. |
| 10,183,622 B2 | 1/2019 | Taguchi et al. |
| 10,275,148 B2 | 4/2019 | Matas et al. |
| 10,303,289 B2 | 5/2019 | Sepulveda et al. |
| 10,317,977 B2 | 6/2019 | Yang |
| 10,459,887 B1 | 10/2019 | Dvortsov et al. |
| 10,649,644 B2 | 5/2020 | Ma |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,435,887 B1 | 9/2022 | Mirho et al. |
| 2003/0052928 A1 | 3/2003 | Williams |
| 2003/0169306 A1 | 9/2003 | Makipaa et al. |
| 2005/0052446 A1 | 3/2005 | Plut |
| 2005/0124389 A1 | 6/2005 | Yang |
| 2005/0168566 A1 | 8/2005 | Tada et al. |
| 2005/0272462 A1 | 12/2005 | Okamoto |
| 2006/0087502 A1 | 4/2006 | Karidis et al. |
| 2006/0128419 A1 | 6/2006 | Shimizu et al. |
| 2006/0129948 A1 | 6/2006 | Hamzy et al. |
| 2007/0146344 A1 | 6/2007 | Martin et al. |
| 2007/0277127 A1 | 11/2007 | Carlson et al. |
| 2008/0005599 A1 | 1/2008 | Theocharous et al. |
| 2008/0143729 A1 | 6/2008 | Wyatt et al. |
| 2008/0167834 A1 | 7/2008 | Herz et al. |
| 2008/0168402 A1 | 7/2008 | Blumenberg |
| 2008/0170058 A1 | 7/2008 | Ahn et al. |
| 2008/0174606 A1 | 7/2008 | Rengarajan et al. |
| 2008/0195961 A1 | 8/2008 | Bae et al. |
| 2008/0224988 A1 | 9/2008 | Whang |
| 2009/0066533 A1 | 3/2009 | Park et al. |
| 2009/0195497 A1 | 8/2009 | Fitzgerald et al. |
| 2009/0249247 A1 | 10/2009 | Tseng et al. |
| 2009/0284389 A1 | 11/2009 | Klassen et al. |
| 2009/0315834 A1 | 12/2009 | Nurmi et al. |
| 2010/0088597 A1 | 4/2010 | Shin et al. |
| 2010/0100841 A1 | 4/2010 | Shin et al. |
| 2010/0146437 A1 | 6/2010 | Woodcock et al. |
| 2010/0146463 A1 | 6/2010 | Cho et al. |
| 2010/0157742 A1 | 6/2010 | Relyea et al. |
| 2011/0003616 A1 | 1/2011 | Gorsica et al. |
| 2011/0003621 A1 | 1/2011 | Atsumi |
| 2011/0003665 A1 | 1/2011 | Burton et al. |
| 2011/0117902 A1 | 5/2011 | Chang et al. |
| 2011/0128311 A1 | 6/2011 | Wakatsuki et al. |
| 2011/0129311 A1 | 6/2011 | Itoh |
| 2011/0182151 A1 | 7/2011 | Geyer et al. |
| 2012/0013552 A1 | 1/2012 | Ahn |
| 2012/0019152 A1 | 1/2012 | Barnhoefer et al. |
| 2012/0077554 A1 | 3/2012 | Ahn et al. |
| 2012/0098639 A1 | 4/2012 | Ijäs |
| 2012/0127198 A1 | 5/2012 | Gundavarapu |
| 2012/0151341 A1 | 6/2012 | Ko et al. |
| 2012/0182226 A1 | 7/2012 | Tuli |
| 2012/0288139 A1 | 11/2012 | Singhar |
| 2012/0319984 A1 | 12/2012 | Borovsky et al. |
| 2012/0320081 A1 | 12/2012 | Kim et al. |
| 2013/0036377 A1 | 2/2013 | Colley |
| 2013/0147825 A1 | 6/2013 | Martin et al. |
| 2013/0162611 A1 | 6/2013 | Lim et al. |
| 2013/0176293 A1 | 7/2013 | Pantfoerder |
| 2013/0345980 A1 | 12/2013 | Van Os et al. |
| 2014/0063049 A1 | 3/2014 | Armstrong-Muntner |
| 2014/0086123 A1 | 3/2014 | Deivasigamani et al. |
| 2014/0139637 A1 | 5/2014 | Mistry et al. |
| 2014/0143737 A1 | 5/2014 | Mistry et al. |
| 2014/0155031 A1 | 6/2014 | Lee et al. |
| 2014/0189578 A1 | 7/2014 | Shuttleworth et al. |
| 2014/0192244 A1 | 7/2014 | Ishihara et al. |
| 2014/0201655 A1 | 7/2014 | Mahaffey et al. |
| 2014/0210708 A1 | 7/2014 | Simmons et al. |
| 2014/0210801 A1 | 7/2014 | Li |
| 2014/0256298 A1 | 9/2014 | Moss et al. |
| 2014/0267103 A1 | 9/2014 | Chaudhri |
| 2014/0285699 A1 | 9/2014 | Kato et al. |
| 2014/0310643 A1 | 10/2014 | Karmanenko et al. |
| 2014/0320434 A1 | 10/2014 | Pantel |
| 2014/0344820 A1 | 11/2014 | Kumar |
| 2014/0359477 A1 | 12/2014 | Chen |
| 2014/0361955 A1 | 12/2014 | Goncalves |
| 2014/0362105 A1 | 12/2014 | Kocienda et al. |
| 2015/0002735 A1 | 1/2015 | Moskovchenko |
| 2015/0054846 A1 | 2/2015 | Okada et al. |
| 2015/0061988 A1 | 3/2015 | Galu, Jr. |
| 2015/0062130 A1 | 3/2015 | Ho |

(56) References Cited

U.S. PATENT DOCUMENTS

| | | |
|---|---|---|
| 2015/0128042 A1 | 5/2015 | Churchill et al. |
| 2015/0185703 A1 | 7/2015 | Tanaka |
| 2015/0194137 A1 | 7/2015 | Wyatt |
| 2015/0207922 A1 | 7/2015 | Kobayashi et al. |
| 2015/0220299 A1 | 8/2015 | Kim et al. |
| 2015/0228048 A1 | 8/2015 | Heo et al. |
| 2015/0241939 A1 | 8/2015 | Im et al. |
| 2015/0261284 A1 | 9/2015 | Lee et al. |
| 2015/0262548 A1 | 9/2015 | Lin |
| 2015/0277545 A1 | 10/2015 | Flowers et al. |
| 2015/0286285 A1 | 10/2015 | Pantelopoulos et al. |
| 2015/0286391 A1 | 10/2015 | Jacobs et al. |
| 2015/0346694 A1 | 12/2015 | Hoobler et al. |
| 2015/0346824 A1 | 12/2015 | Chen et al. |
| 2015/0365892 A1 | 12/2015 | Ma et al. |
| 2015/0379476 A1 | 12/2015 | Chaudhri et al. |
| 2016/0004345 A1 | 1/2016 | Imana |
| 2016/0018872 A1 | 1/2016 | Tu et al. |
| 2016/0034133 A1 | 2/2016 | Wilson et al. |
| 2016/0034152 A1 | 2/2016 | Wilson et al. |
| 2016/0041597 A1 | 2/2016 | Graham et al. |
| 2016/0041755 A1 | 2/2016 | Crowther et al. |
| 2016/0044091 A1 | 2/2016 | Doumet |
| 2016/0049106 A1 | 2/2016 | Connell et al. |
| 2016/0058375 A1 | 3/2016 | Rothkopf |
| 2016/0062450 A1 | 3/2016 | Han et al. |
| 2016/0062589 A1 | 3/2016 | Wan et al. |
| 2016/0077718 A1 | 3/2016 | Kwon et al. |
| 2016/0098137 A1 | 4/2016 | Kim et al. |
| 2016/0134737 A1 | 5/2016 | Pulletikurty |
| 2016/0162112 A1 | 6/2016 | Lee et al. |
| 2016/0180780 A1 | 6/2016 | Chen et al. |
| 2016/0189328 A1 | 6/2016 | Vranjes et al. |
| 2016/0205167 A1 | 7/2016 | Kolam et al. |
| 2016/0205241 A1 | 7/2016 | Atsumi |
| 2016/0205244 A1 | 7/2016 | Dvortsov |
| 2016/0205267 A1 | 7/2016 | Vaughn et al. |
| 2016/0252978 A1 | 9/2016 | Yoo et al. |
| 2016/0259535 A1 | 9/2016 | Fleizach et al. |
| 2016/0313908 A1 | 10/2016 | Matas et al. |
| 2016/0342327 A1 | 11/2016 | Chi et al. |
| 2016/0357151 A1 | 12/2016 | Block et al. |
| 2016/0357282 A1 | 12/2016 | Block et al. |
| 2016/0357394 A1 | 12/2016 | Tae et al. |
| 2016/0357413 A1 | 12/2016 | Block et al. |
| 2017/0004798 A1 | 1/2017 | Park et al. |
| 2017/0040001 A1 | 2/2017 | Zhang et al. |
| 2017/0046024 A1 | 2/2017 | Dascola et al. |
| 2017/0061934 A1 | 3/2017 | Shin |
| 2017/0070716 A1 | 3/2017 | Kim et al. |
| 2017/0075316 A1 | 3/2017 | Berdinis et al. |
| 2017/0075563 A1 | 3/2017 | Bauer et al. |
| 2017/0109011 A1 | 4/2017 | Jiang |
| 2017/0123603 A1 | 5/2017 | Chang |
| 2017/0160898 A1 | 6/2017 | Lee et al. |
| 2017/0164292 A1 | 6/2017 | Santamaria et al. |
| 2017/0212648 A1 | 7/2017 | Choi et al. |
| 2017/0236497 A1 | 8/2017 | Huitema et al. |
| 2017/0257426 A1 | 9/2017 | Wilbur et al. |
| 2017/0277136 A1 | 9/2017 | Minami et al. |
| 2017/0322658 A1 | 11/2017 | Lee et al. |
| 2017/0325196 A1 | 11/2017 | Cho et al. |
| 2017/0357358 A1 | 12/2017 | Teutschler et al. |
| 2017/0357413 A1 | 12/2017 | Green |
| 2017/0357426 A1 | 12/2017 | Wilson et al. |
| 2017/0357427 A1 | 12/2017 | Wilson et al. |
| 2017/0357495 A1 | 12/2017 | Crane et al. |
| 2017/0358276 A1 | 12/2017 | Mese et al. |
| 2017/0371394 A1 | 12/2017 | Chan et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0088733 A1 | 3/2018 | Syed et al. |
| 2018/0088797 A1 | 3/2018 | Mcatee et al. |
| 2018/0120927 A1 | 5/2018 | Ma et al. |
| 2018/0121060 A1 | 5/2018 | Jeong et al. |
| 2018/0150443 A1 | 5/2018 | Singleton |
| 2018/0174550 A1 | 6/2018 | Zhang et al. |
| 2018/0188925 A1 | 7/2018 | Na et al. |
| 2018/0261183 A1 | 9/2018 | Gou et al. |
| 2018/0275739 A1 | 9/2018 | Minami et al. |
| 2018/0336866 A1 | 11/2018 | Triverio et al. |
| 2018/0341389 A1 | 11/2018 | Kim et al. |
| 2018/0348844 A1 | 12/2018 | Lingutla et al. |
| 2018/0366068 A1 | 12/2018 | Liu et al. |
| 2018/0374429 A1 | 12/2018 | Nakamura |
| 2019/0018445 A1 | 1/2019 | Watanabe et al. |
| 2019/0069244 A1 | 2/2019 | Jeon et al. |
| 2019/0079576 A1 | 3/2019 | Liu et al. |
| 2019/0163142 A1 | 5/2019 | Chang et al. |
| 2019/0212707 A1 | 7/2019 | Minami et al. |
| 2019/0237003 A1 | 8/2019 | Cao et al. |
| 2019/0281154 A1 | 9/2019 | Choi et al. |
| 2019/0324620 A1 | 10/2019 | Gu et al. |
| 2020/0073122 A1 | 3/2020 | Rothkopf et al. |
| 2020/0242228 A1 | 7/2020 | Farraro et al. |
| 2020/0279539 A1 | 9/2020 | Triverio et al. |
| 2020/0319348 A1 | 10/2020 | Oshita et al. |
| 2020/0327862 A1 | 10/2020 | Sinha et al. |
| 2021/0149694 A1 | 5/2021 | Guzman et al. |
| 2021/0201732 A1 | 7/2021 | Ranjan et al. |
| 2021/0208903 A1 | 7/2021 | Zhang et al. |
| 2022/0184309 A1 | 6/2022 | Rosinko et al. |
| 2022/0206681 A1 | 6/2022 | McAtee et al. |
| 2022/0342514 A1 | 10/2022 | Chao et al. |
| 2022/0351702 A1 | 11/2022 | Triverio et al. |
| 2023/0071987 A1 | 3/2023 | Zeng et al. |
| 2023/0368750 A1 | 11/2023 | Stack et al. |
| 2024/0353998 A1 | 10/2024 | Mcatee et al. |

FOREIGN PATENT DOCUMENTS

| | | | |
|---|---|---|---|
| CN | 1932590 A | 3/2007 | |
| CN | 101273324 A | 9/2008 | |
| CN | 100492288 C | 5/2009 | |
| CN | 101432722 A | 5/2009 | |
| CN | 101584124 A | 11/2009 | |
| CN | 102067070 A | 5/2011 | |
| CN | 102376265 A | 3/2012 | |
| CN | 102681648 A | 9/2012 | |
| CN | 102831404 A | 12/2012 | |
| CN | 103019567 A | 4/2013 | |
| CN | 103281419 A | 9/2013 | |
| CN | 103294197 A | 9/2013 | |
| CN | 103399661 A | 11/2013 | |
| CN | 103544920 A | 1/2014 | |
| CN | 103631496 A | 3/2014 | |
| CN | 103853328 A | 6/2014 | |
| CN | 103929662 A | 7/2014 | |
| CN | 104732956 A | 6/2015 | |
| CN | 104978904 A | 10/2015 | |
| CN | 105045079 A | 11/2015 | |
| CN | 105204620 A | 12/2015 | |
| CN | 105204931 A | 12/2015 | |
| CN | 105264479 A | 1/2016 | |
| CN | 105430154 A | 3/2016 | |
| CN | 105516824 A | 4/2016 | |
| CN | 105677179 A | * 6/2016 | ......... G06F 3/04847 |
| CN | 106056848 A | 10/2016 | |
| CN | 106486044 A | 3/2017 | |
| CN | 106598201 A | 4/2017 | |
| CN | 106605201 A | 4/2017 | |
| CN | 107239101 A | 10/2017 | |
| CN | 107643677 A | 1/2018 | |
| CN | 109313655 A | 2/2019 | |
| CN | 109690445 A | 4/2019 | |
| CN | 110708581 A | 1/2020 | |
| CN | 110471582 B | 10/2021 | |
| EP | 1750242 A2 | 2/2007 | |
| EP | 2175367 A2 | 4/2010 | |
| EP | 2565602 A1 | 3/2013 | |
| EP | 2449434 B1 | 3/2014 | |
| EP | 2869292 A2 | 5/2015 | |
| EP | 3376342 A1 | 9/2018 | |

(56) References Cited

FOREIGN PATENT DOCUMENTS

| | | |
|---|---|---|
| EP | 3465408 B1 | 8/2020 |
| JP | 54-92359 A | 7/1979 |
| JP | 2002-259046 A | 9/2002 |
| JP | 2003-196593 A | 7/2003 |
| JP | 2004-184396 A | 7/2004 |
| JP | 2004-251719 A | 9/2004 |
| JP | 2005-16962 A | 1/2005 |
| JP | 2006-287949 A | 10/2006 |
| JP | 2006-293340 A | 10/2006 |
| JP | 2007-150831 A | 6/2007 |
| JP | 2011-166679 A | 8/2011 |
| JP | 2011-203707 A | 10/2011 |
| JP | 2012-189422 A | 10/2012 |
| JP | 2012-531607 A | 12/2012 |
| JP | 2013-11931 A | 1/2013 |
| JP | 2016-20931 A | 2/2016 |
| JP | 2016-85364 A | 5/2016 |
| JP | 2016-120890 A | 7/2016 |
| JP | 2017-531225 A | 10/2017 |
| JP | 2020-169845 A | 10/2020 |
| KR | 10-2004-0107472 A | 12/2004 |
| KR | 10-2007-0025292 A | 3/2007 |
| KR | 10-0864578 B1 | 10/2008 |
| KR | 10-2010-0025846 A | 3/2010 |
| KR | 10-2010-0025853 A | 3/2010 |
| KR | 10-2014-0120470 A | 10/2014 |
| KR | 10-2015-0057307 A | 5/2015 |
| KR | 10-2015-0093090 A | 8/2015 |
| KR | 10-2016-0030832 A | 3/2016 |
| KR | 10-2016-0066813 A | 6/2016 |
| KR | 10-2016-0076957 A | 7/2016 |
| KR | 10-2018-0011581 A | 2/2018 |
| KR | 10-2018-0078355 A | 7/2018 |
| KR | 10-2019-0035800 A | 4/2019 |
| KR | 10-2019-0071285 A | 6/2019 |
| WO | 2006/131780 A1 | 12/2006 |
| WO | 2007/043222 A1 | 4/2007 |
| WO | 2007/124364 A2 | 11/2007 |
| WO | 2008/083360 A1 | 7/2008 |
| WO | 2008/085402 A1 | 7/2008 |
| WO | 2011/145256 A1 | 11/2011 |
| WO | 2014/024366 A1 | 2/2014 |
| WO | 2014/105274 A1 | 7/2014 |
| WO | 2015/034965 A1 | 3/2015 |
| WO | 2016/022203 A1 | 2/2016 |
| WO | 2016/022496 A2 | 2/2016 |
| WO | 2016/036472 A1 | 3/2016 |
| WO | 2016/039587 A1 | 3/2016 |
| WO | 2016/144563 A1 | 9/2016 |
| WO | 2017/000522 A1 | 1/2017 |
| WO | 2017/027526 A1 | 2/2017 |
| WO | 2017/213937 A1 | 12/2017 |
| WO | 2018/048700 A1 | 3/2018 |
| WO | 2018/057271 A1 | 3/2018 |
| WO | 2018/213451 A1 | 11/2018 |
| WO | 2020/117189 A1 | 6/2020 |
| WO | 2020/236148 A1 | 11/2020 |
| WO | 2021/050190 A1 | 3/2021 |

OTHER PUBLICATIONS

Notice of Allowance received for U.S. Appl. No. 17/546,630, mailed on Aug. 23, 2024, 48 pages.
Applicant-Initiated Interview Summary received for U.S. Appl. No. 17/697,749, mailed on Feb. 22, 2024, 5 pages.
Knight, Jon, "Use the New Picture-in-Picture Mode in Android O", Gadget Hacks, Retrieved from: https://android.gadgethacks.com/how-to/use-new-picture-picture-mode-android-o-0178324/, Jun. 23, 2017, 6 pages.
Non-Final Office Action received for U.S. Appl. No. 17/158,936, mailed on Mar. 26, 2024, 20 pages.
Notice of Allowance received for Japanese Patent Application No. 2022-174879, mailed on Mar. 22, 2024, 5 pages (1 page of English Translation and 4 pages of Official Copy).
Notice of Allowance received for U.S. Appl. No. 17/697,749, mailed on Apr. 10, 2024, 5 pages.
Notice of Hearing received for Indian Patent Application No. 202118025047, mailed on Mar. 14, 2024, 2 pages.
Office Action received for Australian Patent Application No. 2022228204, mailed on Feb. 15, 2024, 3 pages.
Office Action received for European Patent Application No. 17853656.1, mailed on Apr. 24, 2024, 7 pages.
Office Action received for Indian Patent Application No. 202118025046, mailed on Mar. 18, 2024, 6 pages.
Office Action received for Korean Patent Application No. 10-2024-7007452, mailed on Apr. 1, 2024, 17 pages (9 pages of English Translation and 8 pages of Official Copy).
Result of Consultation received for European Patent Application No. 20180900.1, mailed on May 6, 2024, 7 pages.
Supplemental Notice of Allowance received for U.S. Appl. No. 17/697,749, mailed on Apr. 17, 2024, 2 pages.
2007-150831, JP, A, Cited by the Japanese Patent Office in an Office Action for related Patent Application No. 2024-067669 on July 12, 2024, 5.
2011-203707, JP, A, Cited by the Japanese Patent Office in an Office Action for related Patent Application No. 2024-067669 on July 12, 2024, 5.
Dre, SM, "Android 8 How to use Picture in Picture (with YouTube)", available online at: https://youtu.be/H4w4EdlzqEg?si=OZJm2exdqF27hDBC, Nov. 27, 2017, 8 pages.
Final Office Action received for U.S. Appl. No. 17/158,936, mailed on Aug. 19, 2024, 25 pages.
Gotta Be Mobile, "How to Use Picture-in-Picture Mode on Android 8.0 Oreo", available online at: https://www.youtube.com/watch?v=305V9aP3BEs, Oct. 31, 2017, 1 page.
Gupta Information Systems, "Enable Picture in Picture Mode on Android Oreo 8.0", available online at: https://www.youtube.com/watch?v=whcee_eSwtc, May 19, 2017, 1 page.
Office Action received for Japanese Patent Application No. 2024-067669, mailed on Jul. 12, 2024, 5 pages (2 pages of English Translation and 3 pages of Official Copy).
Stack Overflow, "Play video from YouTube in picture-in-picture mode", available online at: https://stackoverflow.com/questions/54043791/play-video-from-youtube-in-picture-in-picture-mode, Jan. 4, 2019, 5 pages.
Advisory Action received for U.S. Appl. No. 16/792,096, mailed on Nov. 18, 2021, 4 pages.
Advisory Action received for U.S. Appl. No. 17/158,936, mailed on Jul. 24, 2023, 4 pages.
Andro, Dollar,"Huawei Watch GT Always on Mode Update is finally here!", Online Availabe at: https://www.youtube.com/watch?v=AJw_FIAf7v4, Jun. 6, 2019, 4 pages.
Android Tips, "Create a Minimal Lock Screen With WidgetLocker", Online Available at: http://appstap192.blogspot.com/2012/01/create-minimal-lock-screen-with.html, Jan. 18, 2012, 6 pages.
AOD too dim., "I've answered my own question to help others", Online Available: https://forums.androidcentral.com/samsung-galaxy-s9-s9-plus/874444-aod-too-dim-ive-answered-my-own-question-help-others.html, Mar. 11, 2018, 3 pages.
Applicant-Initiated Interview Summary received for U.S. Appl. No. 15/713,544, mailed on Apr. 6, 2020. 7 pages.
Applicant-Initiated Interview Summary received for U.S. Appl. No. 15/713,544, mailed on Oct. 24, 2019, 4 pages.
Applicant-Initiated Interview Summary received for U.S. Appl. No. 16/584,445, mailed on Mar. 17, 2020, 5 pages.
Applicant-Initiated Interview Summary received for U.S. Appl. No. 17/546,630, mailed on May 22, 2023, 4 pages.
Applicant-Initiated Interview Summary received for U.S. Appl. No. 16/584,281, mailed on Mar. 9, 2020, 5 pages.
Applicant-Initiated Interview Summary received for U.S. Appl. No. 16/584,281, mailed on Sep. 14, 2020, 6 pages.
Applicant-Initiated Interview Summary received for U.S. Appl. No. 16/585,714, mailed on Jul. 20, 2020, 5 pages.
Applicant-Initiated Interview Summary received for U.S. Appl. No. 16/585,721, mailed on Aug. 31, 2020, 5 pages.
Applicant-Initiated Interview Summary received for U.S. Appl. No. 16/585,721, mailed on Mar. 13, 2020, 5 pages.

(56) References Cited

OTHER PUBLICATIONS

Applicant-Initiated Interview Summary received for U.S. Appl. No. 16/792,096, mailed on May 17, 2021, 6 pages.
Applicant-Initiated Interview Summary received for U.S. Appl. No. 16/792,096, mailed on Oct. 18, 2021, 6 pages.
Interview Summary received for U.S. Appl. No. 17/158,936, mailed on Dec. 28, 2022, 4 pages.
Interview Summary received for U.S. Appl. No. 17/546,630, mailed on Aug. 9, 2023, 4 pages.
Interview Summary received for U.S. Appl. No. 17/546,630, mailed on Nov. 6, 2023, 3 pages.
Interview Summary received for U.S. Appl. No. 17/676,034, mailed on Feb. 27, 2023, 4 pages.
Interview Summary received for U.S. Appl. No. 17/676,034, mailed on Oct. 31, 2023, 2 pages.
Interview Summary received for U.S. Appl. No. 17/676,034, mailed on Sep. 18, 2023, 2 pages.
Interview Summary received for U.S. Appl. No. 17/697,749, mailed on May 30, 2023, 3 pages.
Interview Summary received for U.S. Appl. No. 17/697,749, mailed on Oct. 10, 2023, 5 pages.
Big Phil TV, "Gear S3 Watch faces with great always on display (AOD)", Available online at: https://www.youtube.com/watch?v=2cxMnrMiGU8, Apr. 5, 2017, 3 pages.
Decision received for Chinese Patent Application No. 201780002643.1, mailed on Dec. 15, 2021, 2 pages.
Bond, John-Michael, "The 4 Best Free Flashlight Apps for Android and iOS", Online Available at: https://www.dailydot.com/debug/best-free-flashlight-apps/, Apr. 2, 2017, 8 pages.
Cengic, Suad, "Samsung Gear S3—Display Always On! Cool!", Available online at: https://www.youtube.com/watch?v=ceeDinbPwOY, Mar. 10, 2017, 3 pages.
Certificate of Examination received for Australian Patent Application No. 2018101947, mailed on Feb. 18, 2019, 2 pages.
Certificate of Examination received for Australian Patent Application No. 2020102158, mailed on Jun. 8, 2021, 2 pages.
Corrected Notice of Allowance received for U.S. Appl. No. 15/713,544, mailed on Feb. 3, 2022, 2 pages.
Corrected Notice of Allowance received for U.S. Appl. No. 15/713,544, mailed on Feb. 10, 2022, 2 pages.
Corrected Notice of Allowance received for U.S. Appl. No. 15/713,544, mailed on Feb. 23, 2022, 2 pages.
Corrected Notice of Allowance received for U.S. Appl. No. 15/791,829, mailed on Jan. 16, 2020, 2 pages.
Corrected Notice of Allowance received for U.S. Appl. No. 16/792,096, mailed on Jan. 11, 2022, 3 pages.
Dan, "Get This Look: 'Minimal' Zooper Widget", Online Available at:https://www.androidguys.com/featured/customize/get-look-minimal-zooper-widget/, Mar. 7, 2014, 2 pages.
Decision on Appeal received for U.S. Appl. No. 15/713,544, mailed on Dec. 14, 2021, 10 pages.
Decision to Grant received for Danish Patent Application No. PA201770387, mailed on Aug. 30, 2018, 2 pages.
Decision to Grant received for Danish Patent Application No. PA201970596, mailed on Feb. 26, 2021, 2 pages.
Decision to Grant received for Danish Patent Application No. PA201970597, mailed on Aug. 19, 2021, 2 pages.
Decision to Grant received for European Patent Application No. 18172554.0, mailed on Jul. 30, 2020, 2 pages.
Decision to Grant received for European Patent Application No. 20761084.1, mailed on Jul. 27, 2023, 4 pages.
Decision to Grant received for European Patent Application No. 21169911.1, mailed on Jun. 29, 2023, 3 pages.
Decision to Grant received for European Patent Application No. 21177569.7, mailed on Apr. 6, 2023, 3 pages.
Disrapptive,"Flashlight for Android Wear", Online Available at: <https://www.youtube.com/watch?v=HVNxxUI57BM>, Jul. 10, 2014, 5 pages.

Download Ultitorch for APK latest version app for android devices, Online Available at: https://apkgk.com/com.qasq.torchpro, Jan. 8, 2016, 4 pages.
DROID LIFE,"How to: Use Always-on Apps with Android Wear", Available online at: https://www.youtube.com/watch?v=_-xYB9EBTaA, Jun. 26, 2015, 3 pages.
Examiner's Answer to Appeal Brief received for U.S. Appl. No. 15/713,544, mailed on Apr. 5, 2021, 15 pages.
Examiner's Answer to Appeal Brief received for U.S. Appl. No. 15/713,544, mailed on Apr. 9, 2021, 15 pages.
Extended European Search Report received for European Patent Application No. 17853656.1, mailed on Jul. 3, 2019, 9 pages.
Extended European Search Report received for European Patent Application No. 18172554.0, mailed on Aug. 3, 2018, 10 pages.
Extended European Search Report received for European Patent Application No. 20180900.1, mailed on Sep. 18, 2020, 7 pages.
Extended European Search Report received for European Patent Application No. 21169911.1, mailed on Sep. 20, 2021, 9 pages.
Extended European Search Report received for European Patent Application No. 21177569.7, mailed on Sep. 20, 2021, 8 pages.
Extended European Search Report received for European Patent Application No. 23176305.3, mailed on Sep. 13, 2023, 8 pages.
Final Office Action received for U.S. Appl. No. 15/713,544, mailed on Jul. 19, 2019, 20 pages.
Final Office Action received for U.S. Appl. No. 15/713,544, mailed on May 20, 2020, 14 pages.
Final Office Action received for U.S. Appl. No. 15/791,829, mailed on Mar. 7, 2019, 23 pages.
Final Office Action received for U.S. Appl. No. 16/584,281, mailed on Apr. 15, 2020, 26 pages,.
Final Office Action received for U.S. Appl. No. 16/585,721, mailed on Apr. 1, 2020, 28 pages.
Final Office Action received for U.S. Appl. No. 16/792,096, mailed on Aug. 9, 2021, 17 pages.
Final Office Action received for U.S. Appl. No. 17/158,936, mailed on Apr. 7, 2023, 18 pages.
Final Office Action received for U.S. Appl. No. 17/546,630, mailed on Jun. 27, 2023, 31 pages.
Final Office Action received for U.S. Appl. No. 17/676,034, mailed on Jul. 24, 2023, 19 pages.
Final Office Action received for U.S. Appl. No. 17/697,749, mailed on Aug. 10, 2023, 8 pages.
Haidar ,Rawand, "How to Use Android Wear Smartwatch as a Flashlight!", Available online at : <https://howto.highonandroid.com/android-wear-tutorials/how-to-use-android-wear-smartwatch-as-a-flashlight-flashlight-app/>, Sep. 13, 2015, 6 pages.
Hoffman, Chris, "5+ Cool Uses for Android's Daydream Mode", retrieved from—https://www.howtogeek.com/170990/5-cool-uses-for-androids-daydream-mode, Jul. 12, 2017, 8 pages.
HOLLYWOODFRODO,"Free Flashlight Android App by Asus Best Flashlight App on Google Play", Online Available at: <https://www.youtube.com/watch?v=K_kFa?PoVsc>, Sep. 9, 2016, 3 pages.
Houben et al., "WatchConnect: a Toolkit for Prototyping Smartwatch-Centric Cross-Device Applications", Proceedings of the 33rd Annual ACM Conference on Human Factors in Computing Systems, Online available at: https://dl.acm.org/doi/10.1145/2702123.2702215, 2015, pp. 1247-1256.
Huawei Watch FAQs-en_us-V2.8, Online available at https://maplindownloads.s3-eu-west-1.amazonaws.com/A27WH-9512.pdf, Apr. 11, 2016, 135 pages.
Intention to Grant received for Danish Patent Application No. PA201770387, mailed on Apr. 4, 2018, 2 pages.
Intention to Grant received for Danish Patent Application No. PA201770387, mailed on May 24, 2018, 2 pages.
Intention to Grant Received for Danish Patent Application No. PA201970596, mailed on Dec. 1, 2020, 2 pages.
Intention to Grant received for Danish Patent Application No. PA201970597, mailed on Apr. 20, 2021, 2 pages.
Intention to Grant received for European Patent Application No. 18172554.0, mailed on Feb. 17, 2020, 8 pages.
Intention to Grant received for European Patent Application No. 20761084.1, mailed on Mar. 27, 2023, 10 pages.

(56) References Cited

OTHER PUBLICATIONS

Intention to Grant received for European Patent Application No. 21169911.1, mailed on Mar. 6, 2023, 9 pages.
Intention to Grant received for European Patent Application No. 21177569.7, mailed on Oct. 27, 2022, 8 pages.
International Preliminary Report on Patentability received for PCT Patent Application No. PCT/US2017/049793, mailed on Apr. 4, 2019, 15 pages.
International Preliminary Report on Patentability received for PCT Patent Application No. PCT/US2018/032385, mailed on Nov. 28, 2019, 10 pages.
International Preliminary Report on Patentability received for PCT Patent Application No. PCT/US2020/045814, mailed on Mar. 17, 2022, 12 pages.
International Preliminary Report on Patentability received for PCT Patent Application No. PCT/US2022/026371, mailed on Nov. 9, 2023, 11 pages.
International Search Report and Written Opinion received for PCT Patent Application No. PCT/US2017/049793, mailed on Dec. 27, 2017, 19 pages.
International Search Report and Written Opinion received for PCT Patent Application No. PCT/US2018/032385 mailed on Aug. 3, 2018, 14 pages.
International Search Report and Written Opinion received for PCT Patent Application No. PCT/US2020/045814, mailed on Jan. 20, 2021, 16 pages.
International Search Report and Written Opinion received for PCT Patent Application No. PCT/US2022/026371, mailed on Oct. 12, 2022, 16 pages.
International Search Report and Written Opinion received for PCT Patent Application No. PCT/US2023/021409, mailed on Nov. 9, 2023, 23 pages.
Invitation to Pay Additional Fees and Partial International Search Report received for PCT Patent Application No. PCT/US2023/021409, mailed on Sep. 19, 2023, 17 pages.
Invitation to Pay Additional Fees received for PCT Patent Application No. PCT/US2017/049793, mailed on Nov. 3, 2017, 2 pages.
Invitation to Pay Additional Fees received for PCT Patent Application No. PCT/US2020/045814, mailed on Nov. 18, 2020, 11 pages.
Invitation to Pay Additional Fees received for PCT Patent Application No. PCT/US2022/026371, mailed on Aug. 18, 2022, 9 pages.
Invitation to Pay Search Fees received for European Patent Application No. 20761084.1, mailed on Dec. 7, 2021, 3 pages.
Jahpizzie, "Brightness on Lock Screen", Online Available at: https://www.reddit.com/r/galaxys10/comments/b4d5fb/brightness_on_lock_screen/, 2019. 1 page.
Kubo et al., "Watch Commander: a Gesture-based Invocation System for Rectangular Smartwatches using B2B-Swipe", UIST'16 Adjunct, Available online at: https://dl.acm.org/doi/pdf/10.1145/2984751.2985697, Oct. 16-19, 2016, pp. 37-39.
Non-Final Office Action received for U.S. Appl. No. 15/713,544, mailed on Dec. 11, 2019, 19 pages.
Non-Final Office Action received for U.S. Appl. No. 15/713,544, mailed on Jan. 24, 2019, 16 pages.
Non-Final Office Action received for U.S. Appl. No. 15/791,829, mailed on Nov. 8, 2018, 18 pages.
Non-Final Office Action received for U.S. Appl. No. 16/584,281, mailed on Dec. 10, 2019, 23 pages.
Non-Final Office Action received for U.S. Appl. No. 16/584,445, mailed on Dec. 26, 2019, 19 pages.
Non-Final Office Action received for U.S. Appl. No. 16/585,714, mailed on Apr. 16, 2020, 18 pages.
Non-Final Office Action received for U.S. Appl. No. 16/585,721, mailed on Dec. 27, 2019, 25 pages.
Non-Final Office Action received for U.S. Appl. No. 16/792,096, mailed on Feb. 12, 2021, 16 pages.
Non-Final Office Action received for U.S. Appl. No. 17/158,936, mailed on Nov. 30, 2022, 17 pages.
Non-Final Office Action received for U.S. Appl. No. 17/546,630, mailed on Mar. 30, 2023, 41 pages.
Non-Final Office Action received for U.S. Appl. No. 17/546,630, mailed on Oct. 3, 2023, 36 pages.
Non-Final Office Action received for U.S. Appl. No. 17/676,034, mailed on Jan. 24, 2023, 15 pages.
Non-Final Office Action received for U.S. Appl. No. 17/676,034, mailed on Oct. 11, 2023, 23 pages.
Non-Final Office Action received for U.S. Appl. No. 17/697,749, mailed on Dec. 4, 2023, 21 pages.
Non-Final Office Action received for U.S. Appl. No. 17/697,749, mailed on Mar. 27, 2023, 20 pages.
Normalsaline154, Looking For a Launcher That Changes The Default Homescreen or Widgets Based on Wifi, Location, or Other Context, Online Available at: https://www.reddit.com/r/androidapps/comments/35lu90/looking_for_a_launcher_that_changes_the_default/, 2015, 2 pages.
Notice of Acceptance received for Australian Patent Application No. 2017330211, mailed on May 11, 2020, 3 pages.
Notice of Acceptance received for Australian Patent Application No. 2020217354, mailed on May 31, 2022, 3 pages.
Notice of Acceptance received for Australian Patent Application No. 2020309093, mailed on Jul. 8, 2021, 3 pages.
Notice of Acceptance received for Australian Patent Application No. 2021202834, mailed on Jul. 15, 2021, 3 pages.
Notice of Acceptance received for Australian Patent Application No. 2021202836, mailed on Jun. 25, 2021, 3 pages.
Notice of Acceptance received for Australian Patent Application No. 2021245228, mailed on Oct. 4, 2022, 3 pages.
Notice of Acceptance received for Australian Patent Application No. 2022287595, mailed on Aug. 29, 2023, 3 pages.
Notice of Allowance received for Chinese Patent Application No. 201780002643.1, mailed on Jan. 6, 2022, 5 pages.
Notice of Allowance received for Chinese Patent Application No. 202110194015.6, mailed on Mar. 9, 2022, 6 pages.
Notice of Allowance received for Chinese Patent Application No. 202110454541.1, mailed on May 31, 2022, 6 pages.
Notice of Allowance received for Japanese Patent Application No. 2019-511611, mailed on Jul. 20, 2020, 4 pages.
Notice of Allowance received for Japanese Patent Application No. 2020-137007, mailed on May 29, 2023, 5 pages.
Notice of Allowance received for Japanese Patent Application No. 2022-512865, mailed on Oct. 3, 2022, 4 pages.
Notice of Allowance received for Korean Patent Application No. 10-2019-7005734, mailed on Oct. 20, 2020, 4 pages.
Notice of Allowance received for Korean Patent Application No. 10-2021-7002083, mailed on Jun. 18, 2021, 5 pages.
Notice of Allowance received for Korean Patent Application No. 10-2021-7002597, mailed on Feb. 25, 2021, 5 pages.
Notice of Allowance received for Korean Patent Application No. 10-2021-7013453, mailed on Aug. 11, 2021, 5 pages.
Notice of Allowance received for Korean Patent Application No. 10-2021-7013454, mailed on Aug. 12, 2021, 4 pages.
Notice of Allowance received for Korean Patent Application No. 10-2021-7030552, mailed on May 6, 2022, 5 pages.
Notice of Allowance received for Korean Patent Application No. 10-2021-7036678, mailed on Mar. 7, 2022, 5 pages.
Notice of Allowance received for Korean Patent Application No. 10-2022-7019205, mailed on Jan. 5, 2023, 8 pages.
Notice of Allowance received for Korean Patent Application No. 10-2022-7027441, mailed on Dec. 2, 2022, 7 pages.
Notice of Allowance received for Korean Patent Application No. 10-2023-7011744, mailed on Sep. 4, 2023, 8 pages.
Notice of Allowance received for Korean Patent Application No. 10-2023-7040267, mailed on Dec. 5, 2023, 8 pages.
Notice of Allowance received for U.S. Appl. No. 15/713,544, mailed on Jan. 14, 2022, 5 pages.
Notice of Allowance received for U.S. Appl. No. 15/791,829, mailed on Oct. 4, 2019, 9 pages.
Notice of Allowance received for U.S. Appl. No. 16/584,281, mailed on Nov. 18, 2020, 8 pages.
Notice of Allowance received for U.S. Appl. No. 16/584,281, mailed on Sep. 29, 2020, 5 pages.

(56) References Cited

OTHER PUBLICATIONS

Notice of Allowance received for U.S. Appl. No. 16/584,445, mailed on Apr. 17, 2020, 9 pages.
Notice of Allowance received for U.S. Appl. No. 16/584,445, mailed on Jul. 23, 2020, 8 pages.
Notice of Allowance received for U.S. Appl. No. 16/584,445, mailed on Jun. 24, 2020, 5 pages.
Notice of Allowance received for U.S. Appl. No. 16/584,445, mailed on May 29, 2020, 5 pages.
Notice of Allowance received for U.S. Appl. No. 16/584,445, mailed on Oct. 21, 2020, 6 pages.
Notice of Allowance received for U.S. Appl. No. 16/585,714, mailed on Jan. 8, 2021, 8 pages.
Notice of Allowance received for U.S. Appl. No. 16/585,714, mailed on Jan. 27, 2021, 2 pages.
Notice of Allowance received for U.S. Appl. No. 16/585,714, mailed on Sep. 25, 2020, 15 pages.
Notice of Allowance received for U.S. Appl. No. 16/585,721, mailed on Oct. 30, 2020, 9 pages.
Notice of Allowance received for U.S. Appl. No. 16/585,721, mailed on Sep. 30, 2020, 15 pages.
Notice of Allowance received for U.S. Appl. No. 16/792,096, mailed on Dec. 29, 2021, 11 pages.
Notice of Allowance received for U.S. Appl. No. 17/676,034, mailed on Nov. 17, 2023, 9 pages.
Nova Launcher—Lock Screen Edit, Online Available at: https://forums.androidcentral.com/ask-question/835057-nova-launcher-lock-screen~edit.html, Sep. 2017, 2 pages.
Office Action and Search Report received for Danish Patent Application No. PA201970598, mailed on Jan. 28, 2020, 6 pages.
Office Action received for Australian Patent Application No. 2017330211, mailed on Dec. 5, 2019, 3 pages.
Office Action received for Australian Patent Application No. 2018100179, mailed on Jun. 4, 2018, 4 pages.
Office Action received for Australian Patent Application No. 2018100179, mailed on Nov. 11, 2018, 7 pages.
Office Action received for Australian Patent Application No. 2018100179, mailed on Sep. 14, 2018, 4 pages.
Office Action received for Australian Patent Application No. 2020102158, mailed on Apr. 27, 2021, 5 pages.
Office Action received for Australian Patent Application No. 2020102158, mailed on Dec. 8, 2020, 9 pages.
Office Action received for Australian Patent Application No. 2020217354, mailed on Jan. 17, 2022, 5 pages.
Office Action received for Australian Patent Application No. 2020217354, mailed on Jul. 22, 2021, 3 pages.
Office Action received for Australian Patent Application No. 2020309093, mailed on Jan. 21, 2021, 3 pages.
Office Action received for Australian Patent Application No. 2021202834, mailed on May 28, 2021, 2 pages.
Office Action received for Australian Patent Application No. 2021245228, mailed on Aug. 31, 2022, 2 pages.
Office Action received for Australian Patent Application No. 2022228204, mailed on Jul. 27, 2023, 5 pages.
Office Action received for Australian Patent Application No. 2022287595, mailed on Jul. 20, 2023, 3 pages.
Office Action received for Chinese Patent Application No. 201780002643.1, mailed on Aug. 2, 2021, 20 pages.
Office Action received for Chinese Patent Application No. 201780002643.1, mailed on Dec. 31, 2020, 26 pages.
Office Action received for Chinese Patent Application No. 201780002643.1, mailed on Jun. 17, 2020, 30 pages.
Office Action received for Chinese Patent Application No. 201810467061.7, mailed on Apr. 11, 2022, 19 pages.
Office Action received for Chinese Patent Application No. 201810467061.7, mailed on Aug. 15, 2019, 13 pages.
Office Action received for Chinese Patent Application No. 201810467061.7, mailed on Feb. 22, 2019, 19 pages.
Office Action received for Chinese Patent Application No. 201810467061.7, mailed on Jun. 22, 2022, 15 pages.
Office Action received for Chinese Patent Application No. 2018104670617, mailed on Feb. 18, 2020, 12 pages.
Office Action received for Chinese Patent Application No. 202110194015.6, mailed on Sep. 28, 2021, 13 pages.
Office Action received for Chinese Patent Application No. 202110453180.9, mailed on Dec. 26, 2022, 13 pages. .
Office Action received for Chinese Patent Application No. 202110453180.9, mailed on Jun. 16, 2022, 14 pages.
Office Action received for Chinese Patent Application No. 202110453180.9, mailed on Nov. 8, 2021, 21 pages.
Office Action received for Chinese Patent Application No. 202110454541.1, mailed on Oct. 20, 2021, 19 pages. .
Office Action received for Chinese Patent Application No. 202210263607.3, mailed on October 23, 2023, 18 pages.
Office Action received for Chinese Patent Application No. 202210265746.X, mailed on Oct. 11, 2023, 13 pages.
Office Action received for Danish Patent Application No. PA201770387, mailed on Feb. 1, 2018, 3 pages.
Office Action received for Danish Patent Application No. PA201970596, mailed on May 6, 2020, 4 pages.
Office Action received for Danish Patent Application No. PA201970597, mailed on Oct. 29, 2020, 4 pages.
Office Action received for Danish Patent Application No. PA201970598, mailed on Apr. 15, 2021, 6 pages.
Office Action received for Danish Patent Application No. PA201970598, mailed on Oct. 9, 2020, 4 pages. .
Office Action received for Danish Patent Application No. PA201970599, mailed on Jan. 23, 2020, 6 pages.
Office Action received for Danish Patent Application No. PA201970599, mailed on Mar. 1, 2021, 4 pages.
Office Action received for Danish Patent Application No. PA201970599, mailed on May 27, 2020, 4 pages.
Office Action received for European Patent Application No. 17853656.1, mailed on Mar. 25, 2021, 8 pages.
Office Action received for European Patent Application No. 17853656.1, mailed on May 3, 2022, 7 pages.
Office Action received for European Patent Application No. 18172554.0, mailed on Jul. 12, 2019, 10 pages.
Office Action received for European Patent Application No. 20180900.1, mailed on Dec. 21, 2023, 5 pages.
Office Action received for European Patent Application No. 20180900.1, mailed on Feb. 14, 2022, 8 pages.
Office Action received for European Patent Application No. 20180900.1, mailed on May 3, 2023, 6 pages.
Office Action received for European Patent Application No. 20761084.1, mailed on Dec. 14, 2022, 5 pages.
Office Action received for European Patent Application No. 20761084.1, mailed on May 9, 2022, 9 pages.
Office Action received for European Patent Application No. 21169911.1, mailed on Dec. 1, 2022, 4 pages.
Office Action received for European Patent Application No. 21169911.1, mailed on Jun. 3, 2022, 5 pages.
Office Action received for European Patent Application No. 21177569.7, mailed on Jun. 9, 2022, 5 pages.
Office Action received for Indian Patent Application No. 202118025047, mailed on Apr. 26, 2022, 6 pages.
Office Action received for Indian Patent Application No. 202118025048, mailed on Sep. 22, 2023, 8 pages.
Office Action received for Japanese Patent Application No. 2019-511611, mailed on Feb. 28, 2020, 4 pages.
Office Action received for Japanese Patent Application No. 2020-137007, mailed on Feb. 10, 2023, 4 pages.
Office Action received for Japanese Patent Application No. 2020-137007, mailed on Jun. 21, 2021, 7 pages.
Office Action received for Japanese Patent Application No. 2020-137007, mailed on May 9, 2022, 8 pages.
Office Action received for Japanese Patent Application No. 2022-174879, mailed on Dec. 8, 2023, 8 pages.
Office Action received for Korean Patent Application No. 10-2019-7005734, mailed on Feb. 24, 2020, 13 pages.
Office Action received for Korean Patent Application No. 10-2019-7005734, mailed on Jul. 14, 2020, 8 pages.

(56) References Cited

OTHER PUBLICATIONS

Office Action received for Korean Patent Application No. 10-2021-7002083, mailed on Feb. 10, 2021, 7 pages.
Office Action received for Korean Patent Application No. 10-2021-7013453, mailed on Jun. 5, 2021, 6 pages.
Office Action received for Korean Patent Application No. 10-2021-7013454, mailed on Jun. 5, 2021, 6 pages.
Office Action received for Korean Patent Application No. 10-2021-7030552, mailed on Nov. 22, 2021, 14 pages.
Office Action received for Korean Patent Application No. 10-2021-7036678, mailed on Dec. 22, 2021, 6 pages.
Office Action received for Korean Patent Application No. 10-2022-7019205, mailed on Sep. 21, 2022, 6 pages.
Office Action received for Korean Patent Application No. 10-2022-7027441, mailed on Aug. 24, 2022, 11 pages.
Office Action received for Korean Patent Application No. 10-2023-7011744, mailed on May 15, 2023, 11 pages.
Phandroid, "New Android Wear Wrist Gestures in Marshmallow", Available online at: https://www.youtube.com/watch?v=0WhKuklpQ9A, Feb. 11, 2016, 3 pages.
Search Report and Opinion received for Danish Patent Application No. PA201770387, mailed on Oct. 12, 2017, 8 pages.
Search Report and Opinion received for Danish Patent Application No. PA201970596, mailed on Dec. 4, 2019, 11 pages.
Search Report and Opinion received for Danish Patent Application No. PA201970597, mailed on Dec. 18, 2019, 10 pages.
Search Report and Opinion received for Danish Patent Application No. PA201970598. mailed on Oct. 31, 2019, 9 pages.
Search Report and Opinion received for Danish Patent Application No. PA201970599, mailed on Nov. 8, 2019, 12 pages.
Spears, Ann, "dimming screen before/instead of screensaver?", retrieved from ~ https://discussions.apple.com/thread/339700, Jan. 28, 2006, 1 page.
Supplemental Notice of Allowance received for U.S. Appl. No. 17/676,034, mailed on Feb. 14, 2024, 4 pages.
Supplemental Notice of Allowance received for U.S. Appl. No. 17/676,034, mailed on Mar. 4, 2024, 10 pages.
Wade,Cliff, "Get The Most Out of Nova Launcher: Changing Icon Sizes", Online Available at: https://www.androidguys.com/tips-tools/get-nova-launcher-changing-icon-sizes/, Nov. 16, 2015, 6 pages.
Wade, Cliff, "Get The Most Out of Nova Launcher: Customizing The Dock Contest Included)", Online Available at: https://www.androidguys.com/tips-tools/get-nova-launcher-customizing-dockcontest-included/, Dec. 1, 2015, 5 pages.
ZEPHYRNIX,"Steam's In-Game Home menu", Online Available at: <https://www.youtube.com/watch?v=jLoRFIPkcUw>, see 0:00-1:06., Feb. 15, 2011, 3 pages.
Applicant-Initiated Interview Summary received for U.S. Appl. No. 17/158,936, mailed on May 29, 2024, 4 pages.
Notice of Allowance received for Chinese Patent Application No. 202210265746.X, mailed on Apr. 25, 2024, 4 pages (1 page of English Translation and 3 pages of Official Copy).
Office Action received for Australian Patent Application No. 2022228204, mailed on Jul. 3, 2024, 6 pages.
Office Action received for Chinese Patent Application No. 202210263607.3, mailed on Apr. 15, 2024, 12 pages (4 pages of English Translation and 8 pages of Official Copy).
Office Action received for Japanese Patent Application No. 2023-560221, mailed on Jun. 28, 2024, 6 pages (3 pages of English Translation and 3 pages of Official Copy).
Supplemental Notice of Allowance received for U.S. Appl. No. 17/697,749, mailed on Jun. 14, 2024, 2 pages.
2012-189422, JP, A, Cited by the Japanese Patent Office in an Office Action for related Patent Application No. 2023-560221 on Jun. 28, 2024, 5.
2020-169845, JP, A, Cited by the Japanese Patent Office in an Office Action for related Patent Application No. 2023-560221 on Jun. 28, 2024, 5.
10-2014-0120470, KR, A, Cited by the Chinese Patent Office in an Office Action for related Patent Application No. 202210265746.X on Apr. 25, 2024, 2.
Office Action received for Japanese Patent Application No. 2023-105300, mailed on Oct. 4, 2024, 8 pages (4 pages of English Translation and 4 pages of Official Copy).
Supplemental Notice of Allowance received for U.S. Appl. No. 17/546,630, mailed on Oct. 1, 2024, 3 pages.
Applicant-Initiated Interview Summary received for U.S. Appl. No. 17/158,936, mailed on Oct. 18, 2024, 5 pages.
International Preliminary Report on Patentability received for PCT Patent Application No. PCT/US2023/021409, mailed on Nov. 21, 2024, 18 pages.
Notice of Allowance received for Japanese Patent Application No. 2024-067669, mailed on Oct. 25, 2024, 5 pages (1 page of English Translation and 4 pages of Official Copy).
Notice of Allowance received for Korean Patent Application No. 10-2024-7007452, mailed on Oct. 15, 2024, 8 pages (2 pages of English Translation and 6 pages of Official Copy).
Notice of Allowance received for U.S. Appl. No. 17/546,630, mailed on Nov. 15, 2024, 6 pages.
Office Action received for Chinese Patent Application No. 202210263607.3, mailed on Sep. 19, 2024, 10 pages (5 pages of English Translation and 5 pages of Official Copy).

\* cited by examiner

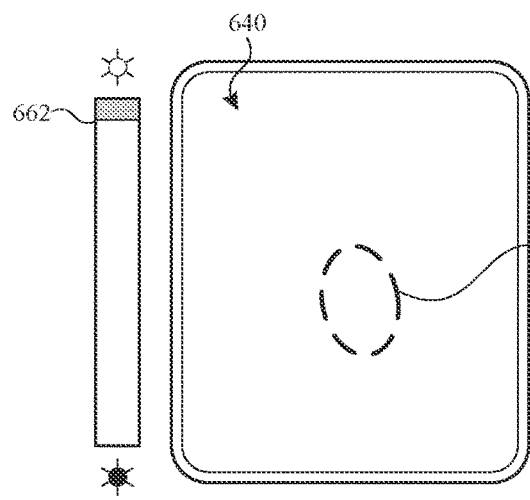
FIG. 6K
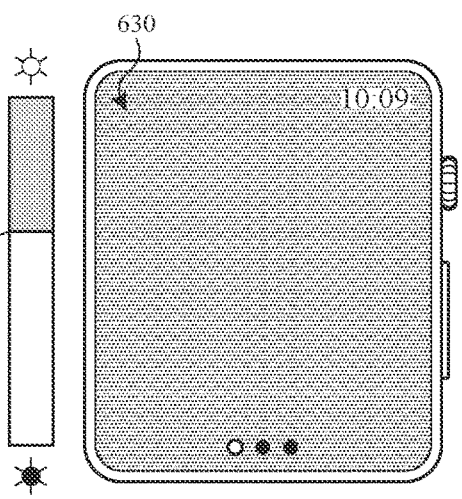
FIG. 6L
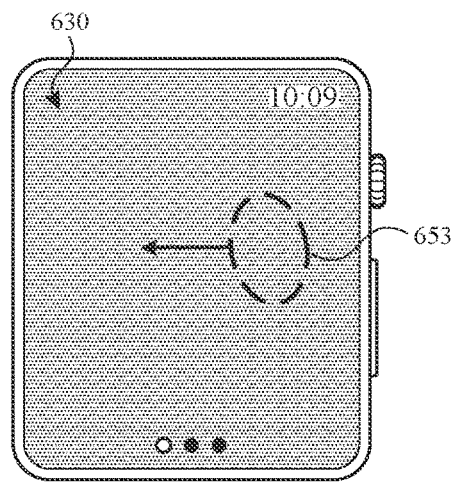
FIG. 6M
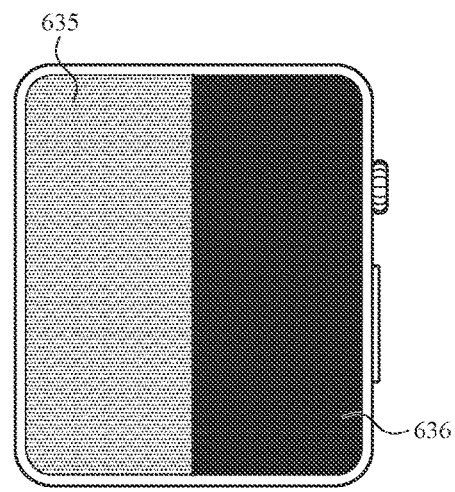
FIG. 6N
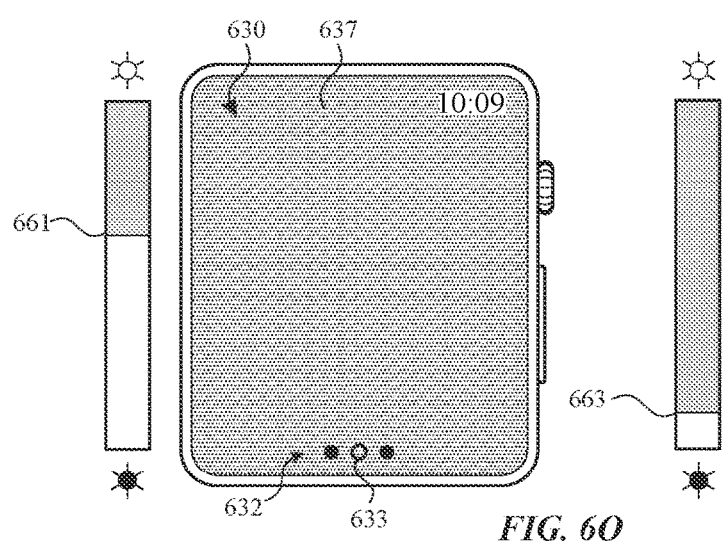
FIG. 6O
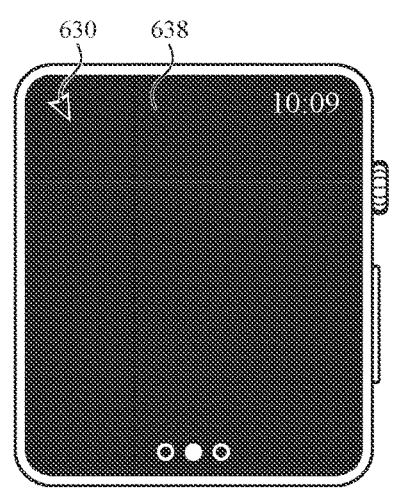

USER INTERFACE FOR A FLASHLIGHT MODE ON AN ELECTRONIC DEVICE

CROSS-REFERENCE TO RELATED APPLICATIONS

This application is a continuation of U.S. application Ser. No. 17/676,034, entitled "USER INTERFACE FOR A FLASHLIGHT MODE ON AN ELECTRONIC DEVICE", filed on Feb. 18, 2022, which is a continuation of U.S. application Ser. No. 16/792,096, now U.S. Pat. No. 11,257,464, entitled "USER INTERFACE FOR A FLASHLIGHT MODE ON AN ELECTRONIC DEVICE", filed on Feb. 14, 2020, which is a continuation of U.S. application Ser. No. 15/791,829, now U.S. Pat. No. 10,565,960, entitled "USER INTERFACE FOR A FLASHLIGHT MODE ON AN ELECTRONIC DEVICE", filed on Oct. 24, 2017, which claims priority to U.S. provisional patent application 62/506,866, entitled "USER INTERFACE FOR A FLASHLIGHT MODE ON AN ELECTRONIC DEVICE", filed on May 16, 2017, the contents of which are hereby incorporated by reference in their entirety.

FIELD

The present disclosure relates generally to computer user interfaces, and more specifically to techniques for providing a flashlight mode on an electronic device.

BACKGROUND

Many modern electronic devices are capable of detecting user inputs and include a display that emits visible light. In some devices, the display is sensitive to touch inputs. There is therefore an opportunity to use the input detection and display capability of such electronic devices to implement and control various applications that involve the emission of visible light.

BRIEF SUMMARY

Some devices include a dedicated light source (e.g., an LED, light bulb, camera flash, blinker, or the like) that can serve as a flashlight for illuminating the environment surrounding the device or drawing attention to the device (e.g., as a safety light, for example, for making drivers aware of the presence of a biker or jogger wearing or holding the device). Other devices do not include a dedicated light source, but have a display that emits visible light. Some techniques for operating the display, however, are generally not suitable and inefficient as a flashlight (e.g., for providing illumination so that a user can see a surrounding environment or for drawing attention to the device).

Accordingly, the present technique provides electronic devices with more effective and efficient methods and interfaces for implementing a flashlight mode using a display of the electronic device. Such methods and interfaces optionally complement or replace other methods for providing a flashlight mode. Such methods and interfaces reduce the cognitive burden on a user and produce a more efficient human-machine interface. For battery-operated computing devices, such methods and interfaces conserve power and increase the time between battery charges.

In some embodiments, a method is performed at an electronic device with a touch-sensitive display. While displaying a first user interface on the display, a first input on the display is detected. In response to detecting the first input on the display, a flashlight mode is entered. Entering the flashlight mode includes replacing the first user interface with a first flashlight user interface. The first flashlight user interface has a first total lumen output and a first luminance that is substantially uniform over the display. A determination is made whether brightness change criteria are met. In accordance with a determination that the brightness change criteria are met, a second flashlight user interface is displayed. The second flashlight user interface having a second total lumen output greater than the first total lumen output and a second luminance that is substantially uniform over the display.

In some embodiments, a non-transitory computer-readable storage medium stores one or more programs configured to be executed by one or more processors of an electronic device with a touch-sensitive display. The one or more programs include instructions for: while displaying a first user interface on the display, detecting a first input on the display; in response to detecting the first input on the display, entering a flashlight mode, where entering the flashlight mode includes replacing the first user interface with a first flashlight user interface, the first flashlight user interface having a first total lumen output and a first luminance that is substantially uniform over the display; determining whether brightness change criteria are met; and in accordance with a determination that the brightness change criteria are met, displaying a second flashlight user interface, the second flashlight user interface having a second total lumen output greater than the first total lumen output and a second luminance that is substantially uniform over the display.

In some embodiments, a transitory computer-readable storage medium stores one or more programs configured to be executed by one or more processors of an electronic device with a touch-sensitive display. The one or more programs include instructions for: while displaying a first user interface on the display, detecting a first input on the display; in response to detecting the first input on the display, entering a flashlight mode, where entering the flashlight mode includes replacing the first user interface with a first flashlight user interface, the first flashlight user interface having a first total lumen output and a first luminance that is substantially uniform over the display; determining whether brightness change criteria are met; and in accordance with a determination that the brightness change criteria are met, displaying a second flashlight user interface, the second flashlight user interface having a second total lumen output greater than the first total lumen output and a second luminance that is substantially uniform over the display.

In some embodiments, an electronic device includes a touch-sensitive display, one or more processors, and memory. The memory stores one or more programs configured to be executed by the one or more processors. The one or more programs including instructions for: while displaying a first user interface on the display, detecting a first input on the display; in response to detecting the first input on the display, entering a flashlight mode, where entering the flashlight mode includes replacing the first user interface with a first flashlight user interface, the first flashlight user interface having a first total lumen output and a first luminance that is substantially uniform over the display; determining whether brightness change criteria are met; and in accordance with a determination that the brightness change criteria are met, displaying a second flashlight user interface, the second flashlight user interface having a second total lumen output greater than the first total lumen output and a second luminance that is substantially uniform over the display.

In some embodiments, an electronic device includes: a touch-sensitive display; means for while displaying a first user interface on the display, detecting a first input on the display; means for, in response to detecting the first input on the display, entering a flashlight mode, where entering the flashlight mode includes replacing the first user interface with a first flashlight user interface, the first flashlight user interface having a first total lumen output and a first luminance that is substantially uniform over the display; means for determining whether brightness change criteria are met; and means for, in accordance with a determination that the brightness change criteria are met, displaying a second flashlight user interface, the second flashlight user interface having a second total lumen output greater than the first total lumen output and a second luminance that is substantially uniform over the display.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing a flashlight mode on an electronic device, thereby increasing the effectiveness, efficiency, and user satisfaction with such devices. Such methods and interfaces may complement or replace other methods for providing a flashlight mode on an electronic device.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
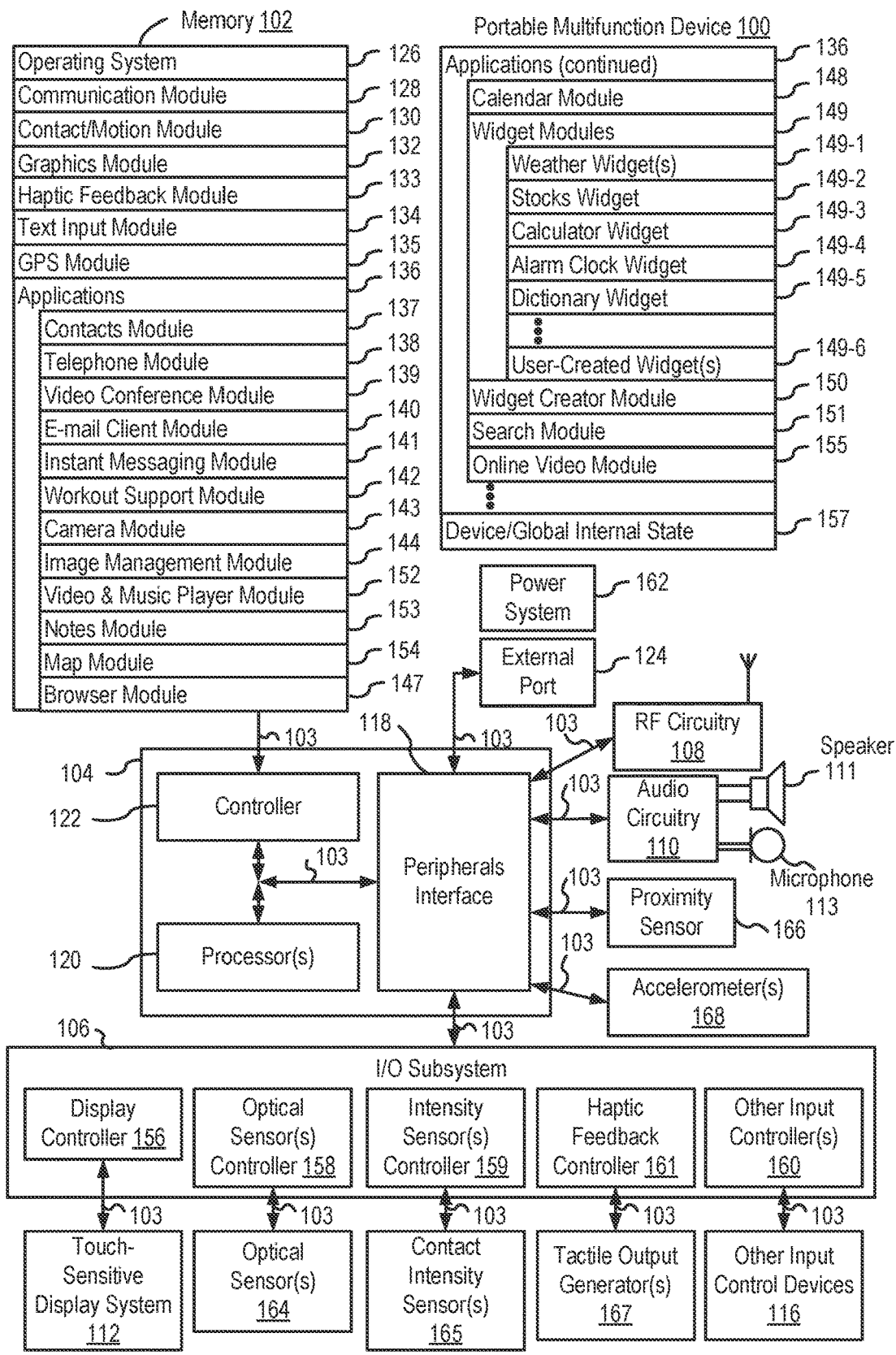
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for implementing a flashlight mode on an electronic device. In one example, a device provides a flashlight mode that displays a first flashlight user interface with a reduced or dimmed brightness. The dimmed interface provides a comfortable brightness level while the user views indications on the display about how to operate the flashlight mode and interacts with the display (e.g., to adjust characteristics of the flashlight mode). In accordance with a determination that certain criteria are met, the device transitions to a second flashlight user interface with an increased brightness that serves as a flashlight. Such techniques can reduce the cognitive burden on a user who accesses a flashlight mode on an electronic device, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for providing a flashlight mode on a display of an electronic device. FIGS. 6A-6AG illustrate exemplary user interfaces for a flashlight mode. FIGS. 7A-7D are a flow diagram illustrating methods of providing a flashlight mode in accordance with some embodiments. The user interfaces in FIGS. 6A-6AG are used to illustrate the processes described below, including the processes in FIGS. 7A-7D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. patent Publication No. 20050190059, "Acceleration-based Theft Detection System for Portable Electronic Devices," and U.S. patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
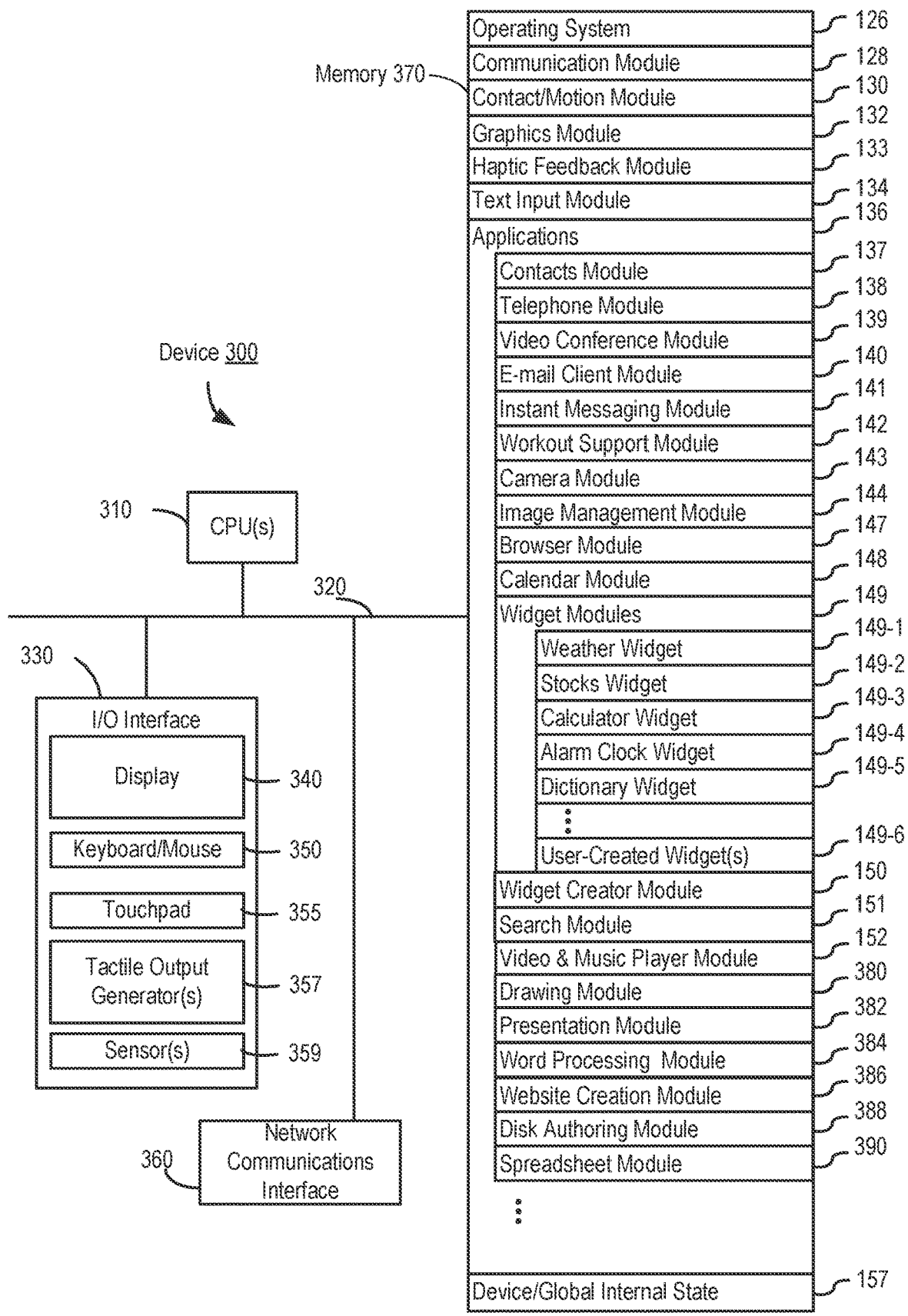
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
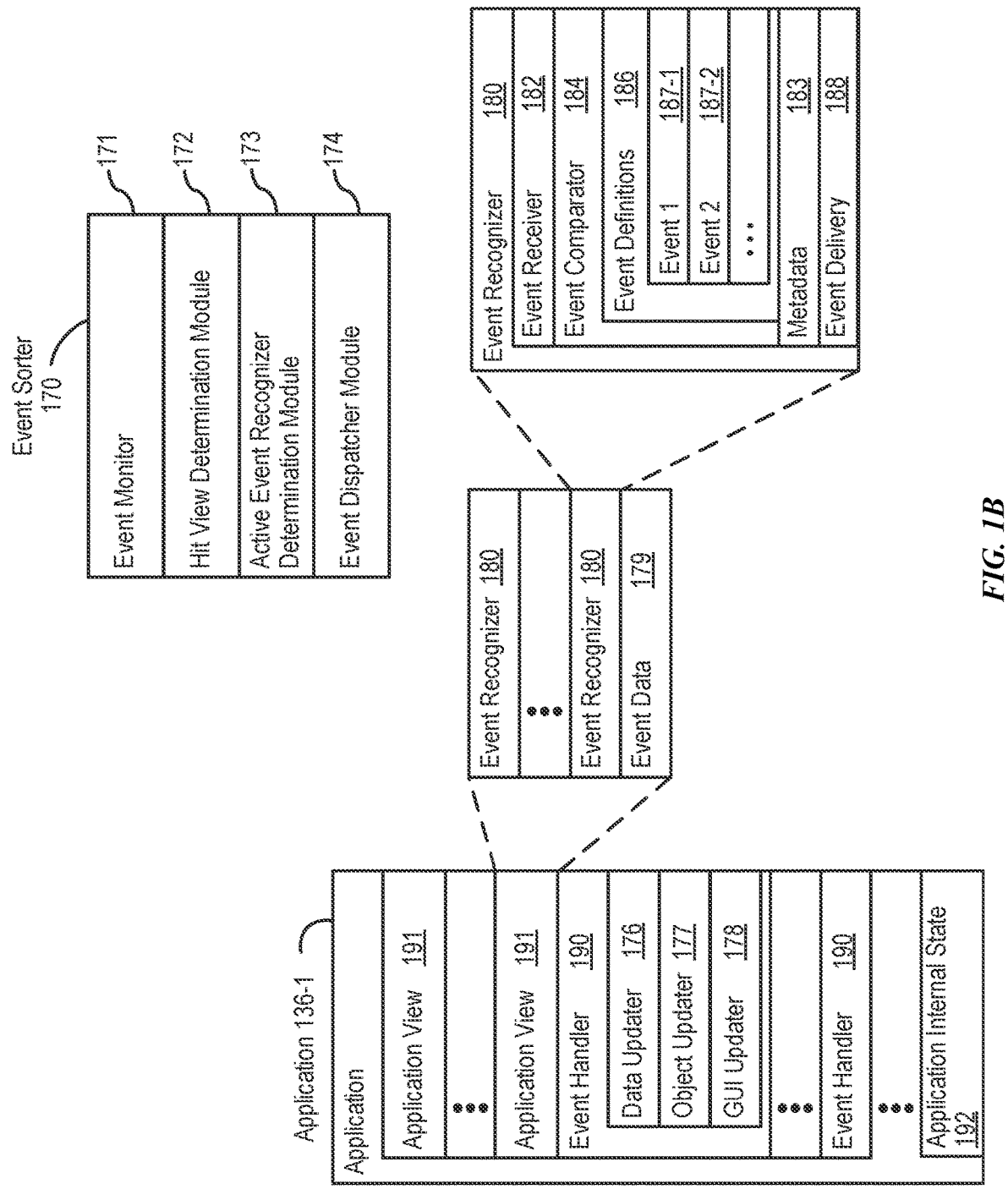
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
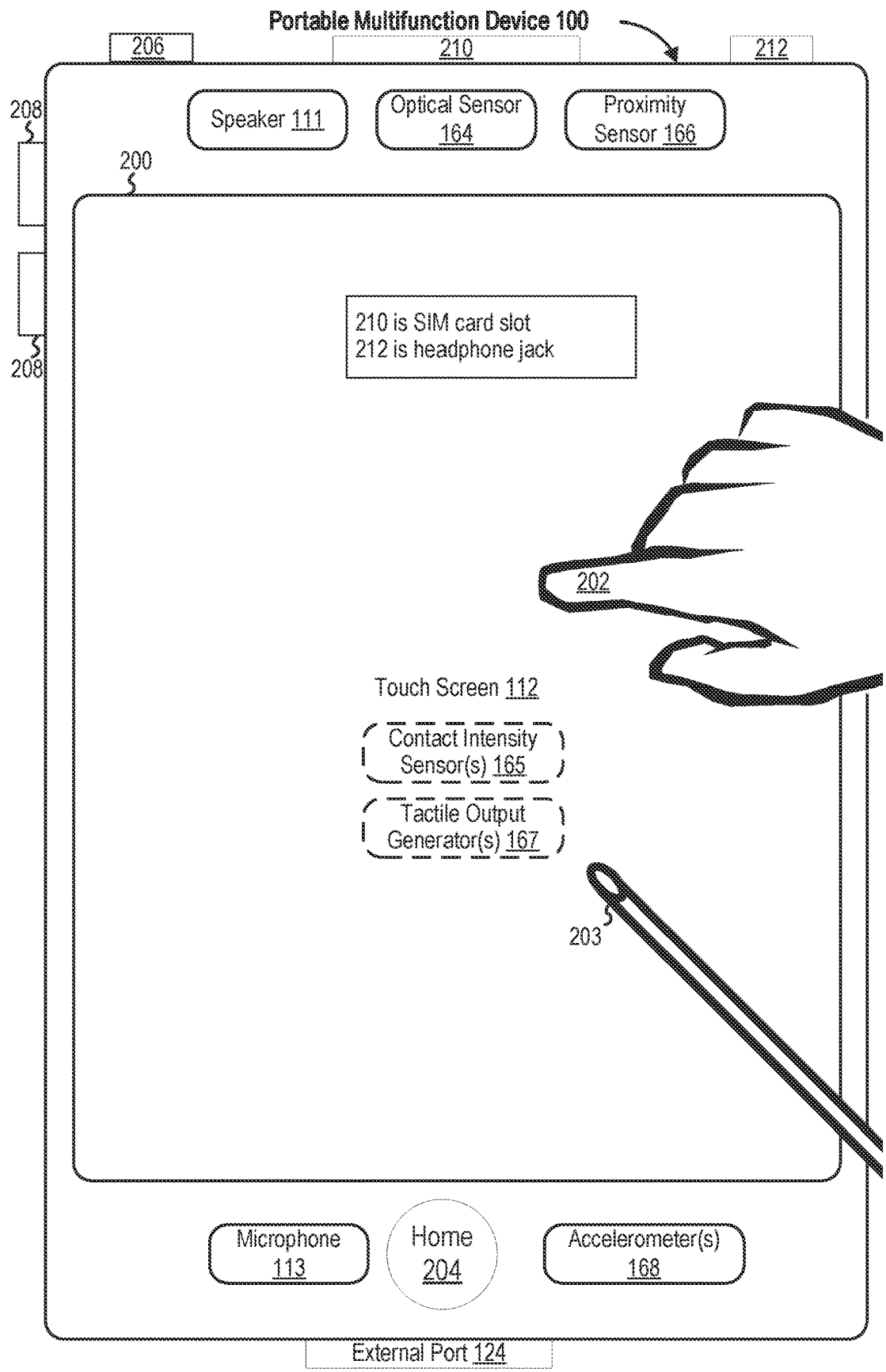
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
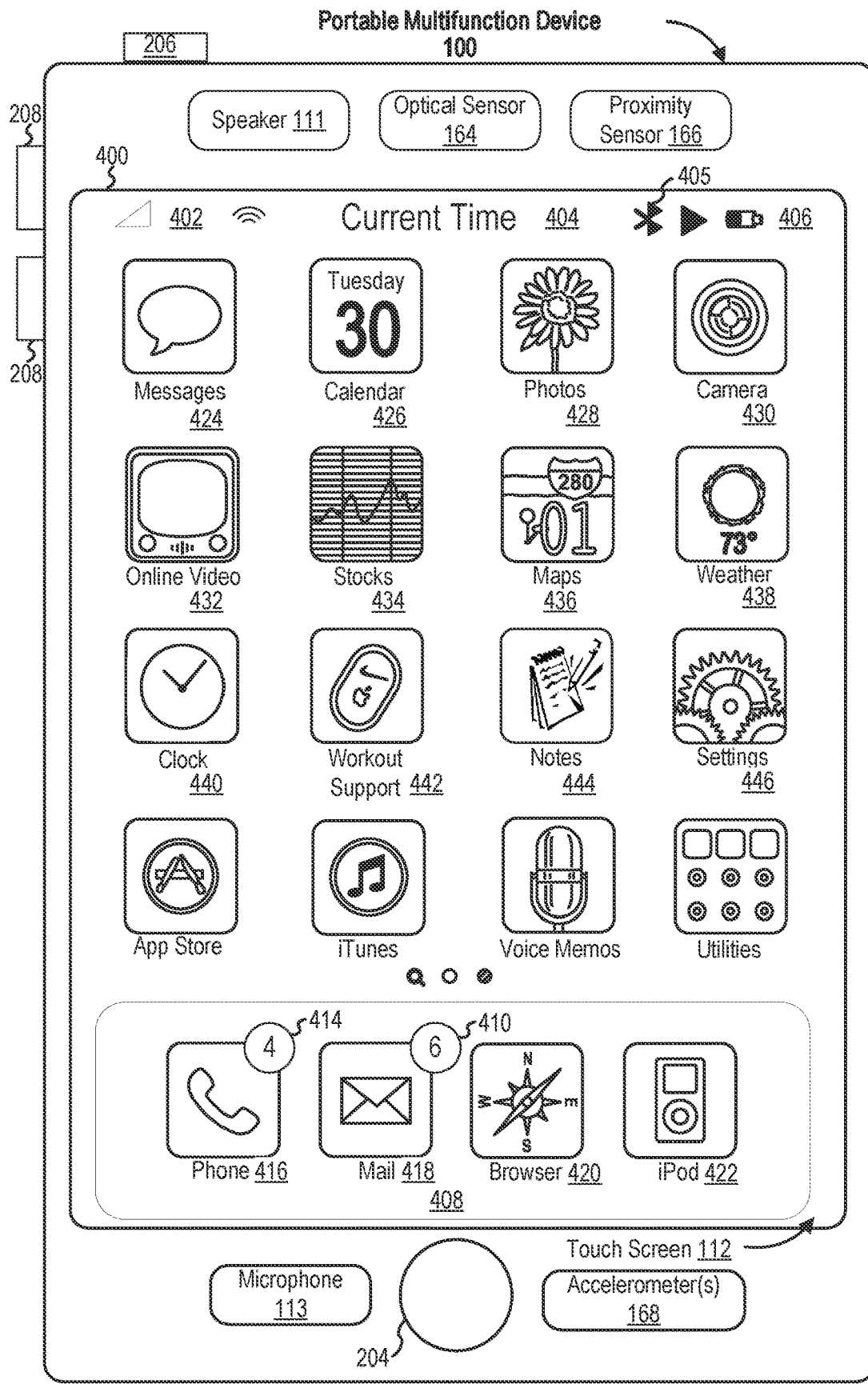
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
    - Icon 416 for telephone module 138, labeled "Phone," which optionally includes an indicator 414 of the number of missed calls or voicemail messages;
    - Icon 418 for e-mail client module 140, labeled "Mail," which optionally includes an indicator 410 of the number of unread e-mails;
    - Icon 420 for browser module 147, labeled "Browser;" and
    - Icon 422 for video and music player module 152, also referred to as iPod (trademark of Apple Inc.) module 152, labeled "iPod;" and
- Icons for other applications, such as:
    - Icon 424 for IM module 141, labeled "Messages;"
    - Icon 426 for calendar module 148, labeled "Calendar;"
    - Icon 428 for image management module 144, labeled "Photos;"
    - Icon 430 for camera module 143, labeled "Camera;"
    - Icon 432 for online video module 155, labeled "Online Video;"
    - Icon 434 for stocks widget 149-2, labeled "Stocks;"
    - Icon 436 for map module 154, labeled "Maps;"
    - Icon 438 for weather widget 149-1, labeled "Weather;"
    - Icon 440 for alarm clock widget 149-4, labeled "Clock;"
    - Icon 442 for workout support module 142, labeled "Workout Support;"
    - Icon 444 for notes module 153, labeled "Notes;" and
    - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
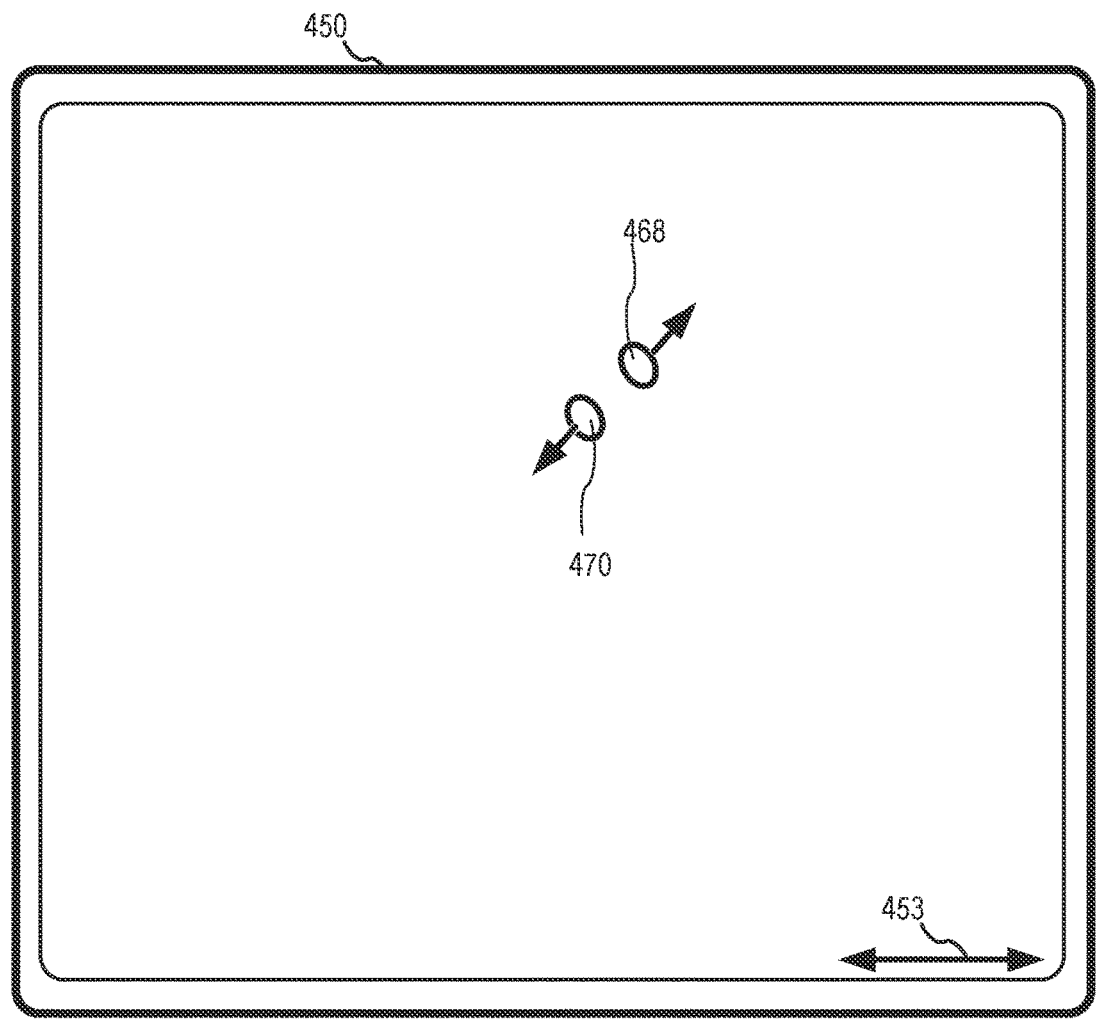
FIG. 4B illustrates an exemplary user interface for a multifunction device with a touch-sensitive surface that is separate from the display in accordance with some embodiments.
Figure 4B:
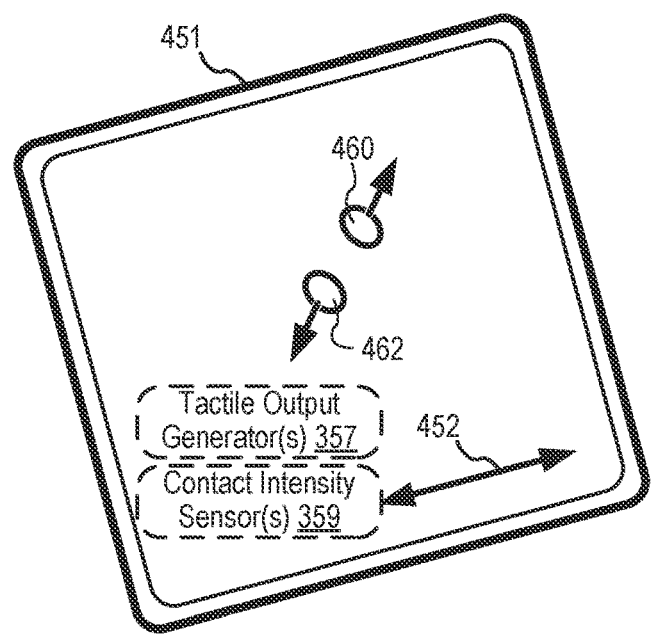

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
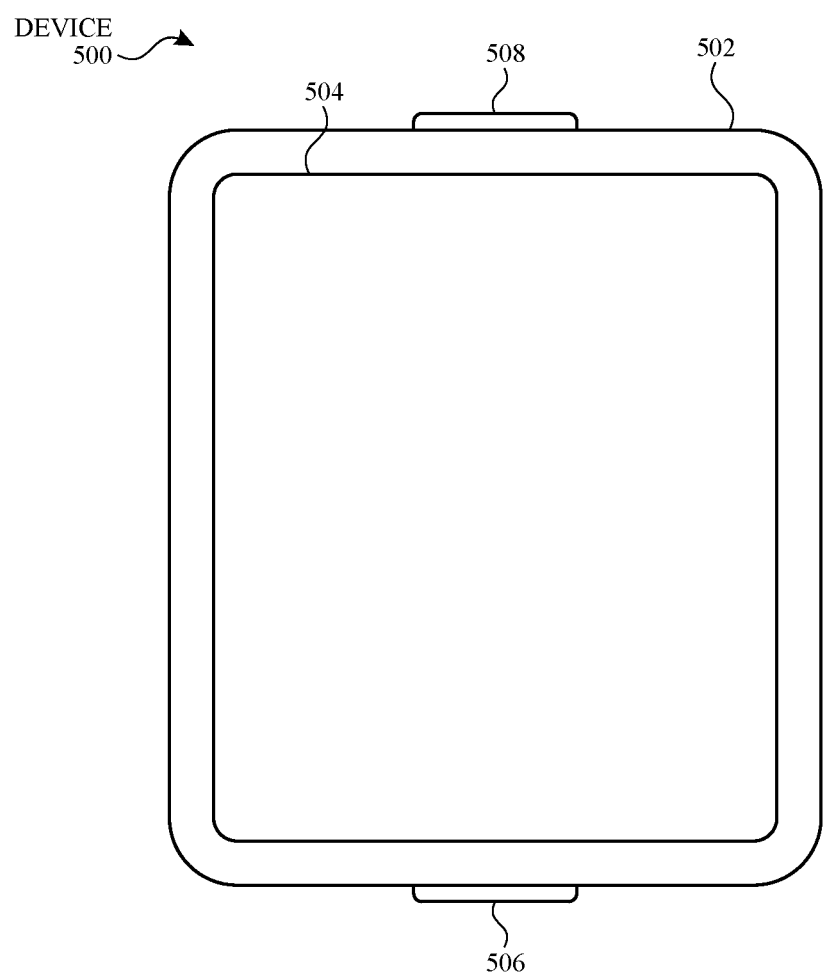
FIG. 5A illustrates a personal electronic device in accordance with some embodiments.
Figure 6A:
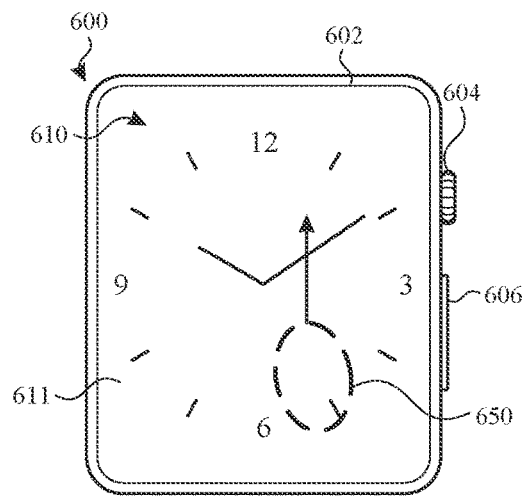
FIGS. 6A-6AG illustrate exemplary user interfaces in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
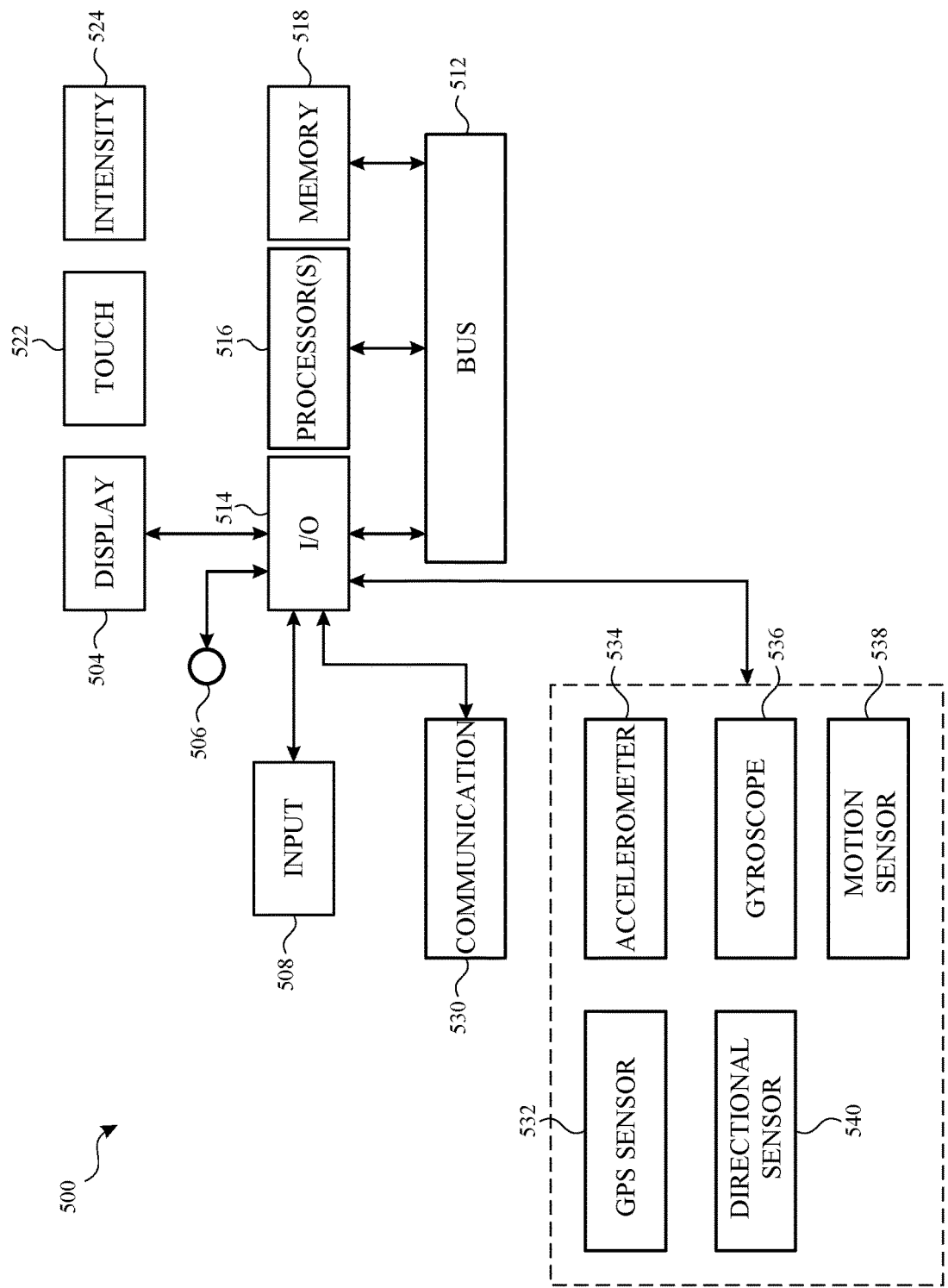
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
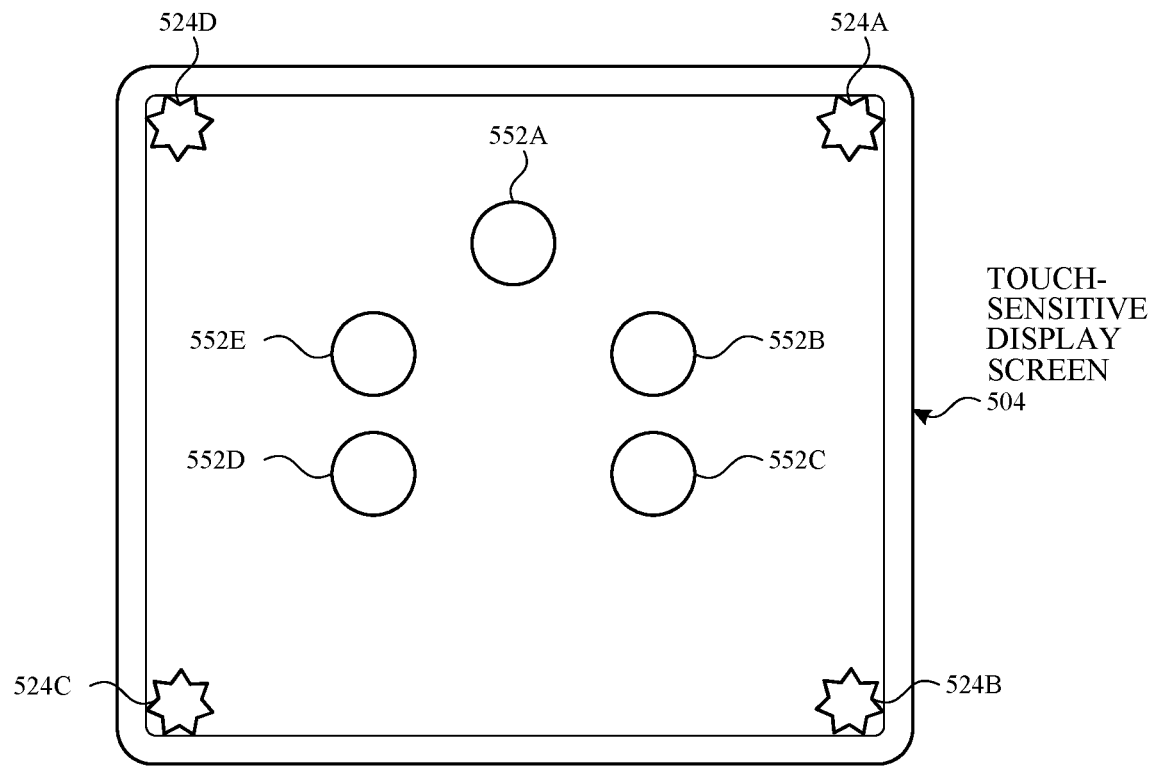
FIGS. 5C-5D illustrate exemplary components of a personal electronic device having a touch-sensitive display and intensity sensors in accordance with some embodiments.
Figure 5C:
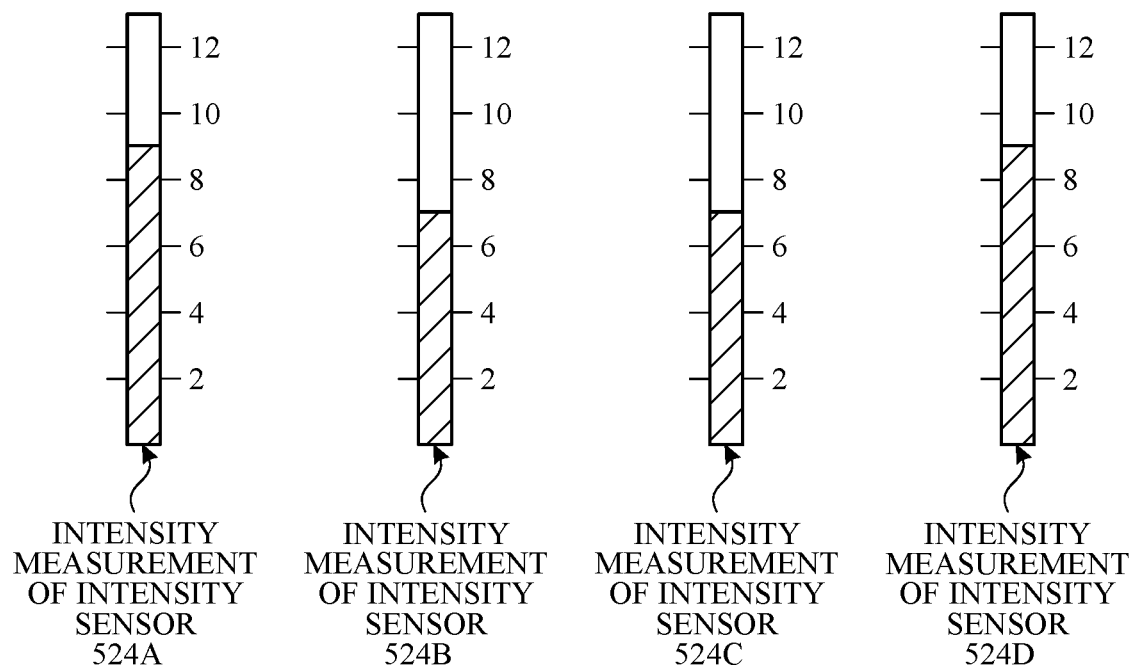
Figure 5D:
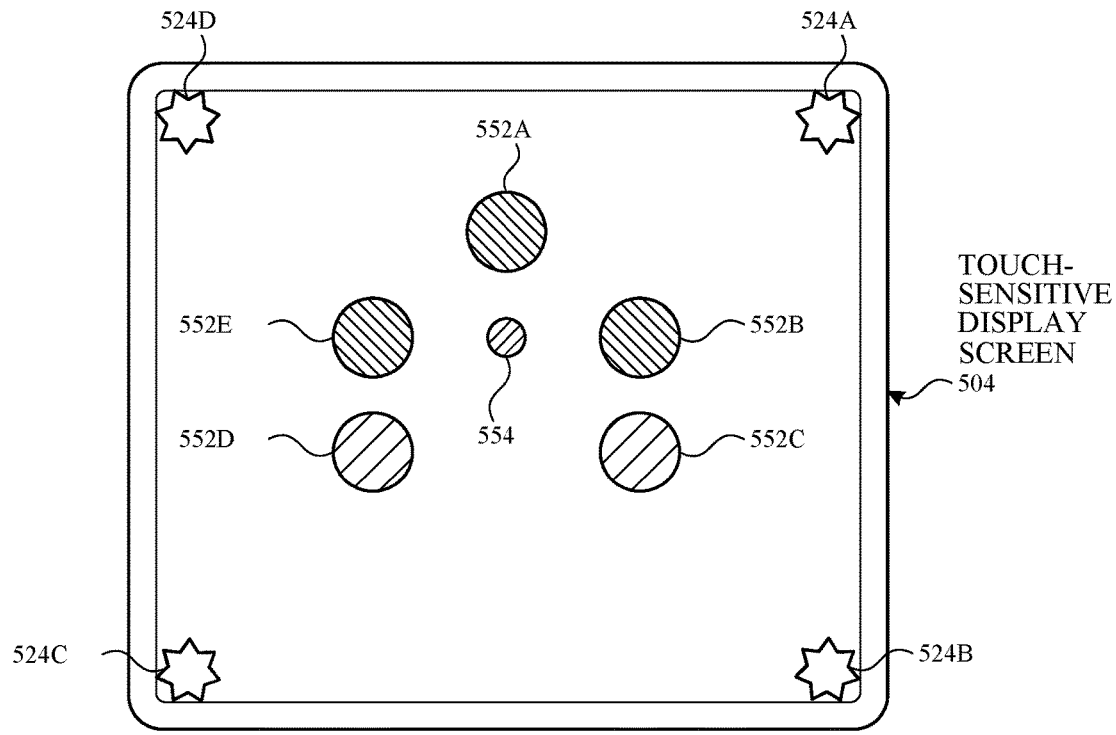
Figure 5D:
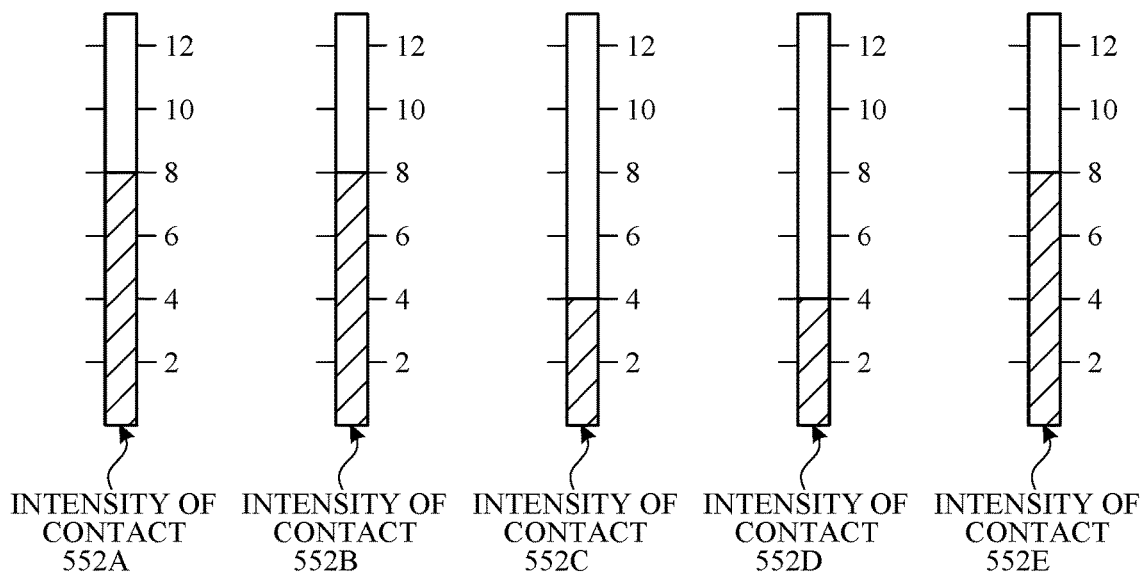

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
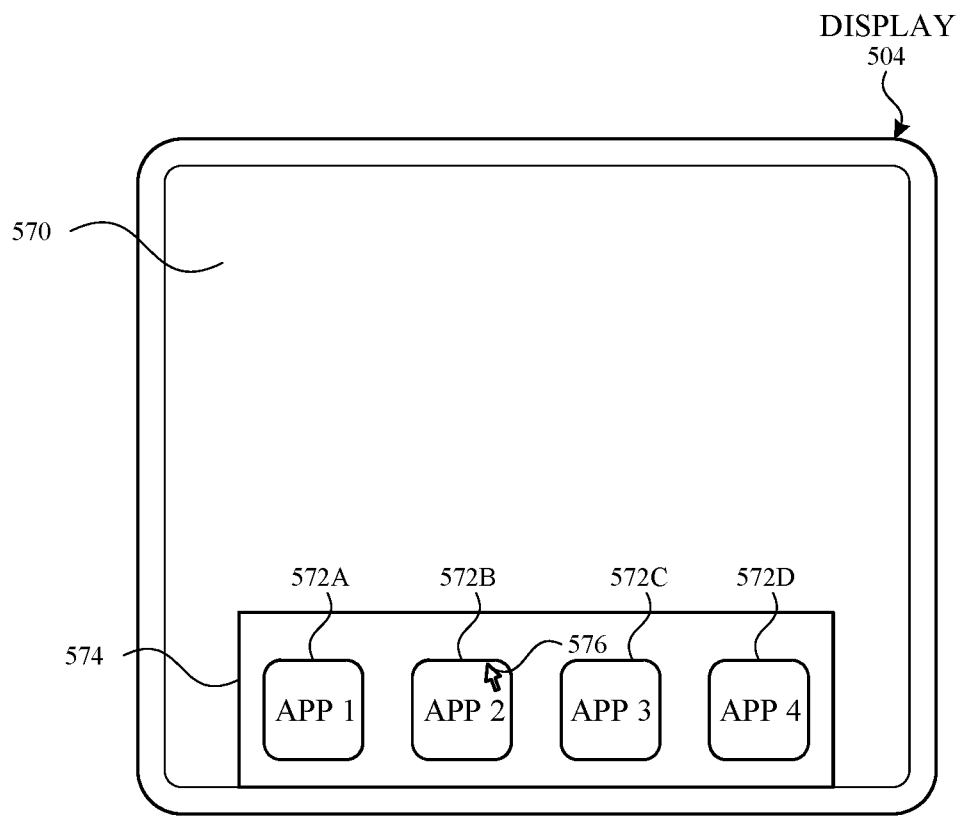
FIGS. 5E-5H illustrate exemplary components and user interfaces of a personal electronic device in accordance with some embodiments.
Figure 5E:
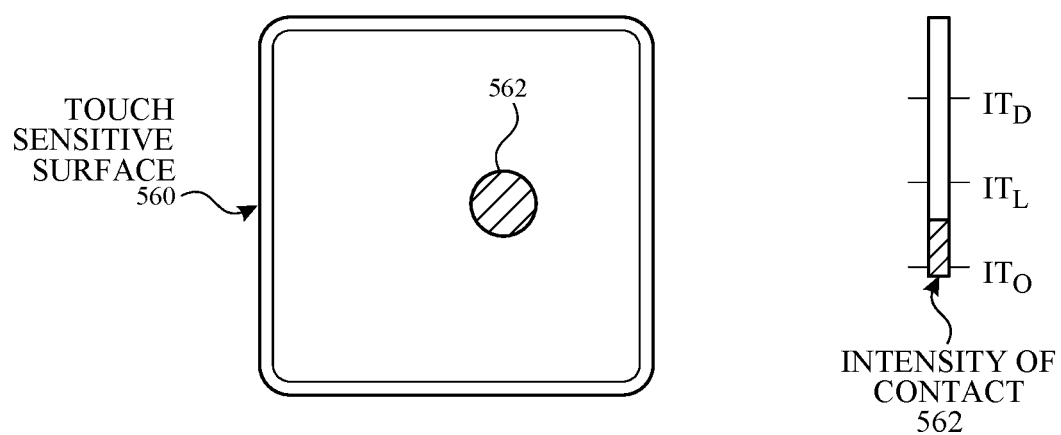
Figure 5F:
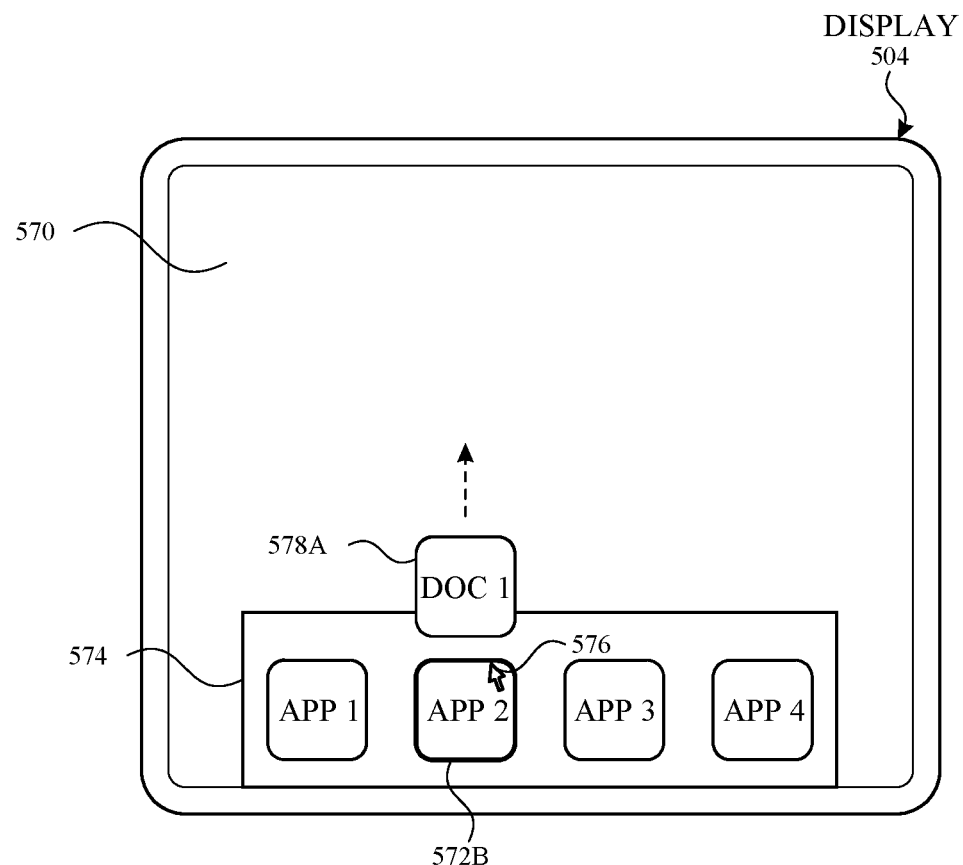
Figure 5F:
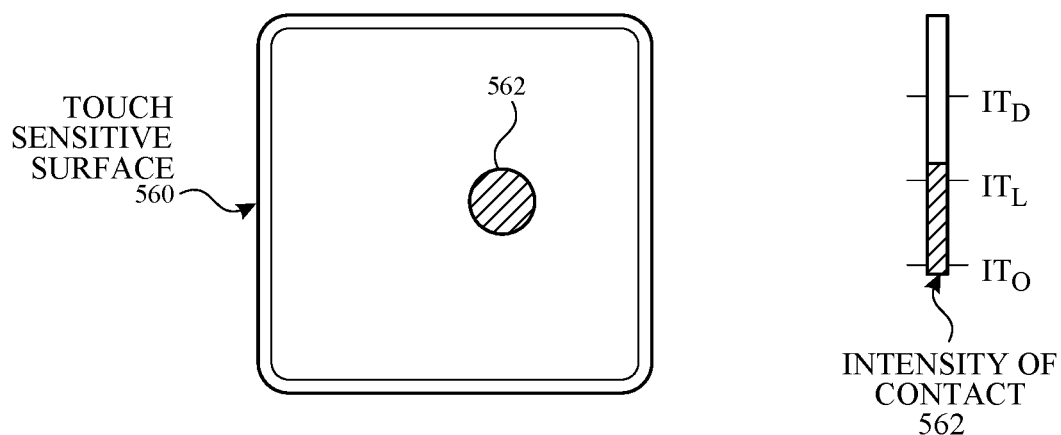
Figure 5G:
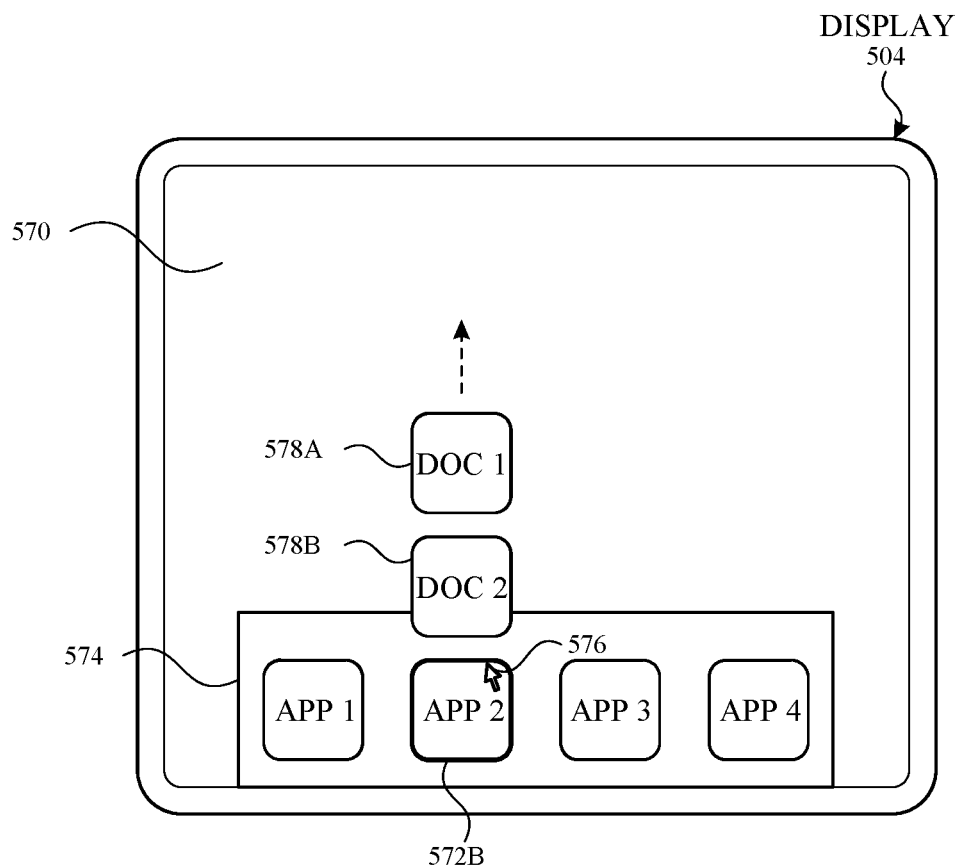
Figure 5G:
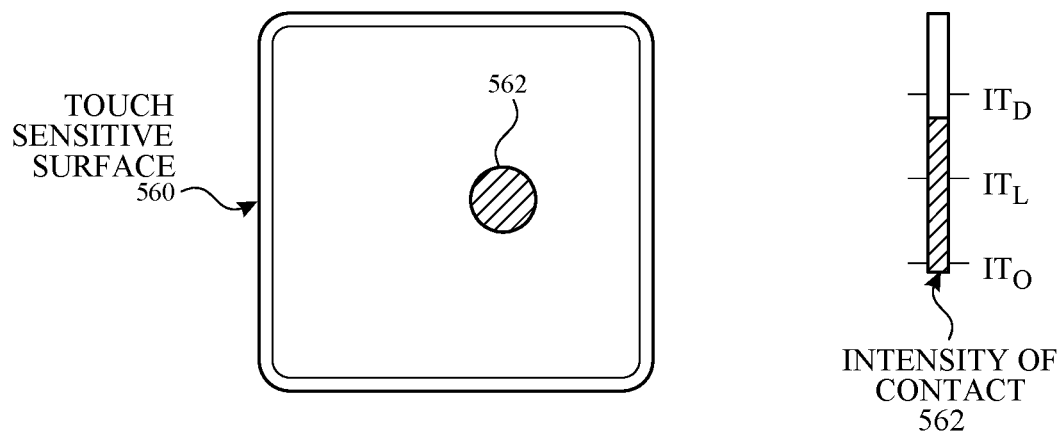
Figure 5H:
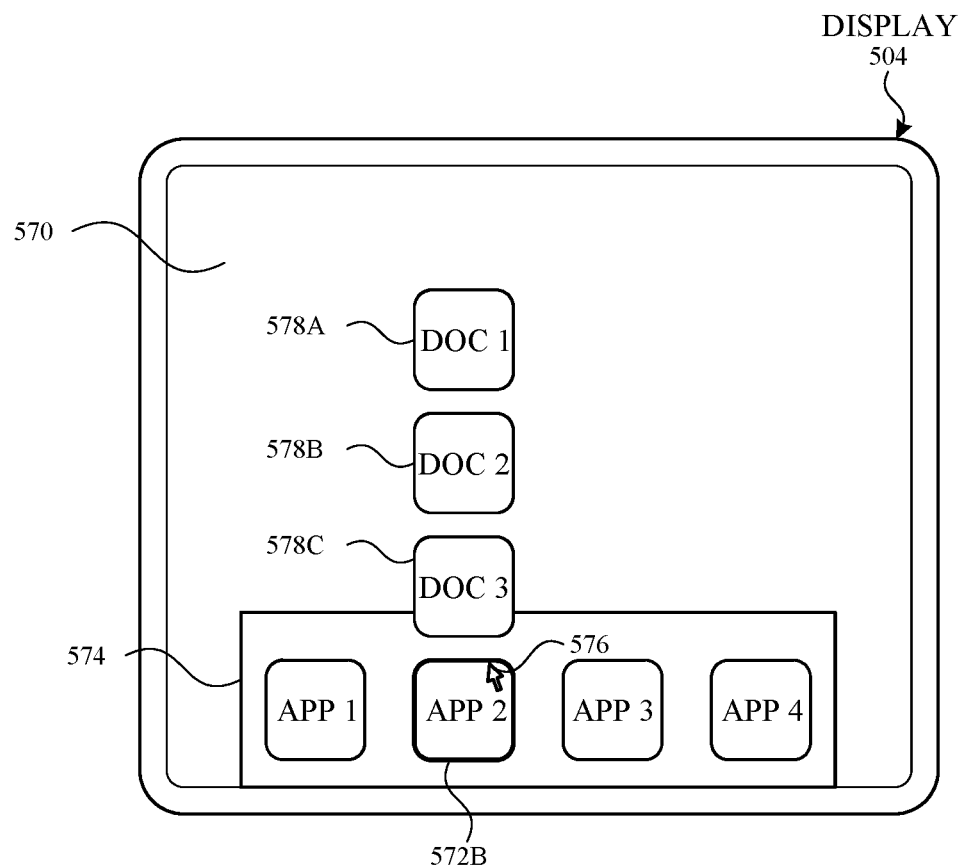
Figure 5H:
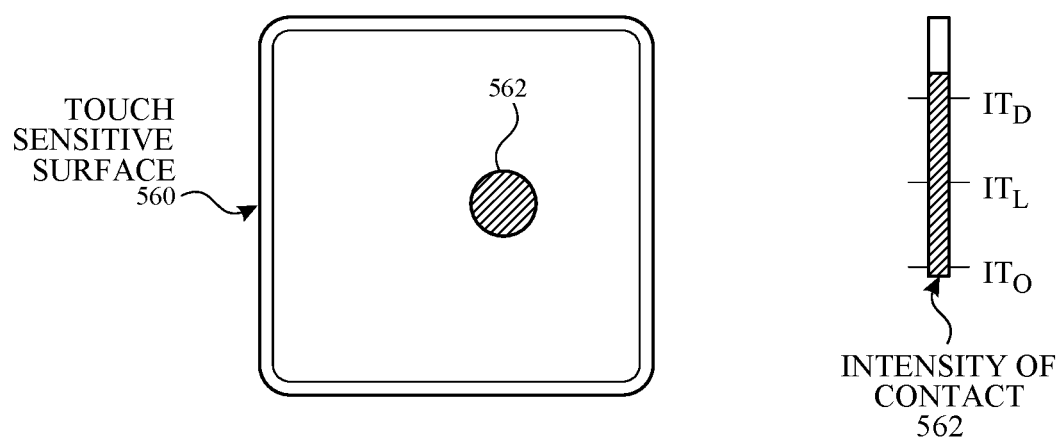

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6AG illustrate exemplary user interfaces for operating an electronic device in a flashlight mode, in accordance with some embodiments. The user interfaces in these figures are used to illustrate the processes described below, including the processes in FIGS. 7A-7D.

FIG. 6A illustrates device 600 with touch-sensitive display 602. Device 600 may be device 100, 300, or 500 in some embodiments. Optionally, device 600 includes an orientation sensor configured to detect a physical orientation of device 600. Optionally, device 600 includes an attachment mechanism configured to attach device 600 to a user's wrist. User interface 610 is displayed on touch-sensitive display 602. User interface 610, includes watch face 611. In some embodiments, user interface 610 includes a user interface for an application or an application springboard that includes a plurality of affordances (e.g., a menu) for launching respective applications.

Device 600 includes various input mechanisms that receive user input, such as, rotatable input mechanism 604, that is able to receive a rotatable input (and may also receive a push input), and input mechanism 606 that is able to receive a push user input.

Figure 6B:
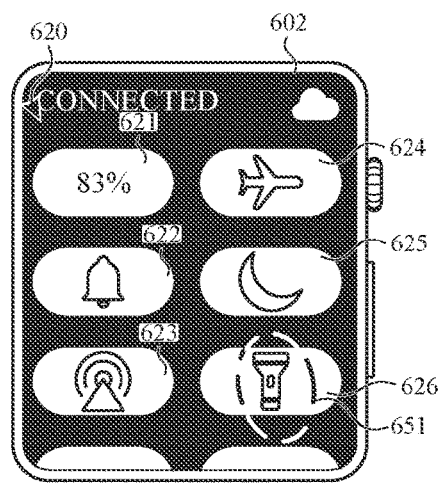

In response to detecting input 650 (e.g., an upward swipe shown in FIG. 6A) on touch-sensitive display 602, device 600 displays user interface 620 for a Control Center, which includes a plurality of affordances 621-626 corresponding to various respective features of device 600 (e.g., power settings, alarm settings, airplane mode, sleep mode), as shown in FIG. 6B. While displaying user interface 620, device 600 detects input 651 on display 602. Input 651 corresponds to selection of flashlight affordance 626 for activating a flashlight mode on device 600. The flashlight mode displays user interfaces on display 602 that can be used to illuminate the surrounding environment with light emitted from display 602. The flashlight mode thus enables device 600 to serve as a flashlight using the light emitted from display 602, even if device 600 does not include another light source capable of providing illumination. The features described below allow device 600 to be used as a flashlight in an intuitive, efficient, and user-friendly manner.

Figure 6C:
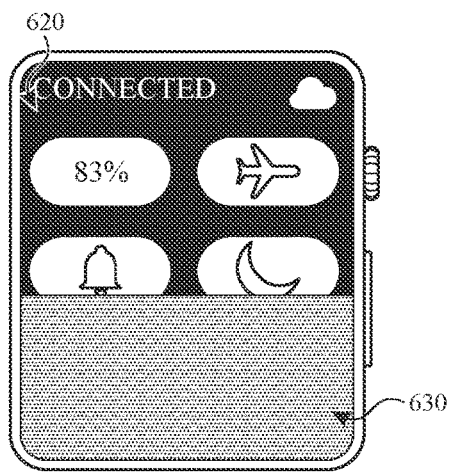
Figure 6D:
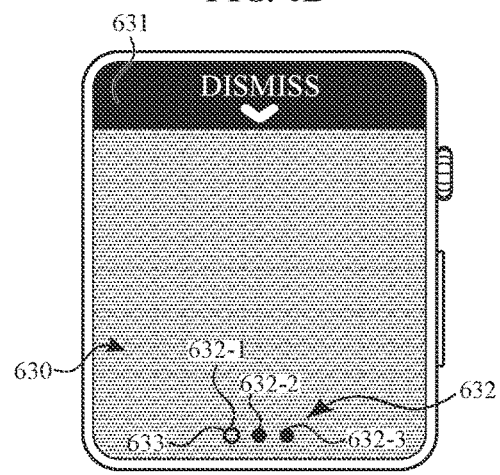

Device 600 enters the flashlight mode in response to detecting input 651. As shown in FIGS. 6C-6D, entering the flashlight mode includes replacing user interface 620 with a first flashlight user interface 630. In one example, device 600 transitions to first flashlight user interface 630 by animating first flashlight user interface 630 translating upward onto display 602 from the bottom edge of display 602. FIG. 6C illustrates the transition between the display of user interface 620 in FIG. 6B and the display of first flashlight user interface 630 in FIG. 6D. Optionally, first flashlight user interface 630 at least initially includes a dismiss affordance 631 for dismissing the flashlight mode, as shown at the top of display 602 in FIG. 6D. In some embodiments, dismiss affordance 631 is displayed somewhere other than at the top of display 602 (e.g., at the bottom, side, or center of display 602).

As shown in FIG. 6D, first flashlight user interface 630 includes flashlight style indicia 632, which indicate a sequence of flashlight styles. Exemplary flashlight styles will be described in greater detail below. For now, flashlight style indicia 632 include dots 632-1, 632-2, and 632-3 corresponding to respective flashlight styles. Flashlight style indicia 632 provide visual feedback to the user that there are three available flashlight styles arranged in a horizontal sequence (based on the orientation of device 600 in FIG. 6D). Flashlight style indicia 632 include an indication 633 of the flashlight style according to which the flashlight mode is currently operating. In FIG. 6D, indication 633 indicates that the current style corresponds to the left dot 632-1, and therefore, is the first or far left flashlight style in the sequence.

Figure 6E:
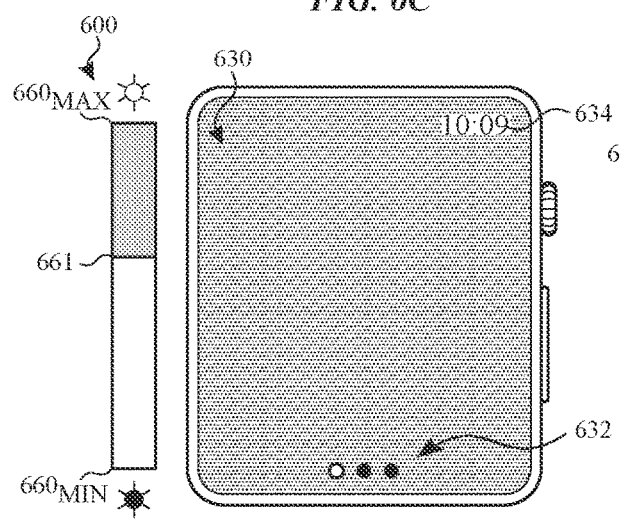

In some embodiments, dismiss affordance 631 is removed from first flashlight user interface 630 after a predetermined amount of time. In some embodiments, dismiss affordance 631 is removed in response to an input (e.g., a tap or upward swipe on display 602). As shown in FIG. 6E, dismiss affordance 631 is removed and an indication of time 634 is displayed.

Referring further to FIG. 6E, scale 660 represents the brightness or amount of visible light output by display 602 when displaying first flashlight user interface 630 in FIG. 6E. In some embodiments, the brightness of a user interface (e.g., first flashlight user interface 630) is represented by the total lumen output of display 602 at a particular time. The total lumen output is a measure of the total quantity of visible light emitted by display 602 (e.g., the total power (e.g., joules per second) of the light output by display 602, weighted based on a model of the spectral response of the human eye). The bottom of scale 660 represents a minimum total lumen output $660_{MIN}$ (e.g., the minimum operational lumen output of display 602), and the top of the scale represents a maximum total lumen output $660_{MAX}$ (e.g., the maximum operational lumen output of display 602).

As indicated by scale 660, first flashlight user interface 630 has a first total lumen output 661 less than maximum total lumen output $660_{MAX}$ and greater than minimum total lumen output $660_{MIN}$. With the exception of indication of time 634 and flashlight style indicia 632, first flashlight user interface 630 is substantially uniform over display 602 such that the intensity (e.g., luminance or lumen per unit area) and color of first flashlight user interface 630 are substantially uniform over display 602. In some embodiments, first flashlight user interface 630 serves as an initial interface for the flashlight mode to indicate that device 600 has entered the flashlight mode, to provide information about the flashlight mode (e.g., the number of available flashlight styles) and/or other common information (e.g., time), and to provide capability for the user to adjust characteristics of the flashlight mode (e.g., the capability to change the flashlight style and/or adjust visual characteristics of the flashlight mode). In some embodiments, the first flashlight user interface 630 is therefore intended primarily for user interaction, and as such, has a reduced brightness that is comfortable for a user to view instead of an increased brightness that might be more effective for serving as a flashlight. Optionally, the brightness of first flashlight user interface 630 is based on a brightness setting of device 600 or an amount of ambient light detected by a light sensor of device 600 (e.g., first total lumen output 661 is directly proportional to the amount of ambient light).

Referring again to FIG. 6E, the flashlight mode operates according to a first flashlight style, referred to herein as a constant flashlight style, in which the total lumen output is substantially constant over time (e.g., the intensity is substantially uniform over display 602 and constant over time) and the user interface is substantially white over the entire display 602. In one example of the constant flashlight style, the total lumen output 661 of first flashlight user interface 630 is substantially constant over a first period of time that first flashlight interface 630 is displayed.

While first flashlight user interface 630 is displayed, device 600 determines whether brightness change criteria are met. In some embodiments, the brightness change criteria are met if first flashlight user interface 630 has been continuously displayed for greater than or equal to a predetermined threshold amount of time (e.g., three seconds). In some embodiments, the brightness change criteria are met if first flashlight user interface 630 has been continuously displayed for greater than or equal to the predetermined threshold amount of time without an intervening input (e.g., a press or rotation of rotatable input mechanism 604, a press of input mechanism 606, a horizontal swipe on display 602 to change the flashlight style (as described in greater detail below), or a vertical (e.g., downward) swipe on display 602 to display dismiss affordance 631 and/or dismiss the flashlight mode (as also described in greater detail below)). In some embodiments, the brightness change criteria are met if device 600 detects an input (e.g., a touch gesture on display 602, rotation of rotatable input mechanism 604, and/or a change in orientation of device 600) while displaying first flashlight user interface 630.

In some embodiments, in accordance with a determination that the brightness change criteria are not met, device 600 maintains first flashlight user interface 630. In accordance with a determination that the brightness change criteria are met, device 600 displays second flashlight user interface 640 shown in FIG. 6F. As indicated by brightness scale 660, second flashlight user interface 640 has a second total lumen output 662 greater than first total lumen output 661 of first flashlight user interface 630. In some embodiments, second total lumen output is maximum total lumen output 660$_{MAX}$. Similar to first flashlight user interface 630, the intensity and color of second flashlight user interface 640 are substantially uniform over display 602. In some embodiments, the color of second flashlight user interface 640 is substantially the same as the color of first flashlight user interface 630. Since total lumen output 662 of second flashlight user interface 640 is greater than total lumen output 661 of first flashlight user interface 640, however, the intensity (e.g., luminance) of second flashlight user interface 640 is greater than the intensity of first flashlight user interface 630.

Figure 6F:
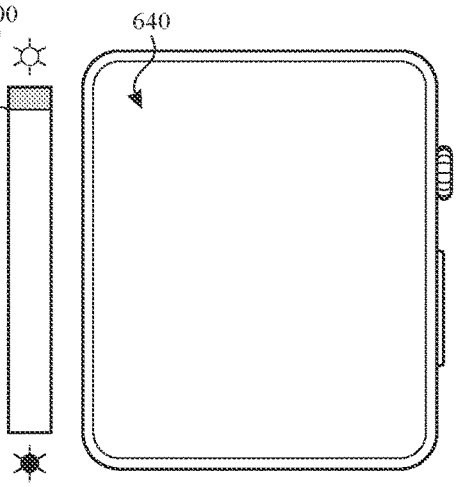

In some embodiments, indication of time 634, flashlight style indicia 632, and current style indicator 633 are not included on second flashlight user interface 640 (e.g., they are removed from display 602 when the brightness change criteria are met), as shown in FIG. 6F. Optionally, any other additional features displayed on first flashlight user interface 630 are not included on second flashlight user interface 640. Accordingly, in some embodiments, when the brightness change criteria are met, display 602 transitions to an interface intended primarily for illuminating the surrounding environment by increasing the brightness of display 602 and removing any extraneous graphical features. Optionally, second flashlight user interface 640 is maintained until further input is detected.

Device 600 also maintains the current flashlight style when it transitions to second flashlight user interface 640 from first flashlight user interface 630. The flashlight mode operates according to the constant flashlight style such that the total lumen output of second flashlight user interface 640 is substantially constant (e.g., the total lumen output remains substantially at second total lumen output 662 over a period of time) and second flashlight user interface 640 is substantially white over the entire display 602. Thus, according to the constant flashlight style, the total lumen output is substantially constant at the first total lumen output 661 while displaying first flashlight user interface 630 and is also substantially constant at the second total lumen output 662 while displaying second flashlight user interface 640.

Referring now to FIGS. 6G-6J, in some embodiments, device 600 switches between first flashlight user interface 630 and second flashlight user interface 640 based at least in part on the orientation of device 600. In some embodiments, the brightness change criteria includes an orientation detection criterion that is met by detecting a change in orientation of device 600 and/or an orientation value criterion that is met when the orientation of device 600 is a predetermined orientation. In some embodiments, the brightness change criteria are met if at least one of the detection change criterion and the orientation value criterion is met. In some embodiments, the brightness change criteria are met only if both the detection change criterion and the orientation value criterion are met.

Figure 6G:
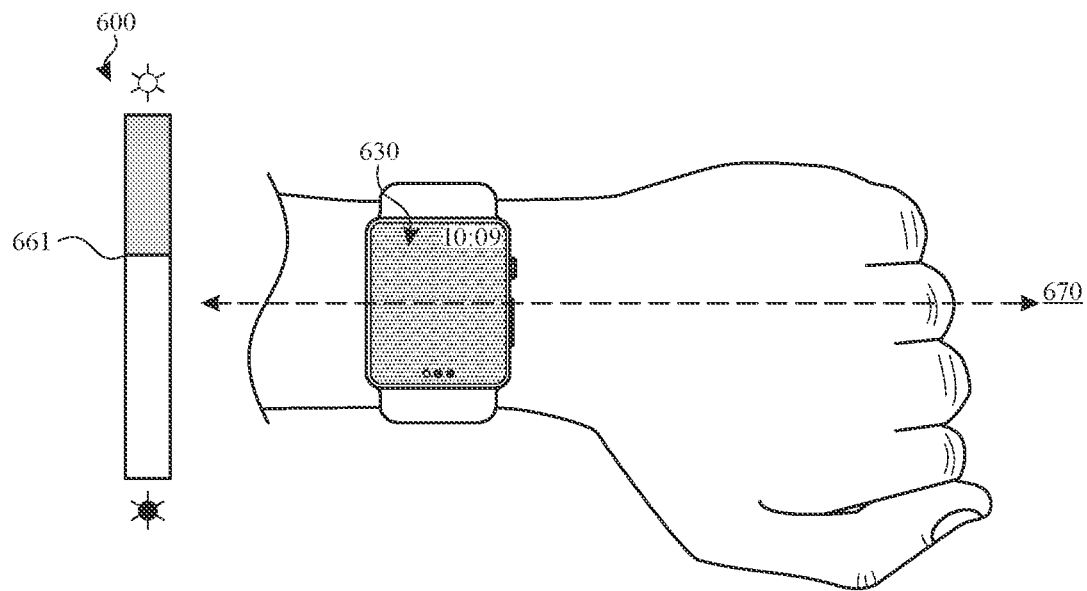
Figure 6H:
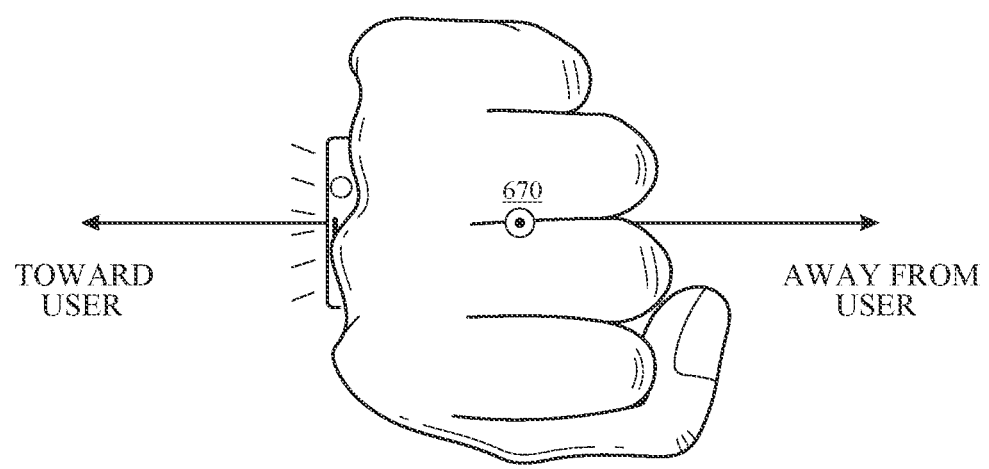
Figure 6I:
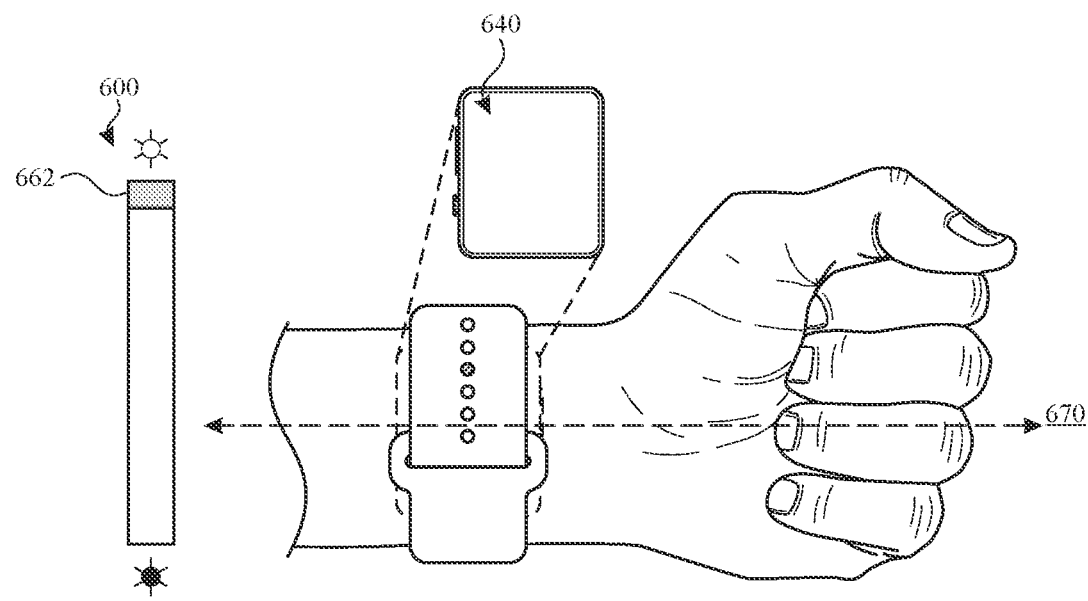
Figure 6J:
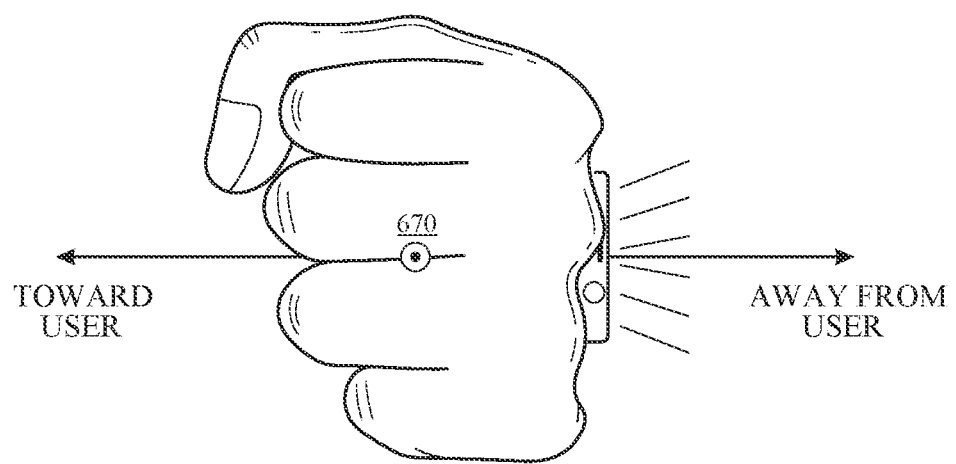

FIGS. 6G-6H illustrate views of device 600 in a first orientation. Device 600 is shown on the wrist of a user such that the first orientation corresponds to an orientation in which display 602 is facing toward the user. FIGS. 6I-6J illustrate views of device 600 in a second orientation. Compared to FIGS. 6G-6H, the user's wrist has been turned to rotate device 600 approximately 180 degrees around axis 670 so that display 602 is turned upside down (compared to the first orientation) and faces away from the user. FIG. 6I includes a pop-out view showing device 600 in the second orientation from a perspective looking toward the user.

In some embodiments, device 600 detects the change in orientation of device 600 from the first orientation to the second orientation, and the second orientation is a predetermined orientation. Accordingly, the orientation detection criterion and the orientation value criterion of the brightness change criteria are met. In the embodiment illustrated in FIGS. 6G-6J, the brightness change criteria are met if both the orientation detection criterion and orientation value criterion are met. As a result, in response to determining that both the orientation detection criterion and orientation value criterion are met, device 600 switches from displaying first flashlight user interface 630 to displaying second flashlight user interface 640.

Optionally, the predetermined orientation is set to an orientation that indicates that display 602 is pointed away from the user and/or is likely being used to illuminate the surrounding environment (e.g., display 602 is facing downward). In some embodiments, a user specifies an orientation in which device 600 is intended to be worn (e.g., right wrist with rotatable input mechanism on the right). Optionally, the predetermined orientation is based on the user-specified orientation (e.g., the specified orientation determines the orientations in which display 602 is facing toward and away from the user). Optionally, the predetermined orientation is based on the orientation of the device at the time of entering the flashlight mode. Optionally, there is a plurality of predetermined orientations or one or more ranges of predetermined orientations covering a range of orientations (e.g., a range of orientations in which the display is likely to be pointed away from the user's view). In some embodiments, the orientation value criterion is met if the orientation of the device is any one of the plurality of predetermined orientations or falls within the one or more ranges of predetermined orientations.

As mentioned, in some embodiments, the second total lumen output 662 is intended for illuminating the surrounding environment but is uncomfortable for a user to view. In some embodiments in which the brightness criteria are met if the first flashlight user interface is continuously displayed for a predetermined amount of time, the predetermined amount of time provides the user with an opportunity to provide an input or direct display 602 away from view before the brightness is increased. Optionally, the brightness increase criteria are met if the first flashlight user interface is continuously displayed for a predetermined amount of time or if the orientation detection criterion and/or the orientation value criterion are met, which allows a user to bypass the delay of the predetermined amount of time by re-orienting device 600 to the predetermined orientation before the predetermined amount of time has passed. In some embodiments, the brightness increase criteria are met only if the orientation detection criterion and the orientation value criterion are met in order to reduce the chance that the brightness is increased while the user is viewing display 602.

Referring now to FIG. 6K, while displaying second flashlight user interface 640, device 600 detects input 652 (e.g., a touch gesture) on display 602. In other examples, input 652 is an input on rotatable input mechanism 604 or input mechanism 606. In some embodiments, device 600 determines whether device 600 is oriented in a predetermined interface-lock orientation that prohibits device 600 from responding to inputs on display 602 or from being switched out of second flashlight user interface 640. In one example, the interface-lock orientation is an orientation associated with display 602 of device 600 facing away from a user, as shown, for example, in FIGS. 6I-6J. Optionally, the interface-lock orientation is included in a plurality of orientations and/or ranges of orientations that prohibit device 600 from responding to inputs on display 602 or being switched out of second flashlight user interface 640. In some embodiments, the orientations that cause the second flashlight user interface 640 to be locked are different than the orientations that meet the orientation value criterion of the increase brightness criteria.

In accordance with a determination that device 600 is oriented in the interface-lock orientation, device 600 maintains display of second flashlight user interface 640 in response to detecting input 652 (e.g., device 600 does not respond to input 652). In accordance with a determination that device 600 is not oriented in the lock-interface orientation, device 600 replaces second flashlight user interface 640 with first flashlight user interface 630 in response to detecting input 652, as shown in FIG. 6L. Returning to first flashlight user interface 630 reduces the brightness of display 602 and provides indication of time 634 and flashlight style indicia 632.

As an alternative (or in addition) to input 652, device 600 optionally switches from second flashlight user interface 640 to first flashlight user interface 630 in response to detecting a change in orientation of device 600 to a predetermined reduce-brightness orientation. In one example, while displaying second flashlight user interface 640, device 600 detects a change in orientation (e.g., to the orientation shown in FIGS. 6G-6H) and determines whether the new orientation corresponds to a predetermined reduce-brightness orientation. In response to detecting the change in orientation and determining that the new orientation corresponds to a predetermined reduce-brightness orientation, device 600 replaces second flashlight user interface 640 with first flashlight user interface 630. Accordingly, in some embodiments in which display 602 is facing the user when in the reduce-brightness orientation, device 600 automatically reduces the brightness of display 602 in response to display 602 being re-oriented toward the user (e.g., in response to a wrist raise motion by the user to view display 602). Optionally, after device 600 has returned to first flashlight user interface 630, device 600 again determines whether the brightness increase criteria are met, and if so, increases the brightness again by displaying second flashlight user interface 640 as described above. In this way, device 600 can switch back and forth between relatively bright and dim light output in accordance with the user's input.

Referring now to FIG. 6M, while in first flashlight user interface 630, device 600 detects input 653 (e.g., left swipe on display 602) for changing the style of the flashlight mode. In response to input 653, device 600 ceases operating according to the first flashlight style (e.g., the constant flashlight style) and begins operating according to an adjacent second flashlight style in the sequence of flashlight styles. FIG. 6N illustrates one embodiment of a transition between the first flashlight style and the second flashlight style in which a display of screen 635 (representing the current flashlight style) is translated to the left (e.g., in the same direction as input 653) off the left edge of display 602 and screen 636 (representing the second flashlight style) is translated onto display 602 from the right edge of display 602. Flashlight style indicia 632 is also updated (as shown in FIG. 6O). In particular, current style indicator 633 is moved from dot 632-1 corresponding to the first flashlight style and is displayed at dot 632-2 corresponding to the second flashlight style. Optionally, device 600 switches flashlight styles in response to input while in second flashlight user interface 640 in a manner analogous to that described above for first flashlight user interface 630, but without displaying and updating flashlight style indicia 632. In some embodiments, in response to detecting input for changing the flashlight style in second flashlight user interface 640, device changes the flashlight style and switches to first flashlight user interface 630.

The second flashlight style provides a blinking or pulsing effect by alternating between two different total lumen outputs (e.g., a high brightness state and a low brightness state). The second flashlight style is referred to herein as the pulsed flashlight style, which may be used, for example, as a safety light (e.g., a light that signals the presence of the user to others). FIG. 6O illustrates an example of the flashlight mode operating according to the pulsed flashlight style. More specifically, FIG. 6O illustrates the pulsed flashlight style as applied to first flashlight user interface 630. To illustrate the pulsing effect, FIG. 6O shows first flashlight user interface 630 at two different times during operation of device 600 according to the pulsed flashlight style. Screen 637 shown on the left side of FIG. 6O represents first flashlight user interface 630 at a first time in a "high brightness" or "ON" state, and screen 638 shown on the right side of FIG. 6O represents first flashlight interface 630 at a second time in a "low brightness" or "OFF" state. At both times, first flashlight user interface 630 is substantially uniform in color and intensity (e.g., except for indication of time 634 and flashlight style indicia 632). At the first time, consistent with first flashlight user interface 630 in the constant flashlight style, the total lumen output is first total lumen output 661. In some embodiments, the total lumen output of screen 637 is different than the total lumen output associated with the first flashlight user interface 630 in the constant flashlight style, but still less than maximum total lumen output $660_{MAX}$ and greater than minimum total lumen output $660_{MIN}$. At the second time, the total lumen output 663 is less than first total lumen output 661 (e.g., the total lumen output is at or near minimum total lumen output $660_{MIN}$). According to the pulsed flashlight style, device 600 alternates back and forth between screen 637 and screen 638 automatically over time. In some embodiments, device alternates between screen 637 and screen 638 according to a pattern over time defined by when and how long each of screens 637 and 638 is displayed over time.

Figure 6P:
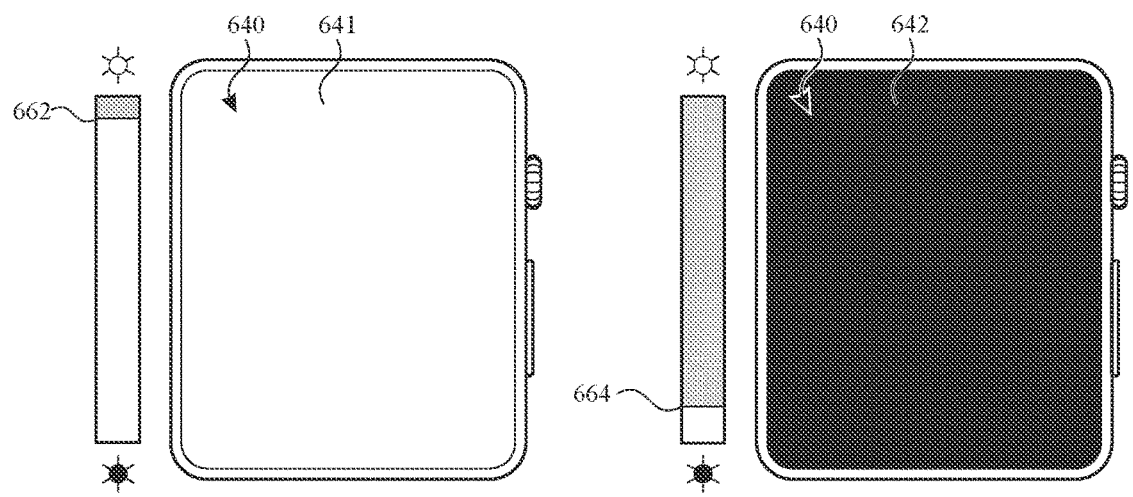

FIG. 6P illustrates the pulsed flashlight style as applied to second flashlight user interface 640. The operation of the pulsed flashlight style as applied to second flashlight user interface 640 is the same as applied to first flashlight user interface 630 except for the total lumen output. At a first time, consistent with second flashlight user interface 640 in the constant flashlight style, screen 641 is displayed with second total lumen output 662. In some embodiments, the total lumen output of screen 641 is different than the total lumen output associated with the second flashlight user interface 640 in the constant flashlight style, but still greater than the total lumen output associated with the first flashlight user interface 630 in the pulsed flashlight style (e.g., greater than total lumen output 661). At a second time, screen 642 is displayed with a total lumen output 664 that is less than the total lumen output of screen 641 (e.g., the total lumen output is at or near minimum total lumen output $660_{MIN}$). In some embodiments of the pulsed flashlight style, the total lumen output of first flashlight user interface 630 in the low brightness (e.g., OFF) state is the same as the total lumen output of second flashlight user interface 640 in the low brightness state. In some embodiments of the pulsed flashlight style, the total lumen output of first flashlight user interface 630 in the low brightness state is different than the total lumen output of second flashlight user interface 640 in the low brightness state. In some embodiments of the pulsed flashlight style, the pattern (e.g., frequency) according to which device 600 alternates between the high brightness and low brightness states (e.g., ON and OFF) is the same in both first flashlight user interface 630 and second flashlight user interface 640. In some embodiments of the pulsed flashlight style, the pattern according to which device 600 alternates between the high brightness and low brightness states in first flashlight user interface 630 is different than in second flashlight user interface 640.

Figure 6Q:
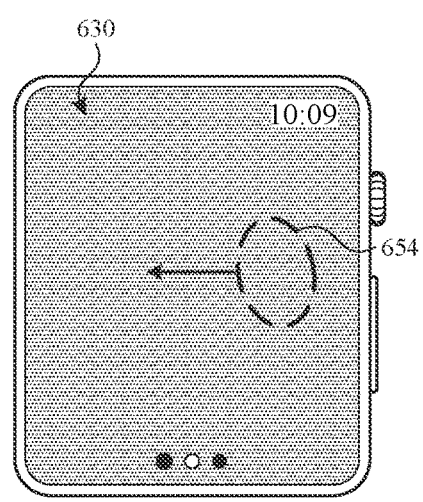
Figure 6R:
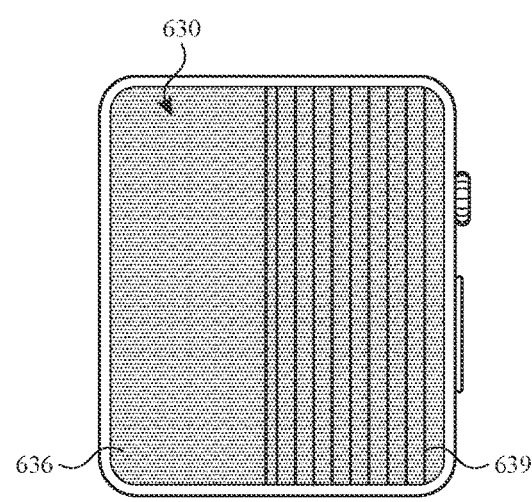
Figure 6S:
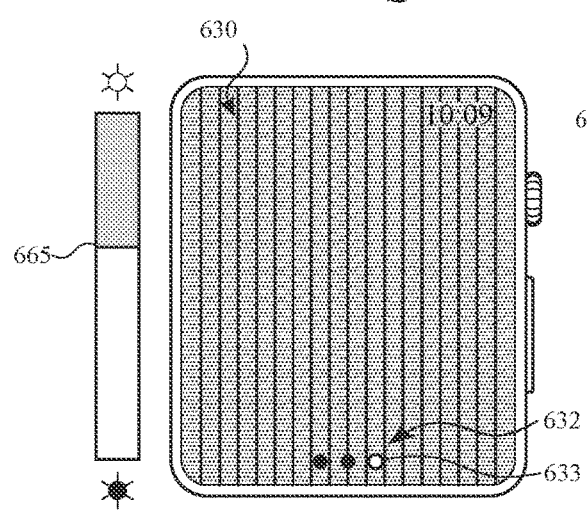

Referring now to FIGS. 6Q-6S, while displaying first flashlight user interface 630 in the pulsed flashlight style, device 600 detects input 654 (e.g., a left swipe) on display 602, and in response, changes operation of the flashlight mode from the second flashlight style to a third flashlight style in the sequence of flashlight styles. FIG. 6R illustrates a transition from the second flashlight style to the third flashlight style analogous to the transition between the first flashlight style and the second flashlight style described above with reference to FIGS. 6M-6O. Screen 636 (again representing the second flashlight style) translates to the left off the left edge of display 602 and screen 639 (representing the third flashlight style) translates onto display 602 from the right edge of display 602. Flashlight style indicia 632 are updated to reflect that the third flashlight style is the current style.

Figure 6T:
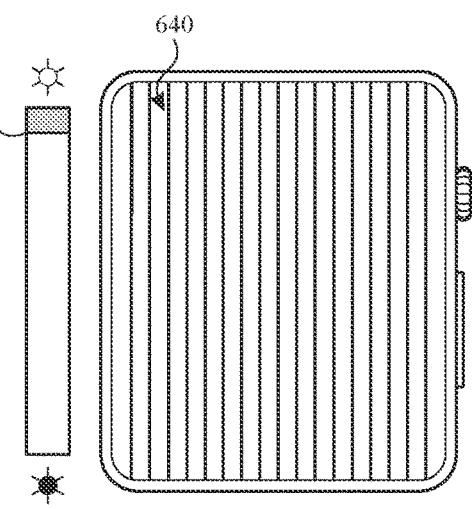
Figure 6U:
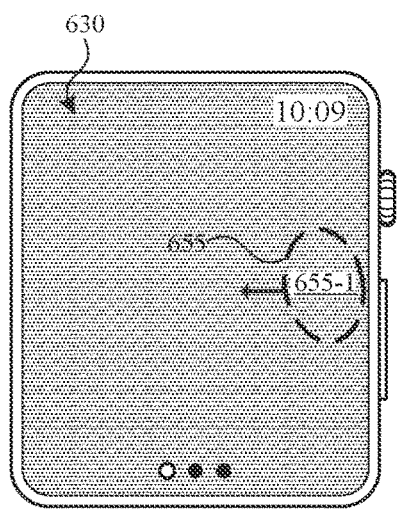
Figure 6V:
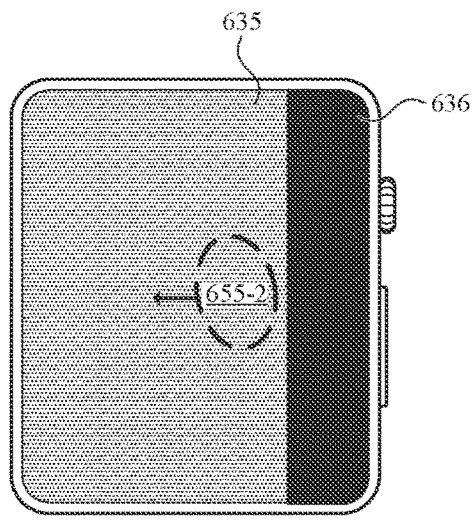

FIGS. 6S and 6T illustrate the operation of the flashlight mode according to the third flashlight style while displaying first flashlight user interface 630 and second flashlight user interface 640, respectively. Similar to the constant flashlight style, the total lumen output of the respective flashlight user interface is substantially constant over time (e.g., the display does not noticeably pulse or flash as in the second flashlight style). The intensity and color are uniform over display 602 and also substantially constant over time. However, the color of the interface in the third flashlight style is different than the color of the interface in the constant flashlight style (e.g., the color is not substantially white). Accordingly, the third flashlight style is referred to herein as the color flashlight style. In some embodiments, the color of the interface according to the color flashlight style is limited to a relatively narrow range of wavelengths (e.g., the color is substantially red, substantially blue, substantially green, or substantially yellow). The pattern on display 602 shown in FIGS. 6S-6T indicates that the color of the interface of the illustrated embodiment of the third flashlight style is red. Red may be a particularly advantageous color for illuminating the surrounding environment and improving the visibility of the display at night. As with the other flashlight styles described above, the color flashlight style is consistent between first flashlight user interface 630 and second flashlight user interface 640. The color is substantially the same for first flashlight user interface 630 and second flashlight user interface 640, while the total lumen output 666 for second flashlight user interface 640 is greater than the total lumen output 665 for first flashlight user interface 630.

Figure 6W:
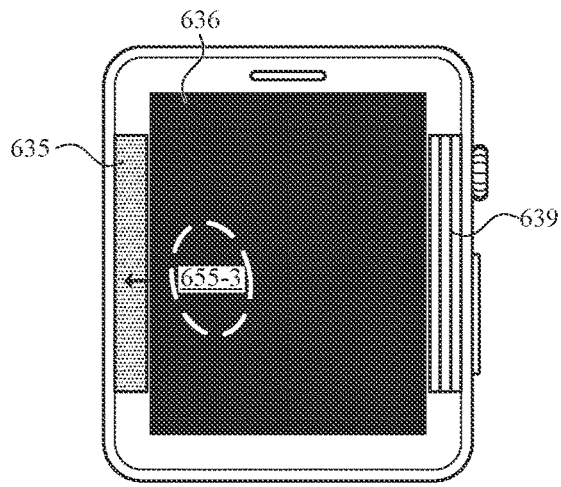

FIGS. 6U-6Y illustrate another embodiment of a transition between flashlight styles. Input 655 is a contact (e.g., a finger contact) on display 602 that begins at position 655-1 and is maintained while moving to position 655-2. In response to movement of contact 655 from position 655-1 to position 655-2, device 600 reduces in size and/or translates to the left screen 635 (representing the first flashlight style) and displays screen 636 (representing the second flashlight style) translating onto display 602 from the right edge of display 602. Compared to the transition described with reference to FIGS. 6M-6N, screen 636 representing the second flashlight style is reduced in size. While still maintained, contact 655 moves to position 655-3 further to the left on display 602. In response to the further movement of contact 655 to position 655-3, screen 635 representing the first flashlight style is reduced in size and moved partially off the left side of display 602, screen 636 representing the second flashlight style is moved to the center of display 602 and increased in size, and screen 639 representing the third flashlight style is moved onto display 602 and is partially displayed at a reduced size on the right edge of display 602. As shown in FIG. 6W, the representation of the second flashlight style is in the center of display 602 and adjacent flashlight styles in the sequence of flashlight styles are represented by partially displayed smaller screens adjacent to the representation of the second flashlight style.

Figure 6X:
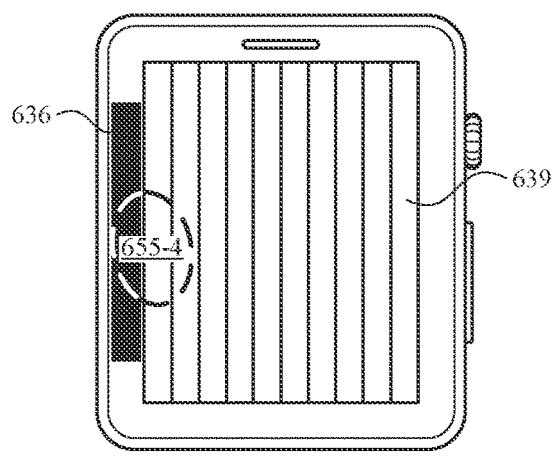
Figure 6Y:
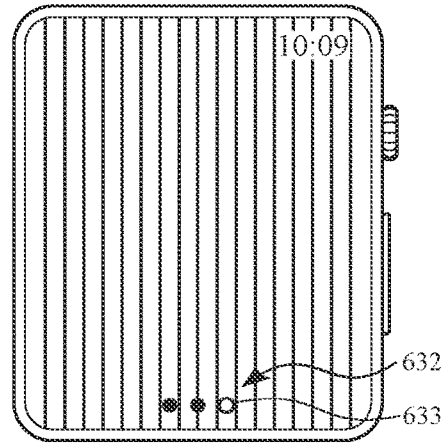

Optionally, device 600 displays affordance 671 for dismissing the representations of the flashlight styles and resuming operation according to the current flashlight style (e.g., without changing the flashlight style). At this point, in some embodiments, contact 655 is ceased and a flashlight style is selected in response to input (e.g., a tap) selecting the corresponding representation of the style. In some embodiments, contact 655 is ceased and device 600 removes the representations of the flashlight styles and operates the flashlight mode according to the flashlight style represented in the center of display 602 at the time contact 655 is ceased (e.g., the second flashlight style). Alternatively, in response to further movement of contact 655 to position 655-4, screen 636 is reduced in size and moved to the left side of display 602 and screen 639 is moved to the center of display 602 and increased in size, as shown in FIG. 6X. Optionally, when contact 655 is ceased, device 600 removes the representations of the flashlight styles and operates the flashlight mode according to the third flashlight style (e.g., as shown in FIG. 6Y) since it is represented in the center of display 602 at the time contact 655 is ceased. Alternatively, when contact 655 is ceased, device 600 maintains the representations of the flashlight styles and a flashlight style is selected in response to input (e.g., a tap) selecting the corresponding representation of the style. In some embodiments, transition back to the second or first flashlight style is performed and displayed in an analogous way (e.g., by swiping to the right).

Figure 6Z:
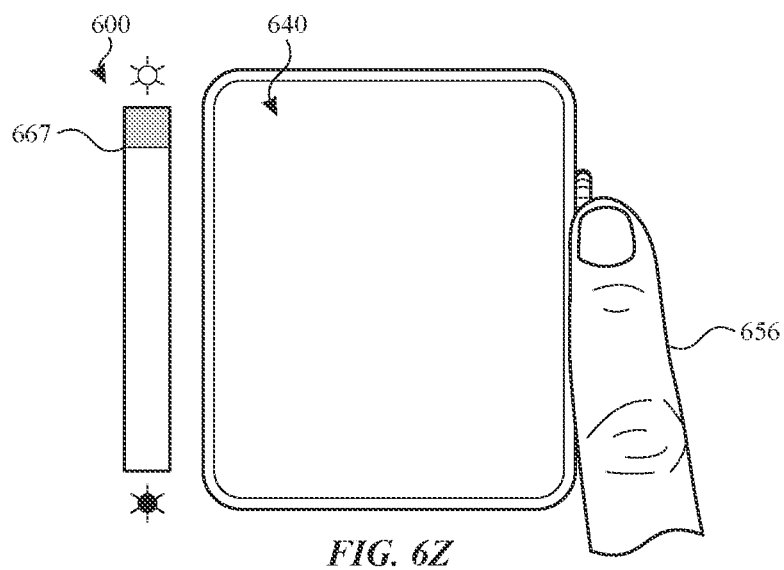
Figure 6A:
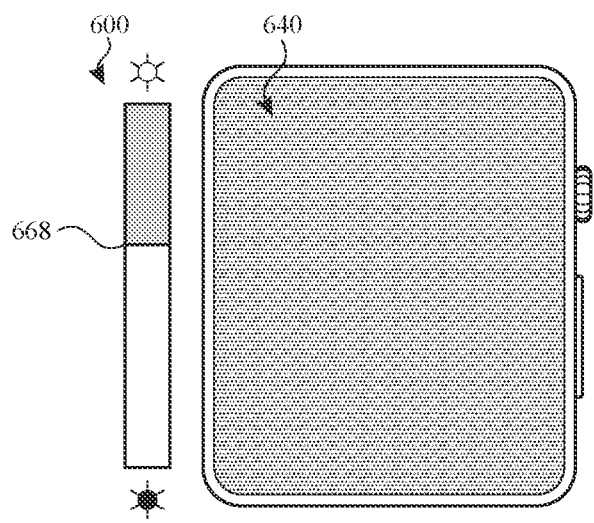
Figure 6A:
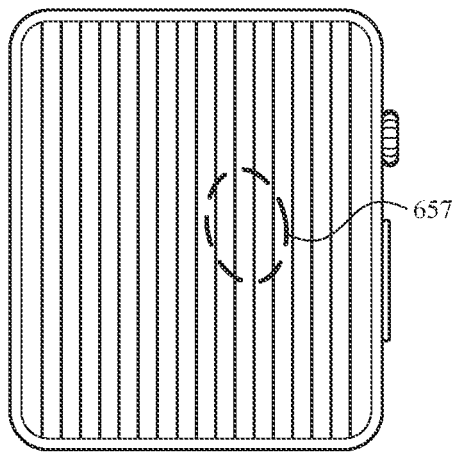
Figure 6A:
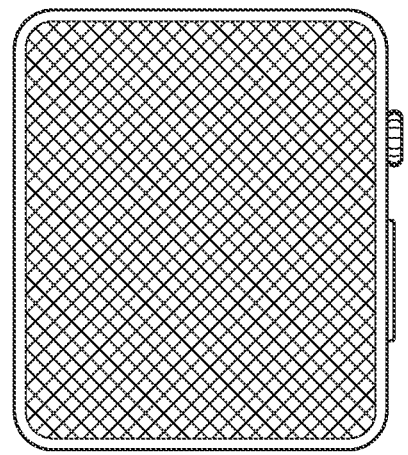
Figure 6A:
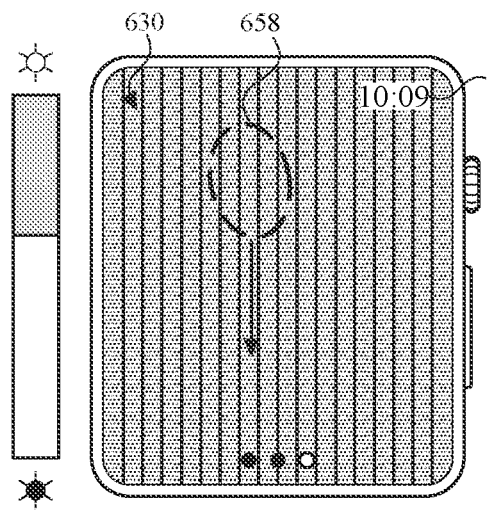
Figure 6A:
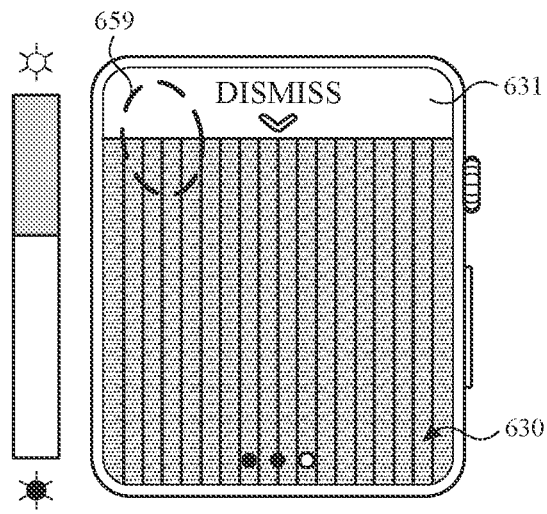
Figure 6A:
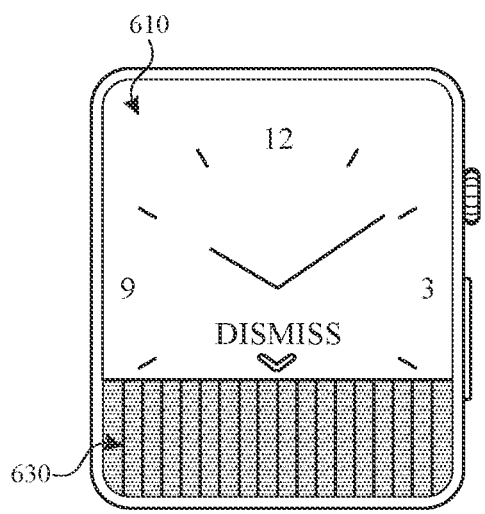
Figure 6A:
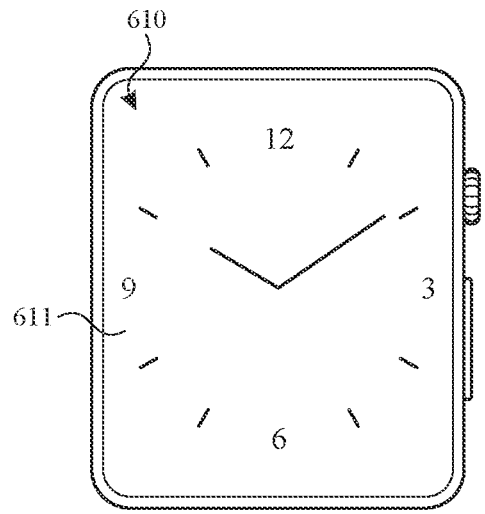
Figure 7A:
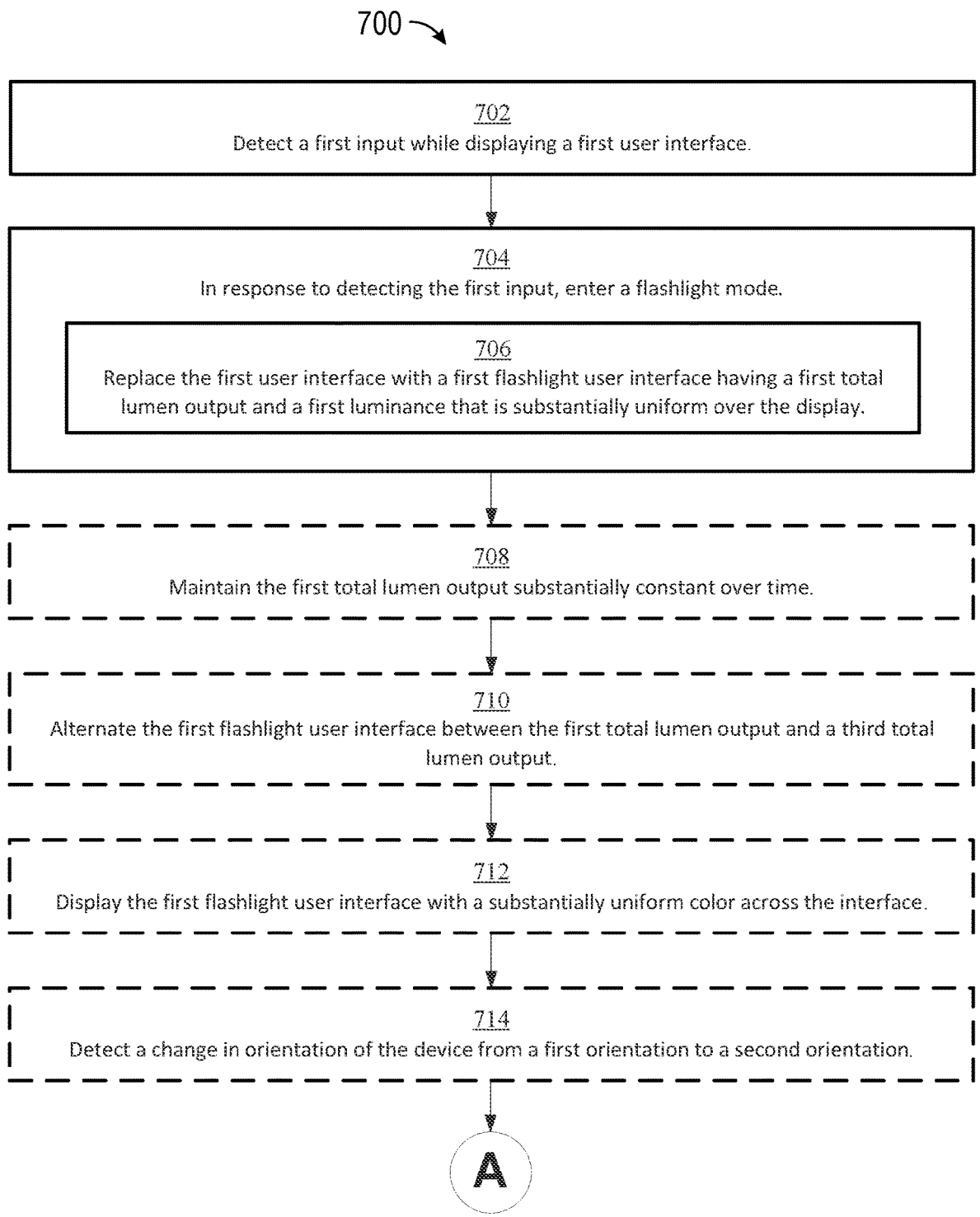
FIGS. 7A-7D are a flow diagram illustrating a method for operating an electronic device in accordance with some embodiments.
Figure 7B:
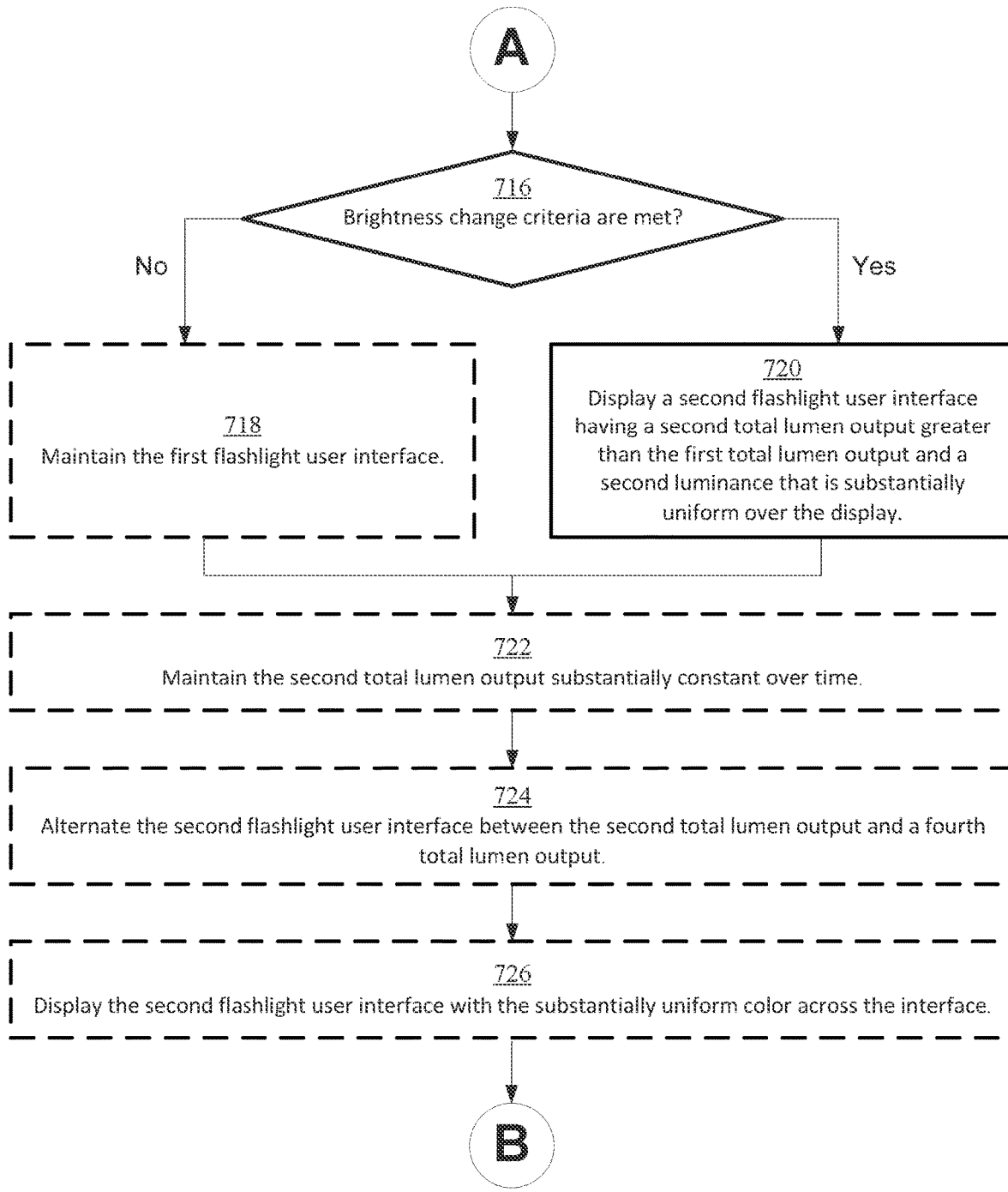
Figure 7C:
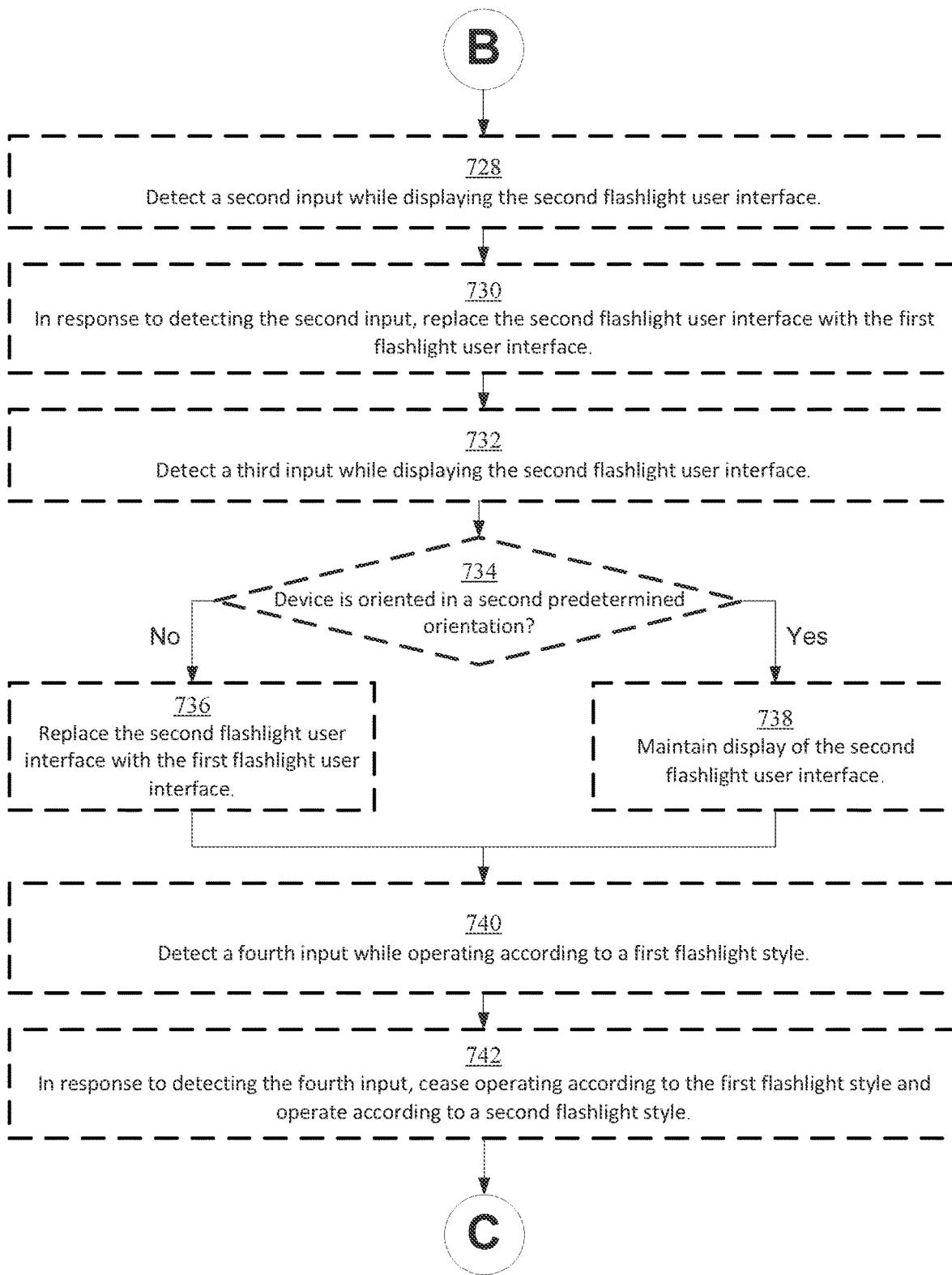
Figure 7D:
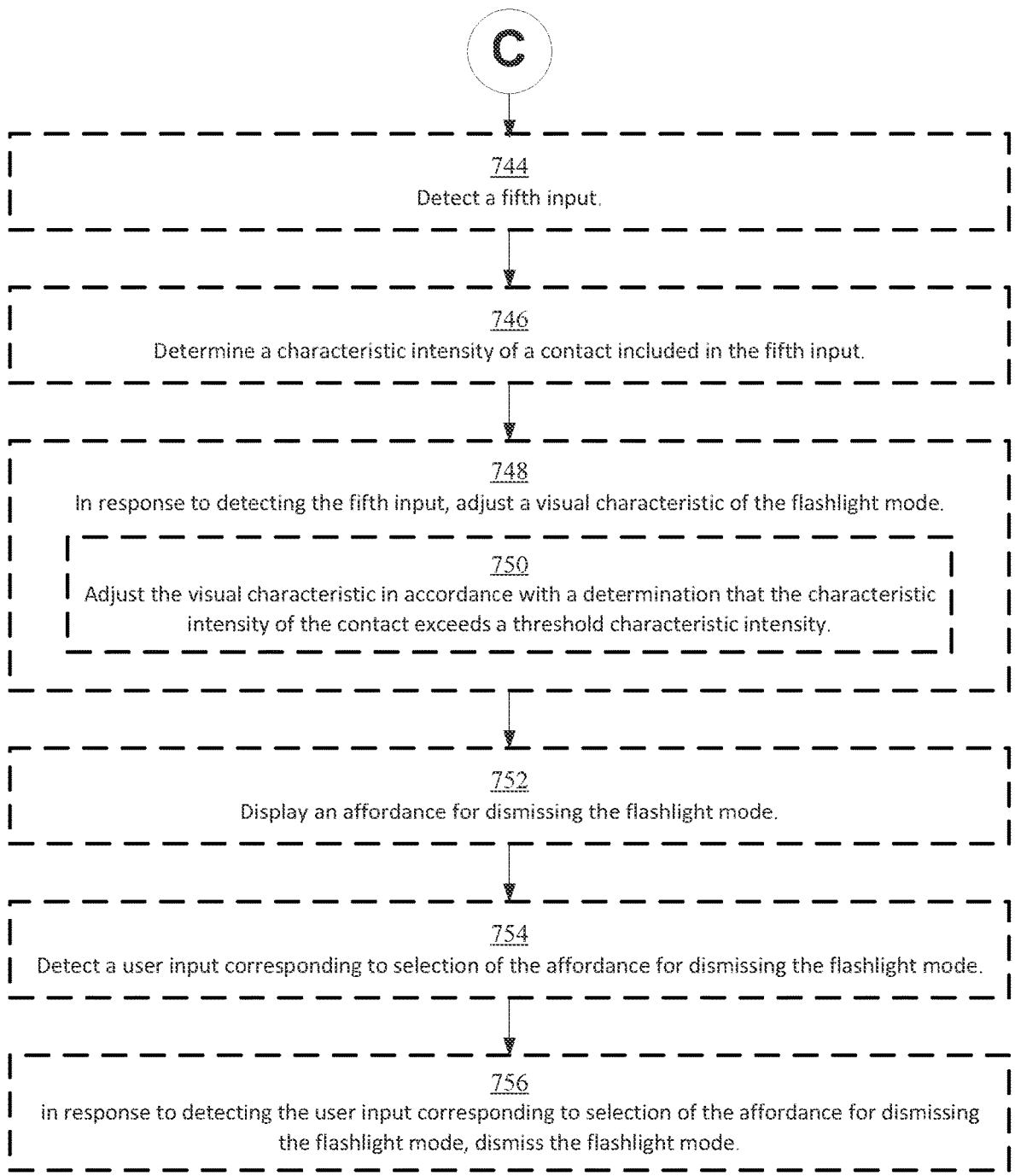

Referring now to FIGS. 6Z-6AC, in some embodiments, one or more visual characteristics of the flashlight mode are adjusted in response to user input. In FIG. 6Z, while displaying second flashlight user interface 640, device 600 detects rotation 656 of rotatable input mechanism 604. In response, device 600 adjusts the brightness of second flashlight user interface 640. Scale 660 in FIGS. 6Z-6AA indicates that rotation 656 reduces the total lumen output of second flashlight user interface 640 from output 667 to output 668. In some embodiments, the brightness is increased in response to rotation of rotatable input mechanism 604 in a direction opposite the direction of rotation 656. Optionally, the amount of adjustment is proportional to the amount of rotation. In some embodiments, rotation 656 is detected while displaying first flashlight user interface 630, and in response, device 600 adjusts the total lumen output of first flashlight user interface 630. Optionally, device 600 adjusts a brightness associated with the flashlight mode in response to other types of input. In some embodiments, device 600 adjusts a brightness associated with the first, second, and/or third flashlight style.

In some embodiments, a visual characteristic other than brightness is adjusted in response to user input. In one example, device 600 adjusts a pulse characteristic associated with the pulsed flashlight style in response to user input (e.g., rotation 656). Exemplary pulse characteristics include, but are not limited to, the pulse repetition frequency at which device 600 alternates between the high brightness state and low brightness state and the relative duration of the high brightness state compared to the low brightness state within a cycle (e.g., duty cycle). In another embodiment, device 600 adjusts a color of the first and/or second flashlight user interface in response to user input (e.g., rotation 656). In one example, device 600 adjusts the display color associated with the first, second, and/or third flashlight style. In some embodiments, the visual characteristic that is adjusted is based on the current flashlight style in which the flashlight mode is operating (e.g., while operating in the first flashlight style, total lumen output is adjusted; while operating in the second flashlight style, a pulse characteristic is adjusted; and while operating in the third flashlight style, a color is adjusted).

Referring now to FIGS. 6AB-6AC, while operating in the flashlight mode, device 600 detects contact 657 on display 602 and determines a characteristic intensity of contact 657. Optionally, in accordance with a determination that the characteristic intensity of contact 657 does not exceed a threshold characteristic intensity, device 600 performs one or more of the operations described above (e.g., switches display 602 between first flashlight user interface 630 and second flashlight user interface 640). In some embodiments, in accordance with a determination that the characteristic intensity of contact 657 exceeds a threshold characteristic intensity, device 600 adjusts a visual characteristic of the flashlight mode as described above (e.g., device 600 increases or decreases the total lumen output or pulse repetition frequency or changes a display color associated with the flashlight mode). As shown in FIG. 6AC, device 600 changes the color of display 602, as represented by the change in pattern shown on display 602 in FIG. 6AC.

In other embodiments, in accordance with a determination that the characteristic intensity of the contact exceeds a threshold characteristic intensity, device 600 enables a capability to adjust a visual characteristic (e.g., device 600 enables a capability to adjust a visual characteristic in response to a rotation and/or press of rotatable input mechanism 604, a press of input mechanism 606, and/or a touch input on display 602). In some embodiments, in accordance with a determination that the characteristic intensity of the contact exceeds a threshold characteristic intensity, device 600 displays a menu for selecting a visual characteristic of the flashlight mode (e.g., a menu of available colors for the third flashlight style). In such embodiments, device 600 adjusts a visual characteristic of the flashlight mode in response to selection of an item (e.g., an affordance) in the menu.

Referring now to FIGS. 6AD-6AG, device 600 provides an easy and efficient technique for dismissing the flashlight mode. While operating in the flashlight mode (e.g., while displaying first flashlight user interface 630, as shown, for example, in FIG. 6AD), device 600 detects input 658 (e.g., a tap and downward drag or downward swipe gesture). In response to input 658, device 600 displays dismiss affordance 631 for dismissing the flashlight mode at the top of display 602. In some embodiments, device 600 ceases to display dismiss affordance 631 and re-displays indication of time 634 if dismiss affordance 631 is continuously displayed for a predetermined amount of time. In response to further input 659 corresponding to selection of dismiss affordance 631 (e.g., further downward dragging of the same contact 658 or a separate tap and drag or swipe gesture beginning on or near dismiss affordance 631), device 600 dismisses the flashlight mode. Dismissing the flashlight mode includes ceasing to operate device 600 according to the flashlight mode. FIG. 6AF illustrates an exemplary embodiment of an animated transition for dismissing the flashlight mode. The first flashlight user interface 630 is translated downward off the bottom of display 602 and user interface 610 including watch face 611 is displayed (e.g., revealed), as shown in FIG. 6AG. In some embodiments, upon dismissing the flashlight mode, device 600 displays an application springboard, or returns to the user interface from which the flashlight mode was entered (e.g., Control Center interface 620).

FIGS. 7A-7D illustrate a flow diagram illustrating a method for providing and operating a flashlight mode using an electronic device in accordance with some embodiments. Method 700 is performed at a device (e.g., 100, 300, 500, or 600) with a display. Optionally, the display is a touch-sensitive display. Optionally, the device includes an orientation sensor. Some operations in method 700 are, optionally, combined, the order of some operations is, optionally, changed, and some operations are, optionally, omitted.

As described below, method 700 provides an intuitive way for providing a flashlight mode on the display of the device. The method reduces the cognitive burden on a user for accessing and operating the flashlight mode, thereby creating a more efficient human-machine interface. For battery-operated computing devices, enabling a user to operate a flashlight mode faster and more efficiently conserves power and increases the time between battery charges.

At block 702, the device detects a first input (e.g., 651) while displaying a first user interface (e.g., 620) on the display. In some embodiments, the input is on the display.

At block 704, in response to detecting the first input on the display, the device enters a flashlight mode (e.g., FIGS. 6B-6E). At block 706, entering the flashlight mode includes replacing the first user interface with a first flashlight user interface (e.g., 630) having a first total lumen output (e.g., 661) and a first luminance that is substantially uniform over the display. Replacing the first user interface with a first flashlight user interface that has a luminance that is substantially uniform over the display provides the user with feedback that the device has changed modes and that the entered mode is a flashlight mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Also, as will be described with reference to block 720 below, the first total lumen output is less than a second total lumen output of a second flashlight user interface that is subsequently displayed. The greater brightness of the second lumen output is intended for illuminating the surrounding environment and may be uncomfortable or even harmful to view. Displaying the first flashlight user interface with the first total lumen output provides the user with an opportunity to avoid discomfort by looking away from the display or pointing the display away from the user's view before the brightness increases.

In some embodiments, the flashlight mode includes at least a first flashlight style (e.g., constant flashlight style) and a second flashlight style (e.g., pulsed flashlight style or color flashlight style). Optionally, the first flashlight user interface includes indicia (e.g., 632) of a sequence of styles that includes at least the first flashlight style and the second flashlight style and an indication (e.g., 633) of a current style according to which the flashlight mode is operating. Displaying the indicia of the sequence of styles and the indication of the current style provides the user with feedback that multiple flashlight styles are available and which style is currently implemented. The potential benefits of providing visual feedback are described above.

Optionally, at block 708, the device maintains the first total lumen output substantially constant over time (e.g., in accordance with the first flashlight style, the first total lumen output is substantially constant over time). Keeping the first total lumen output substantially constant over time provides the user with feedback that the flashlight mode supplies a constant source of light for effectively and efficiently illuminating the surrounding environment. Optionally, at block 710, the device alternates the first flashlight user interface between the first total lumen output and a third total lumen output (e.g., in accordance with the second flashlight style shown in FIGS. 6O-6P). Alternating the first flashlight user interface between the first total lumen output and a third total lumen output provides the user with feedback that the flashlight mode supplies a pulsed or flashing source of light, which may be effective for illuminating the surrounding environment and/or serving as a safety feature to draw attention to the device, and thus, the user. Optionally, at block 712, the device displays the first flashlight user interface with a substantially uniform color across the interface (e.g., in accordance with a third flashlight style shown in FIGS. 6S-6T). Displaying the first flashlight user interface with a substantially uniform color across the interface provides the user with further feedback that the device is operating in a flashlight mode and that the flashlight mode supplies illumination of the displayed color.

Optionally, at block 714, the device detects a change in orientation of the device from a first orientation (e.g., FIGS. 6G-6H) to a second orientation (e.g., FIGS. 6I-6J).

At block 716, the device determines whether brightness change criteria are met. In some embodiments, the brightness change criteria includes a first criterion that is met by detecting the change in orientation and a second criterion that is met when the second orientation is a first predetermined orientation. In some embodiments, the brightness change criteria are met if the first flashlight user interface has been continuously displayed for greater than a predetermined threshold amount of time.

Optionally, at block 718, in accordance with a determination that the brightness change criteria are not met, the device maintains the first flashlight user interface.

At block 720, in accordance with a determination that the brightness change criteria are met, the device displays a second flashlight user interface (e.g., 640). The second flashlight user interface has a second total lumen output (e.g., 662) greater than the first total lumen output and a second luminance that is substantially uniform over the display. Displaying the second flashlight user interface with a second total lumen output greater than the first total lumen output provides the user with a greater amount of light to more effectively illuminate the surrounding environment and/or draw attention to the device. Displaying the second flashlight user interface with a luminance that is substantially uniform over the display improves the efficiency of the flashlight mode since the entire display is devoted to providing illumination. Displaying the second flashlight user interface in accordance with the determination that the brightness change criteria are met provides the user with an opportunity to recognize that the device has entered the flashlight mode before the second user interface is display (as mentioned) and provides increased control over the flashlight mode. In the case of the brightness change criteria being met if the first flashlight user interface has been continuously displayed for greater than a predetermined threshold amount of time, the second flashlight user interface is displayed automatically when a set of conditions has been met without requiring further user input, which reduces the number of inputs needed to increase the brightness of the display. Performing an operation when a set of conditions has been met without requiring further user input and reducing the number of inputs needed to perform an operation enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Also, since the first flashlight user interface has a reduced brightness, automatic activation of the second flashlight user interface provides the user with feedback that a greater brightness level is available. The advantages of providing improved visual feedback are described above.

Optionally, at block 722, the device maintains the second total lumen output substantially constant over time (e.g., in accordance with the first flashlight style (e.g., the constant flashlight style), the second total lumen output is substantially constant over time). Keeping the second total lumen output substantially constant over time provides the user with a constant source of light with increased brightness for effectively and efficiently illuminating the surrounding environment. Optionally, at block 724, the device alternates the second flashlight user interface between the second total lumen output and a fourth total lumen output (e.g., in accordance with the second flashlight style (e.g., pulsed flashlight style shown in FIGS. 6O-6P)). Alternating the second flashlight user interface between the second total lumen output and a fourth total lumen output (e.g., 664) provides the user with a pulsed or flashing source of light, which may be effective for illuminating the surrounding environment and/or serving as a safety feature to draw attention to the device, and thus, the user. Optionally, at block 726, the device displays the second flashlight user interface with the substantially uniform color across the interface (e.g., in accordance with the third flashlight style (color flashlight style shown in FIGS. 6S-6T)). Displaying the second flashlight user interface with a substantially uniform color across the interface provides the user with illumination of the displayed color at an increased brightness.

Optionally, at blocks 728 and 730, the device detects a second input (e.g., 652) while displaying the second flashlight user interface, and in response to detecting the second input, replaces the second flashlight user interface with the first flashlight user interface (e.g., FIGS. 6K-6L). Replacing the second flashlight user interface with the first flashlight user interface in response to an input provides the user with the additional control of the flashlight mode by providing the ability to reduce the brightness of the display without exiting the flashlight mode. Providing the ability to reduce the brightness of the display without exiting the flashlight mode enhances the operability of the device and makes the user-device interface more efficient, the benefits of which are described above. Also, reducing the brightness of the display may make the display more comfortable to view while, for example, checking the time (e.g., via indication of time 634) or switching the flashlight style, or otherwise operating the device.

Optionally, at blocks 732 and 734, the device detects a third input (e.g., 652) while displaying the second flashlight user interface and determines whether the device is oriented in a second predetermined orientation (e.g., the interface-lock orientation at the time the third input is detected). Optionally, at block 736, in accordance with a determination that the device is not oriented in the second predetermined orientation (e.g., the interface-lock orientation), the device replaces the second flashlight user interface with the first flashlight user interface (e.g., in response to the third input). Optionally, at block 738, in accordance with a determination that the device is oriented in a second predetermined orientation, the device maintains display of the second flashlight user interface. Maintaining the display of the second flashlight user interface in accordance with a determination that the device is oriented in a second predetermined orientation, despite the third user input, prevents the increased brightness of the second flashlight user interface from being interrupted due to inadvertent inputs when the device is oriented consistent with an intent to illuminate the surrounding environment (e.g., with the display facing away from the user). Reducing the likelihood of inadvertent operation enhances the operability of the device and makes the user-device interface more efficient, the benefits of which are described above.

Optionally, at block 740, while the device is operating according to a first flashlight style (and is displaying the first flashlight user interface or the second flashlight user interface), the device detects a fourth input (e.g., 653). Optionally, at block 742, in response to detecting the fourth input, the device ceases to operate according to the first flashlight style and operates according to the second flashlight style (e.g., FIG. 6O). Switching from the first flashlight style to the second flashlight style in this manner provides the user with increased control over the flashlight mode and reduces the number of inputs required to change the style of illumination by providing the ability to change the style directly from within the flashlight mode (instead of, e.g., through a separate settings menu). The benefits of reducing the number of inputs required to perform an operation are described above.

Optionally, at block 744, the device detects a fifth input (e.g., 656) (e.g., while operating in the flashlight mode). In some embodiments, the fifth input includes a contact (e.g., 657) on the display. Optionally, at block 746, the device determines a characteristic intensity of the contact on the display. Optionally, at block 748, in response to detecting the fifth input, the device adjusts a visual characteristic of the flashlight mode (e.g., FIGS. 6Z-6AC). Adjusting a visual characteristic of the flashlight mode while the device is operating in the flashlight mode reduces the number of inputs needed to adjust the visual characteristics of the illumination (e.g., the user does not have to access a separate settings application). The benefits of reducing the number of inputs required to perform an operation are described above. Optionally, at block 750, the visual characteristic of the flashlight mode is adjusted in accordance with a determination that the characteristic intensity of the contact exceeds a threshold characteristic intensity. Adjusting the visual characteristic of the flashlight mode in accordance with a determination that the characteristic intensity of the contact exceeds a threshold characteristic intensity provides the user with the ability to adjust the appearance of the illumination without displaying additional graphical user interface objects on the display. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 752, 754, and 756, the device displays, on the display, an affordance (e.g., 631) for dismissing the flashlight mode, detects a user input (e.g., 659) corresponding to selection of the affordance for dismissing the flashlight mode, and in response to detecting the user input corresponding to selection of the affordance for dismissing the flashlight mode, dismisses the flashlight mode (e.g., FIGS. 6AE-AG). Displaying an affordance for dismissing the flashlight mode provides the user with feedback that the flashlight mode can be dismissed with selection of the affordance. The affordance thus provides an efficient way to dismiss the flashlight mode while also reducing the chance that the user will inadvertently dismiss the flashlight mode.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a display;
   a physical input mechanism that is different from the display;
   one or more processors; and
   memory storing one or more programs configured to be executed by the one or more processors, the one or more programs including instructions for:
      while displaying a user interface on the display, receiving a request to display a flashlight user interface for controlling use of an illumination source as a flashlight;
      in response to receiving the request to display the flashlight user interface, displaying the flashlight user interface;
      while displaying the flashlight user interface, detecting an interaction with the physical input mechanism; and
      in response to detecting the interaction with the physical input mechanism, changing a property of the illumination source that is used as the flashlight.

2. The electronic device of claim 1, wherein the physical input mechanism is depressible.

3. The electronic device of claim 1, wherein the physical input mechanism is rotatable.

4. The electronic device of claim 1, wherein the display includes a display illumination source and the illumination source is part of the display.

5. The electronic device of claim 1, wherein:
the display is a touch-sensitive display that is different from the physical input mechanism; and
the request to display the flashlight user interface includes one or more touch inputs on the touch-sensitive display.

6. The electronic device of claim 1, wherein the request to display the flashlight user interface includes a first input directed to a first control affordance of a plurality of control affordances that are included in a control user interface displayed via the display.

7. The electronic device of claim 1, wherein changing the property of the illumination source that is used as the flashlight includes changing a brightness of the illumination source.

8. The electronic device of claim 7, wherein:
the interaction with the physical input mechanism is a rotation of the physical input mechanism; and
changing a brightness of the illumination source includes changing the brightness by an amount that is proportional to an amount of rotation of the physical input mechanism.

9. The electronic device of claim 7, wherein:
the interaction with the physical input mechanism is a rotation of the physical input mechanism; and
changing a brightness of the illumination source includes:
in accordance with a determination that the rotation of the physical input mechanism is in a first direction, increasing the brightness of the illumination source; and
in accordance with a determination that the rotation of the physical input mechanism is in a second direction, decreasing the brightness of the illumination source.

10. The electronic device of claim 1, wherein changing a property of the illumination source that is used as the flashlight includes:
in accordance with a determination that the flashlight user interface corresponds to a first flashlight style, changing a first property of the illumination source; and
in accordance with a determination that the flashlight user interface corresponds to a second flashlight style, changing a second property, different from the first property, of the illumination source.

11. The electronic device of claim 1, the one or more programs further including instructions for:
after changing the property of the illumination source, detecting a second input; and
in response to detecting the second input, dismissing the flashlight user interface.

12. The non-transitory computer-readable storage medium of claim 1, wherein the flashlight user interface uses the illumination source as a flashlight.

13. A non-transitory computer-readable storage medium storing one or more programs configured to be executed by one or more processors of an electronic device with a display and a physical input mechanism that is different from the display, the one or more programs including instructions for:
while displaying a user interface on the display, receiving a request to display a flashlight user interface for controlling use of an illumination source as a flashlight;
in response to receiving the request to display the flashlight user interface, displaying the flashlight user interface;
while displaying the flashlight user interface, detecting an interaction with the physical input mechanism; and
in response to detecting the interaction with the physical input mechanism, changing a property of the illumination source that is used as the flashlight.

14. The non-transitory computer-readable storage medium of claim 13, wherein the physical input mechanism is depressible.

15. The non-transitory computer-readable storage medium of claim 13, wherein the physical input mechanism is rotatable.

16. The non-transitory computer-readable storage medium of claim 13, wherein the display includes a display illumination source and the illumination source is part of the display.

17. The non-transitory computer-readable storage medium of claim 13, wherein:
the display is a touch-sensitive display that is different from the physical input mechanism; and
the request to display the flashlight user interface includes one or more touch inputs on the touch-sensitive display.

18. The non-transitory computer-readable storage medium of claim 13, wherein the request to display the flashlight user interface includes a first input directed to a first control affordance of a plurality of control affordances that are included in a control user interface displayed via the display.

19. The non-transitory computer-readable storage medium of claim 13, wherein changing the property of the illumination source that is used as the flashlight includes changing a brightness of the illumination source.

20. The non-transitory computer-readable storage medium of claim 19, wherein:
the interaction with the physical input mechanism is a rotation of the physical input mechanism; and
changing a brightness of the illumination source includes changing the brightness by an amount that is proportional to an amount of rotation of the physical input mechanism.

21. The non-transitory computer-readable storage medium of claim 19, wherein:
the interaction with the physical input mechanism is a rotation of the physical input mechanism; and
changing a brightness of the illumination source includes:
in accordance with a determination that the rotation of the physical input mechanism is in a first direction, increasing the brightness of the illumination source; and
in accordance with a determination that the rotation of the physical input mechanism is in a second direction, decreasing the brightness of the illumination source.

22. The non-transitory computer-readable storage medium of claim 13, wherein changing a property of the illumination source that is used as the flashlight includes:
in accordance with a determination that the flashlight user interface corresponds to a first flashlight style, changing a first property of the illumination source; and
in accordance with a determination that the flashlight user interface corresponds to a second flashlight style, changing a second property, different from the first property, of the illumination source.

23. The non-transitory computer-readable storage medium of claim 13, the one or more programs further including instructions for:
after changing the property of the illumination source, detecting a second input; and in response to detecting the second input, dismissing the flashlight user interface.

24. The non-transitory computer-readable storage medium of claim 13, wherein the flashlight user interface uses the illumination source as a flashlight.

25. A method, comprising:
at an electronic device with a display and a physical input mechanism that is different from the display:
while displaying a user interface on the display, receiving a request to display a flashlight user interface for controlling use of an illumination source as a flashlight;
in response to receiving the request to display the flashlight user interface, displaying the flashlight user interface;
while displaying the flashlight user interface, detecting an interaction with the physical input mechanism; and
in response to detecting the interaction with the physical input mechanism, changing a property of the illumination source that is used as the flashlight.

26. The method of claim 25, wherein the physical input mechanism is depressible.

27. The method of claim 25, wherein the physical input mechanism is rotatable.

28. The method of claim 25, wherein the display includes a display illumination source and the illumination source is part of the display.

29. The method of claim 25, wherein:
the display is a touch-sensitive display that is different from the physical input mechanism; and
the request to display the flashlight user interface includes one or more touch inputs on the touch-sensitive display.

30. The method of claim 25, wherein the request to display the flashlight user interface includes a first input directed to a first control affordance of a plurality of control affordances that are included in a control user interface displayed via the display.

31. The method of claim 25, wherein changing the property of the illumination source that is used as the flashlight includes changing a brightness of the illumination source.

32. The method of claim 31, wherein:
the interaction with the physical input mechanism is a rotation of the physical input mechanism; and
changing a brightness of the illumination source includes changing the brightness by an amount that is proportional to an amount of rotation of the physical input mechanism.

33. The method of claim 31, wherein:
the interaction with the physical input mechanism is a rotation of the physical input mechanism; and
changing a brightness of the illumination source includes:
in accordance with a determination that the rotation of the physical input mechanism is in a first direction, increasing the brightness of the illumination source; and
in accordance with a determination that the rotation of the physical input mechanism is in a second direction, decreasing the brightness of the illumination source.

34. The method of claim 25, wherein changing a property of the illumination source that is used as the flashlight includes:
in accordance with a determination that the flashlight user interface corresponds to a first flashlight style, changing a first property of the illumination source; and
in accordance with a determination that the flashlight user interface corresponds to a second flashlight style, changing a second property, different from the first property, of the illumination source.

35. The method of claim 25, further comprising:
after changing the property of the illumination source, detecting a second input; and
in response to detecting the second input, dismissing the flashlight user interface.

36. The method of claim 25, wherein the flashlight user interface uses the illumination source as a flashlight.

* * * * *

UNITED STATES PATENT AND TRADEMARK OFFICE
CERTIFICATE OF CORRECTION

PATENT NO. : 12,293,741 B2
APPLICATION NO. : 18/629155
DATED : May 6, 2025
INVENTOR(S) : Marco Triverio et al.

Page 1 of 1

It is certified that error appears in the above-identified patent and that said Letters Patent is hereby corrected as shown below:

In the Claims

Column 45, Lines 54-55, Claim 12, delete "non-transitory computer-readable storage medium" and insert --electronic device--.

Signed and Sealed this
Twenty-fourth Day of June, 2025

Coke Morgan Stewart
*Acting Director of the United States Patent and Trademark Office*